US012764228B2

(12) United States Patent
Fucci et al.

(10) Patent No.: US 12,764,228 B2
(45) Date of Patent: Oct. 13, 2026

(54) CALL FLOW SOLUTIONS FOR MONITORING AND EMERGENCY RESPONSE

(71) Applicant: RapidSOS, Inc., New York, NY (US)

(72) Inventors: Conor Fucci, Brooklyn, NY (US); Zvika Ferentz, Harrison, NY (US); Jeffrey Michael Sternberg, Brooklyn, NY (US); Fabian Borot, Miami, FL (US); Timothy Wojciech Choldas, Pleasant Prairie, WI (US); Patricia Beesley, Cedar Grove, NJ (US); Andrew Lee Hwang, New York, NY (US); Jee Yoon Choi, Santa Monica, CA (US)

(73) Assignee: RapidSOS, Inc., New York, NY (US)

( * ) Notice: Subject to any disclaimer, the term of this patent is extended or adjusted under 35 U.S.C. 154(b) by 152 days.

(21) Appl. No.: 18/666,993

(22) Filed: May 17, 2024

(65) Prior Publication Data

US 2024/0388657 A1 Nov. 21, 2024

Related U.S. Application Data

(60) Provisional application No. 63/467,769, filed on May 19, 2023.

(51) Int. Cl.

| | |
|---|---|
| ***H04M 3/51*** | (2006.01) |
| ***H04M 3/42*** | (2006.01) |
| ***H04M 3/523*** | (2006.01) |
| ***H04M 11/02*** | (2006.01) |

(52) U.S. Cl.
CPC ..... *H04M 3/5116* (2013.01); *H04M 3/42374* (2013.01); *H04M 3/5235* (2013.01); *H04M 11/02* (2013.01); *H04M 2201/38* (2013.01); *H04M 2201/42* (2013.01)

(58) Field of Classification Search
CPC .......... H04M 3/5116; H04M 3/42374; H04M 3/5235; H04M 11/02; H04M 2201/38; H04M 2201/42; H04M 11/04; H04M 3/51; H04M 3/42
See application file for complete search history.

(56) References Cited

U.S. PATENT DOCUMENTS

| | | | |
|---|---|---|---|
| 9,659,484 | B1 | 5/2017 | Mehta |
| 9,736,670 | B2 | 8/2017 | Mehta |
| 9,756,169 | B2 | 9/2017 | Mehta |
| 9,838,858 | B2 | 12/2017 | Anand |
| 9,924,043 | B2 | 3/2018 | Mehta |
| 9,942,739 | B2 | 4/2018 | Bozik |
| 9,986,404 | B2 | 5/2018 | Mehta |
| 9,992,655 | B2 | 6/2018 | Anand |
| 9,998,507 | B2 | 6/2018 | Mehta |

(Continued)

*Primary Examiner* — Yosef K Laekemariam
(74) *Attorney, Agent, or Firm* — Fitch, Even, Tabin & Flannery LLP

(57) ABSTRACT

Disclosed herein is an emergency response data platform that facilitates communications between private security systems, monitoring center systems, and emergency service providers. In various embodiments, the emergency response data platform provides automated flows for sharing emergency data and facilitating voice-based communication sessions between private security systems, monitoring center systems, and emergency service providers.

16 Claims, 29 Drawing Sheets

(56) References Cited

U.S. PATENT DOCUMENTS

| | | | | |
|---|---|---|---|---|
| D829,222 | S | 9/2018 | Choi | |
| 10,136,294 | B2 | 11/2018 | Mehta | |
| 10,140,842 | B2 | 11/2018 | Mehta | |
| D835,151 | S | 12/2018 | Martin | |
| 10,165,431 | B2 | 12/2018 | Bozik | |
| 10,375,558 | B2 | 8/2019 | Katz | |
| 10,419,915 | B2 | 9/2019 | Mehta | |
| 10,425,799 | B2 | 9/2019 | Anand | |
| 10,447,865 | B2 | 10/2019 | Mehta | |
| 10,657,799 | B2 | 5/2020 | Mehta | |
| 10,701,541 | B2 | 6/2020 | Mehta | |
| 10,701,542 | B2 | 6/2020 | Martin | |
| 10,769,692 | B2 * | 9/2020 | Davies | G08B 29/18 |
| 10,771,951 | B2 | 9/2020 | Mehta | |
| 10,805,786 | B2 | 10/2020 | Pellegrini | |
| 10,820,181 | B2 | 10/2020 | Horelik | |
| 10,861,320 | B2 | 12/2020 | Martin | |
| 10,911,926 | B2 | 2/2021 | Pellegrini | |
| 10,977,927 | B2 | 4/2021 | Katz | |
| 11,140,538 | B2 | 10/2021 | Mehta | |
| 11,146,680 | B2 | 10/2021 | Leavitt | |
| 11,153,737 | B2 | 10/2021 | Anand | |
| 11,197,145 | B2 | 12/2021 | Martin | |
| 11,218,584 | B2 | 1/2022 | Martin | |
| 11,228,891 | B2 | 1/2022 | King-Berkman | |
| 11,310,647 | B2 | 4/2022 | Pellegrini | |
| 11,330,096 | B2 | 5/2022 | Horelik | |
| 11,330,664 | B1 | 5/2022 | Martin | |
| 11,356,833 | B2 | 6/2022 | Martin | |
| 11,399,095 | B2 | 7/2022 | Martin | |
| D960,922 | S | 8/2022 | Pellegrini | |
| 11,425,529 | B2 | 8/2022 | Mehta | |
| 11,445,349 | B2 | 9/2022 | Mehta | |
| 11,496,874 | B2 | 11/2022 | Katz | |
| D973,066 | S | 12/2022 | Gillespie | |
| 11,528,772 | B2 | 12/2022 | Horelik | |
| 11,553,321 | B2 | 1/2023 | Martin | |
| 11,558,728 | B2 | 1/2023 | Pellegrini | |
| 11,570,607 | B2 | 1/2023 | Pellegrini | |
| 11,580,845 | B2 | 2/2023 | Mehta | |
| 11,605,287 | B2 | 3/2023 | Mehta | |
| 11,641,575 | B2 | 5/2023 | Horelik | |
| 11,659,375 | B2 | 5/2023 | Anand | |
| 11,665,523 | B2 | 5/2023 | Mehta | |
| 11,689,653 | B2 | 6/2023 | Martin | |
| 11,695,871 | B2 | 7/2023 | Leavitt | |
| 11,716,605 | B2 | 8/2023 | King-Berkman | |
| 11,741,819 | B2 | 8/2023 | Katz | |
| 11,743,706 | B2 | 8/2023 | Pellegrini | |
| 11,749,094 | B2 | 9/2023 | Pellegrini | |
| 11,790,766 | B2 | 10/2023 | Martin | |
| 11,818,639 | B2 | 11/2023 | Horelik | |
| 11,832,157 | B2 | 11/2023 | Mehta | |
| 11,864,082 | B2 | 1/2024 | Martin | |
| 11,871,325 | B2 | 1/2024 | Pellegrini | |
| 11,902,871 | B2 | 2/2024 | Pellegrini | |
| 11,908,553 | B2 | 2/2024 | Ferentz | |
| 11,917,514 | B2 | 2/2024 | Martin | |
| 11,943,694 | B2 | 3/2024 | Pellegrini | |
| 11,956,853 | B2 | 4/2024 | Martin | |
| 11,974,207 | B2 | 4/2024 | Katz | |
| 12,041,525 | B2 | 7/2024 | Bozik | |
| 12,047,858 | B2 | 7/2024 | Anand | |
| 12,063,581 | B2 | 8/2024 | Martin | |
| 12,074,999 | B2 | 8/2024 | Martin | |
| 2016/0088455 | A1 | 3/2016 | Bozik | |
| 2017/0124853 | A1 | 5/2017 | Mehta | |
| 2017/0161614 | A1 | 6/2017 | Mehta | |
| 2017/0164175 | A1 | 6/2017 | Bozik | |
| 2017/0171735 | A1 | 6/2017 | Anand | |
| 2017/0180486 | A1 | 6/2017 | Mehta | |
| 2017/0180964 | A1 | 6/2017 | Mehta | |
| 2017/0195475 | A1 | 7/2017 | Mehta | |
| 2017/0245130 | A1 | 8/2017 | Mehta | |
| 2017/0251347 | A1 | 8/2017 | Mehta | |
| 2017/0310827 | A1 | 10/2017 | Mehta | |
| 2017/0325056 | A1 | 11/2017 | Mehta | |
| 2017/0330447 | A1 | 11/2017 | Mehta | |
| 2018/0053401 | A1 | 2/2018 | Martin | |
| 2018/0152563 | A1 | 5/2018 | Mehta | |
| 2018/0242133 | A1 | 8/2018 | Anand | |
| 2018/0249315 | A1 | 8/2018 | Mehta | |
| 2018/0262544 | A1 | 9/2018 | Mehta | |
| 2018/0310159 | A1 * | 10/2018 | Katz | H04M 3/4217 |
| 2019/0073894 | A1 | 3/2019 | Mehta | |
| 2019/0104395 | A1 | 4/2019 | Mehta | |
| 2019/0174288 | A1 | 6/2019 | Bozik | |
| 2019/0174289 | A1 | 6/2019 | Martin | |
| 2019/0253861 | A1 | 8/2019 | Horelik | |
| 2019/0281165 | A1 | 9/2019 | Mehta | |
| 2019/0306664 | A1 | 10/2019 | Mehta | |
| 2019/0320310 | A1 | 10/2019 | Horelik | |
| 2019/0327597 | A1 | 10/2019 | Katz | |
| 2019/0335310 | A1 | 10/2019 | Anand | |
| 2019/0380020 | A1 | 12/2019 | Pellegrini | |
| 2020/0059776 | A1 | 2/2020 | Martin | |
| 2020/0068374 | A1 | 2/2020 | Mehta | |
| 2020/0100084 | A1 | 3/2020 | Martin | |
| 2020/0126174 | A1 | 4/2020 | Halse | |
| 2020/0135005 | A1 | 4/2020 | Katz | |
| 2020/0221279 | A1 | 7/2020 | Mehta | |
| 2020/0244797 | A1 | 7/2020 | Horelik | |
| 2020/0258374 | A1 | 8/2020 | Mehta | |
| 2020/0258606 | A1 | 8/2020 | Ferentz | |
| 2020/0274962 | A1 | 8/2020 | Martin | |
| 2020/0288295 | A1 | 9/2020 | Martin | |
| 2020/0314240 | A1 | 10/2020 | Leavitt | |
| 2020/0314623 | A1 | 10/2020 | Pellegrini | |
| 2020/0346751 | A1 | 11/2020 | Horelik | |
| 2021/0006960 | A1 | 1/2021 | Martin | |
| 2021/0006961 | A1 | 1/2021 | King-Berkman | |
| 2021/0014659 | A1 | 1/2021 | Mehta | |
| 2021/0037368 | A1 | 2/2021 | Pellegrini | |
| 2021/0058508 | A1 | 2/2021 | Leavitt | |
| 2021/0120394 | A1 | 4/2021 | Martin | |
| 2021/0204108 | A1 | 7/2021 | Horelik | |
| 2021/0233388 | A1 | 7/2021 | Martin | |
| 2021/0266722 | A1 | 8/2021 | Pellegrini | |
| 2021/0289334 | A1 | 9/2021 | Martin | |
| 2021/0314757 | A1 | 10/2021 | Pellegrini | |
| 2021/0383918 | A1 | 12/2021 | Martin | |
| 2021/0390844 | A1 | 12/2021 | Katz | |
| 2021/0409928 | A1 | 12/2021 | Mehta | |
| 2022/0014895 | A1 | 1/2022 | Horelik | |
| 2022/0027417 | A1 | 1/2022 | Katz | |
| 2022/0030109 | A1 | 1/2022 | Leavitt | |
| 2022/0051548 | A1 | 2/2022 | Pellegrini | |
| 2022/0103995 | A1 | 3/2022 | Horelik | |
| 2022/0141637 | A1 | 5/2022 | Pellegrini | |
| 2022/0167141 | A1 | 5/2022 | Anand | |
| 2022/0172599 | A1 | 6/2022 | Mehta | |
| 2022/0174468 | A1 | 6/2022 | Anand | |
| 2022/0201458 | A1 | 6/2022 | Pellegrini | |
| 2022/0210272 | A1 | 6/2022 | Horelik | |
| 2022/0264274 | A1 | 8/2022 | Bozik | |
| 2022/0272201 | A1 | 8/2022 | Mehta | |
| 2022/0279331 | A1 | 9/2022 | Biegel | |
| 2022/0303380 | A1 | 9/2022 | Martin | |
| 2022/0322061 | A1 | 10/2022 | King-Berkman | |
| 2022/0353662 | A1 | 11/2022 | Martin | |
| 2022/0353663 | A1 | 11/2022 | Mehta | |
| 2022/0360963 | A1 | 11/2022 | Ferentz | |
| 2022/0377522 | A1 | 11/2022 | Martin | |
| 2022/0377841 | A1 | 11/2022 | Martin | |
| 2023/0014517 | A1 | 1/2023 | Martin | |
| 2023/0014760 | A1 | 1/2023 | Martin | |
| 2023/0036290 | A1 | 2/2023 | Martin | |
| 2023/0042895 | A1 | 2/2023 | Katz | |
| 2023/0048015 | A1 | 2/2023 | Pellegrini | |
| 2023/0066525 | A1 | 3/2023 | Cabanas | |
| 2023/0097022 | A1 | 3/2023 | Leavitt | |
| 2023/0114663 | A1 | 4/2023 | Pellegrini | |
| 2023/0123348 | A1 | 4/2023 | Mehta | |
| 2023/0154310 | A1 | 5/2023 | Mehta | |

(56) References Cited

U.S. PATENT DOCUMENTS

| | | | |
|---|---|---|---|
| 2023/0217546 | A1 | 7/2023 | Horelik |
| 2023/0262438 | A1 | 8/2023 | Anand |
| 2023/0269572 | A1 | 8/2023 | Horelik |
| 2023/0284004 | A1 | 9/2023 | Pellegrini |
| 2023/0336958 | A1 | 10/2023 | Mehta |
| 2023/0370540 | A1 | 11/2023 | Martin |
| 2023/0410635 | A1 | 12/2023 | Katz |
| 2023/0421630 | A1 | 12/2023 | Leavitt |
| 2023/0422013 | A1 | 12/2023 | Pellegrini |
| 2024/0048952 | A1 | 2/2024 | Seidberg |
| 2024/0073669 | A1 | 2/2024 | King-Berkman |
| 2024/0098473 | A1 | 3/2024 | Ingram |
| 2024/0114328 | A1 | 4/2024 | Mehta |
| 2024/0171958 | A1 | 5/2024 | Martin |
| 2024/0267719 | A1 | 8/2024 | Pellegrini |
| 2024/0276193 | A1 | 8/2024 | Martin |
| 2024/0292201 | A1 | 8/2024 | Katz |
| 2024/0323663 | A1 | 9/2024 | Pellegrini |
| 2024/0334172 | A1 | 10/2024 | Bozik |

* cited by examiner

CALL FLOW SOLUTIONS FOR MONITORING AND EMERGENCY RESPONSE

CROSS-REFERENCE TO RELATED APPLICATION(S)

This application claims priority to U.S. Provisional Application No. 63/467,769, filed May 19, 2023, the contents of which are incorporated herein by reference in their entirety.

TECHNICAL FIELD

This disclosure relates generally to systems and methods for facilitating communications during emergencies.

BACKGROUND

A person in an emergency situation may request help using a mobile communication device such as a cell phone to dial a designated emergency number like 9-1-1 or a direct access phone number for the local emergency service provider (e.g. an emergency dispatch center). Traditionally, this call is assigned to one or more first responders by the emergency service provider, and the caller's estimated location (generally either the location of a nearby cell tower or a triangulation from the location of three or more nearby cell towers) is provided to the emergency service provider by the caller's wireless carrier (e.g., AT&T). Alternatively, the caller may provide their location to the emergency service provider by verbally speaking their location over the phone. Unfortunately, many emergency callers are unaware of their precise location or otherwise unable to verbalize it.

However, modern technologies have enabled the development and implementation of previously unimaginable or unachievable emergency services. For example, modern communication devices are capable of generating highly accurate, real-time locations (e.g., device-based hybrid locations) during emergency situations (e.g., in response to an emergency number being dialed) and transmitting the locations to emergency management systems and emergency service providers. Emergency service providers can then use these accurate locations to more quickly locate and dispatch emergency assistance to emergency callers. In another example, devices such as surveillance cameras can capture images, videos, or audio that can be shared in real-time with emergency management systems and emergency service providers to provide emergency service providers with situational awareness that they did not have access to in the past.

Likewise, many emergency service providers have upgraded various components of their systems to internet-enabled or cloud-based technologies that allow for easier integration with next generation emergency response technologies (e.g., Next Generation 911 technologies, or "NG911"). For example, through a public-private partnership, the United States recently deployed a nationwide wireless broadband communication system dedicated specifically to emergency service providers (i.e., FirstNet). Or for example, there are now cloud-based computer aided dispatch (CAD) systems that can be more agile and interoperable than the desktop applications that came before them. However, the adoption rates of these next generation emergency response technologies vary from emergency service provider to emergency service provider, due to differences in need, funding, jurisdiction, and system architecture.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Figure 1:
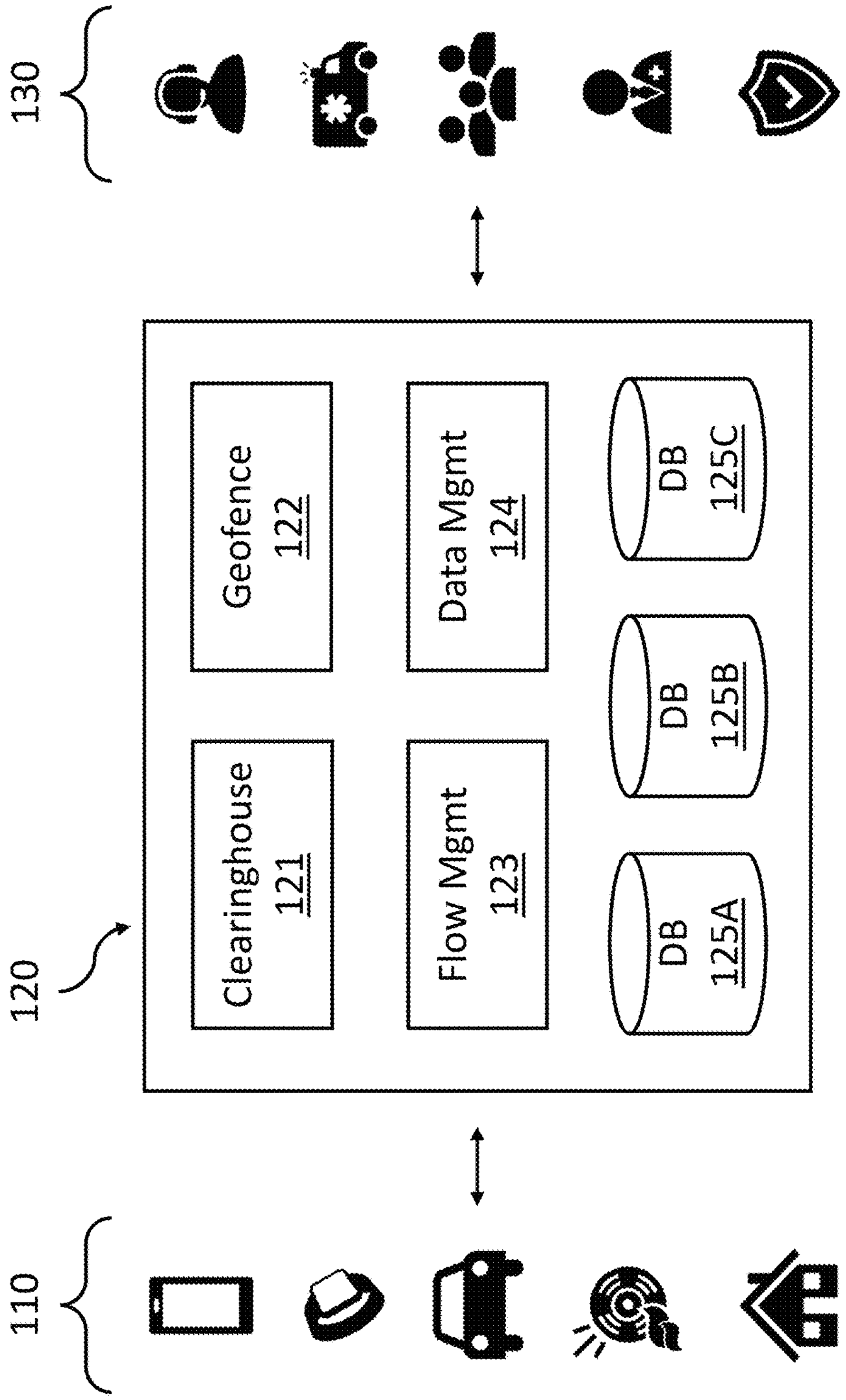
FIG. 1 depicts a diagram of an emergency response data platform, in accordance with some embodiments.

Disclosed herein are systems, devices, media, and methods for providing enhanced emergency communications and functions. The disclosed systems, devices, media and methods, among other things, take advantage of technological advancements that have allowed for mobile communication devices to generate accurate locations by incorporating multiple technologies embedded in the devices, such as GPS, Wi-Fi, and Bluetooth to create device-based hybrid locations. Device-based hybrid locations are locations calculated on an electronic or communication device, as opposed to locations calculated using a network (e.g., a carrier network). Device-based hybrid locations can be generated using GPS, network-based technologies, Wi-Fi access points, Bluetooth beacons, barometric pressure sensors, dead reckoning using accelerometers and gyrometers, and a variety of crowdsourced and proprietary databases that device operating systems providers are running to enhance location technology. These device-based hybrid locations can be quickly generated during emergency calls. Furthermore, mobile communication devices (e.g., mobile phones, wearables, IoT devices, smart home devices, vehicle computers, etc.) are often capable of generating or storing additional information that may be useful in responding to emergency situations, such as health data or medical histories. For example, during an emergency, a modern mobile communication device may have access to an implicated person's blood type, preexisting medical conditions, or even the implicated person's current heart rate. In some embodiments, the mobile communication device has access to data from sensors (e.g., health or environmental sensors). For example, a video feed of the emergency via a connected surveillance camera can provide valuable situational awareness regarding the emergency.

In one aspect, disclosed herein is an emergency response data platform (ERDP) capable of receiving emergency data (e.g., device-based hybrid locations and additional emergency information, such as health data, medical emergencies, and multimedia) from smart devices and systems (e.g., mobile phones and IoT devices) and transmitting the emergency data to emergency service providers (ESPs) to assist the ESPs in responding to emergencies. However, while device-based hybrid locations are generally more accurate and more quickly generated than the locations estimated by wireless carriers (as mentioned above), device-based hybrid locations are generally only available for emergency calls made by mobile phones. Thus, because ESPs receive emergency calls from both mobile phone and landline phones, if the ERDP were to only provide device-based hybrid locations to an ESP, the ERDP would not be providing locations to the ESP for all of the emergency calls received by the ESP. There is therefore a desire for the ERDP to source and ingest locations associated with landline phones that make emergency calls to ESPs, so that the ERDP can provide locations to an ESP for all of the emergency calls that the ESP receives. In another aspect, then, disclosed herein is an ERDP capable of receiving emergency data from smart devices and systems and emergency call data (e.g., data associated with emergency calls made to ESPs) and transmitting both the emergency data and the emergency call data to the ESPs to assist the ESPs in responding to emergencies.

Disclosed herein, in one aspect, is a method for facilitating communications between monitoring centers and private security systems, the method comprising: receiving an emergency alert from a private security system, the emergency alert comprising emergency data comprising a user identifier and an emergency location; after receiving the emergency alert, determining that a monitoring account associated with both the user identifier and a monitoring center system has not been created for the user identifier; generating the monitoring account associated with both the user identifier and the monitoring center system, the monitoring account comprising the user identifier and the emergency location; transmitting the monitoring account to the monitoring center system; and transmitting at least a portion of the emergency data to the monitoring center system for display within a graphical user interface provided by a software application executed on a computing device associated with the monitoring center system. In some embodiments, determining that the monitoring account associated with both the user identifier and the monitoring center system has not been created for the user identifier comprises cross-referencing the user identifier with a monitoring account database. In some embodiments, the software application is automation software. In some embodiments, the software application is a monitoring center portal, and the method further comprises providing the monitoring center portal to the monitoring center system. In some embodiments, the monitoring center portal is a website or a web application accessible via a standard web browser. In some embodiments, the method further comprises establishing communication links with a plurality of private security systems comprising the private security system from which the emergency alert is received. In some embodiments, the emergency alert comprises an account holder name. In some embodiments, the emergency alert comprises one or more emergency contacts and one or more user identifiers associated with the one or more emergency contacts. In some embodiments, the emergency alert is generated by a home security system associated with the private security system. In some embodiments, the emergency alert is generated by a mobile device associated with the private security system. In some embodiments, the emergency location is generated by the mobile device. In some embodiments, the user identifier is a phone number or an email address. In some embodiments, the method further comprises receiving updated emergency data associated with the emergency alert from the private security system and transmitting the updated emergency data to the monitoring center system for display within the graphical user interface of the software application. In some embodiments, the method further comprises determining an emergency service provider appropriate to receive emergency data associated with the emergency alert and transmitting at least a portion of the emergency data associated with the emergency alert to the emergency service provider. In some embodiments, the emergency service provider is determined at least in part based on the emergency location. In some embodiments, the method further comprises detecting an escalation associated with the user identifier by the monitoring center system and transmitting the at least a portion of the of the emergency data to the emergency service provider in response to detecting the escalation. In some embodiments, a method for facilitating communications between monitoring centers and private security systems comprises: receiving an emergency alert from a private security system, the emergency alert comprising emergency data comprising a user identifier and an emergency location; after receiving the emergency alert, determining that a monitoring account associated with the user identifier has not been created for the user identifier; initiating creation of the monitoring account associated with the user identifier, wherein the monitoring account is associated with a monitoring center system and comprises the user identifier and the emergency location; and transmitting at least a portion of the emergency data to the monitoring center system for display within a graphical user interface provided by a software application executed on a computing device associated with the monitoring center system.

In another aspect, disclosed herein is a system for facilitating communications between monitoring systems and private security systems, the system comprising: a plurality of monitoring systems; a plurality of private security systems; and an intelligent safety platform communicatively coupled to the plurality of private security systems and the plurality of monitoring systems and configured to: receive an emergency alert from a private security system from the plurality of private security systems, the emergency alert comprising emergency data comprising a user identifier and an emergency location; determine that a monitoring account associated with both the user identifier and a monitoring system from the plurality of monitoring systems has not been created for the user identifier; generate the monitoring account associated with both the user identifier and the monitoring system, the monitoring account comprising the user identifier and the emergency location; transmit the monitoring account to the monitoring system; and transmit at least a portion of the emergency data to the monitoring system for display within a graphical user interface provided by a software application executed on a computing device associated with the monitoring system.

In another aspect, disclosed herein is a method for automating a monitoring call flow, the method comprising: receiving an emergency alert from a private security system, the emergency alert comprising a customer phone number and an emergency location; providing an automated monitoring call flow phone number to a monitoring center system; determining an emergency service provider appropriate to respond to the emergency alert based at least in part on the emergency location; and executing an automated monitoring call flow for the emergency alert, wherein executing the automated monitoring call flow comprises facilitating a first voice-based communication session between the monitoring center system and an electronic device associated with the customer phone number and a second voice-based communication session between the monitoring center system and the emergency service provider. In some embodiments, the method further comprises detecting a phone call made to the automated monitoring call flow phone number and executing the automated monitoring call flow for the emergency alert in response to detecting the phone call. In some embodiments, executing the automated monitoring call flow further comprises: establishing a communication bridge for the emergency alert; establishing a first communication link with an electronic device associated with the monitoring center system; establishing a second communication link with the electronic device associated with the customer phone number; and connecting the first and second communication links to the communication bridge to facilitate the first voice-based communication session. In some embodiments, executing the automated monitoring call flow further comprises: establishing a first communication link with a communication device associated with the monitoring center system; determining an agency specific phone number for the emergency service provider; using the agency specific phone number to establish a second communication link with an electronic device associated with the emergency service provider; and connecting the first and second communication links to the communication bridge to facilitate the second voice-based communication session. In some embodiments, providing the automated monitoring call flow phone number to the monitoring center system further comprises transmitting the automated monitoring call flow number to an electronic device associated with the monitoring center system in the form of a text message. In some embodiments, providing the automated monitoring call flow phone number to the monitoring center system further comprises providing the automated monitoring call flow phone number to the monitoring center system for display by an electronic device associated with the monitoring center system. In some embodiments, the automated monitoring call flow phone number is displayed within a graphical user interface of a software application executed on the electronic device associated with the monitoring system. In some embodiments, the software application is automation software. In some embodiments, the software application is a monitoring center portal and further comprising providing the monitoring center portal to the monitoring center system. In some embodiments, the monitoring center portal is a website or a web application accessible via a standard web browser. In some embodiments, the method further comprises: generating a pin code associated with the emergency alert; establishing a communication link with an electronic device associated with the monitoring center system; receiving, through the communication link, the pin code associated with the emergency alert from the electronic device associated with the monitoring center system; and executing the automated monitoring call flow for the emergency alert in response to receiving the pin code associated with the emergency alert from the electronic device associated with the monitoring center system. In some embodiments, the method further comprises providing the pin code to the monitoring center system. In some embodiments, providing the pin code to the monitoring center system further comprises transmitting the pin code to the monitoring center system for display within a graphical user interface of a software application executed on a computing device associated with the monitoring center system. In some embodiments, the computing device associated with the monitoring center system and the electronic device associated with the monitoring center system are the same device. In some embodiments, the software application is automation software. In some embodiments, the software application is a monitoring center portal and further comprising providing the monitoring center portal to the monitoring center system. In some embodiments, the method further comprises: after receiving the emergency alert, determining that a monitoring account associated with both the user identifier and the monitoring center system has not been created for the user identifier; and generating the monitoring account associated with both the user identifier and the monitoring center system, the monitoring account comprising the user identifier and the emergency location. In some embodiments, determining that the monitoring account associated with both the user identifier and the monitoring center system has not been created for the user identifier comprises cross-referencing the user identifier with a monitoring account database.

In another aspect, disclosed herein is a method for automating an emergency response call flow, the method comprising: detecting a phone call made to an emergency response phone number; and executing an emergency response call flow, wherein executing the emergency response call flow comprises facilitating a voice-based communication session with an emergency caller and extracting emergency data from the voice-based communication session. In some embodiments, the method further comprises: determining, based on information associated with the emergency caller, an emergency service provider appropriate to respond to the phone call; and retrieving, using the information associated with the emergency caller, the emergency response call flow from an emergency response call flow database. In some embodiments, the emergency response call flow database comprises a plurality of emergency response call flows associated with a respective plurality of emergency service providers. In some embodiments, the information associated with the emergency caller comprises a phone number associated with the emergency caller. In some embodiments, the information associated with the emergency caller comprises a location associated with the emergency caller. In some embodiments, the location associated with the emergency caller is a device-based hybrid location generated by an electronic device associated with the emergency caller. In some embodiments, the method further comprises transmitting the emergency data extracted from the voice-based communication session to the emergency service provider. In some embodiments, the emergency data extracted from the voice-based communication session is displayed within a graphical user interface of an emergency response application. In some embodiments, the emergency response application is a computer aided dispatch (CAD) system. In some embodiments, the method further comprises generating the emergency response call flow for an emergency service provider, wherein the emergency response call flow phone number is associated with both the emergency response call flow and the emergency service provider. In some embodiments, the emergency response call flow is stored within an emergency response call flow database comprising a plurality of emergency response call flows associated with a respective plurality of emergency service providers. In some embodiments, the method further comprises retrieving, using the emergency response call flow phone number, the emergency response call flow from the emergency response call flow database. In some embodiments, the method further comprises providing an emergency response call flow editor application comprising a graphical user interface within which the emergency response call flow is defined. In some embodiments, the emergency response phone number is associated with an administrative line, and the method further comprises redirecting, based on the emergency data extracted from the voice-based communication session, the phone call to a second emergency response phone number.

In another aspect, disclosed herein is a method for generating and delivering a high priority alert to an emergency service provider (ESP), the method comprising: receiving an emergency alert comprising a high priority indication; generating a high priority digital emergency service request for the emergency alert; determining an ESP appropriate to receive the high priority digital emergency service request; transmitting the high priority digital emergency service request to the ESP through an emergency response application executed on a computing device associated with the ESP; and prompting the emergency response application to present an emphasized graphical user interface element associated with the high priority digital emergency service request within a graphical user interface of the emergency response application. In some embodiments, determining an ESP appropriate to receive the high priority digital emergency service request comprises: retrieving a plurality of geofences associated with a plurality of ESPs comprising the ESP; and determining that a location associated with the high priority digital emergency service request falls within a geofence associated with the ESP. In some embodiments, the method further comprises receiving the location associated with the high priority digital emergency service request and wherein the location associated with the high priority digital emergency service request is generated by an alert source that generated the emergency alert for which the high priority digital emergency service request was generated. In some embodiments, the graphical user interface of the emergency response application comprises a list of digital emergency service requests and an interactive map and further comprising displaying the high priority digital emergency service request within the list of digital emergency service requests and a location associated with the high priority digital emergency service request as an alert location associated with the high priority digital emergency service request within the interactive map. In some embodiments, the list of digital emergency service requests comprises one or more digital emergency service requests that are not high priority digital emergency service requests. In some embodiments, prompting the emergency response application to present an emphasized graphical user interface element associated with the high priority digital emergency service request within a graphical user interface of the emergency response application comprises prompting the emergency response application to display a graphical user interface element associated with the high priority digital emergency service request in a different shape, size, or color than that of a corresponding graphical user interface element associated with the one or more digital emergency service requests that are not high priority digital emergency service requests. In some embodiments, the list of digital emergency service requests comprises one or more digital emergency service requests that are not high priority digital emergency service requests; wherein the interactive map displays one or more alert locations associated with the one or more digital emergency service requests that are not high priority digital emergency service requests; and wherein prompting the emergency response application to present an emphasized graphical user interface element associated with the high priority digital emergency service request within a graphical user interface of the emergency response application comprises prompting the emergency response application to display the alert location associated with the high priority digital emergency service request in a different shape, size, or color than that of the one or more alert locations associated with the one or more digital emergency service requests that are not high priority digital emergency service requests. In some embodiments, the list of digital emergency service requests comprises one or more digital emergency service requests that are not high priority digital emergency service requests; wherein each of the one or more digital emergency service requests that are not high priority digital emergency service requests are displayed within the list of digital emergency service requests alongside a respective emergency type icon; and wherein prompting the emergency response application to present an emphasized graphical user interface element associated with the high priority digital emergency service request within a graphical user interface of the emergency response application comprises prompting the emergency response application to display the high priority digital emergency service request within the list of digital emergency service requests alongside a high priority emergency type icon that has a different shape, size, or color than that of emergency type icons associated with the one or more digital emergency service requests that are not high priority digital emergency service requests. In some embodiments, prompting the emergency response application to present an emphasized graphical user interface element associated with the high priority digital emergency service request within a graphical user interface of the emergency response application comprises prompting the emergency response application to display a new high priority alert icon within the graphical user interface of the emergency response application. In some embodiments, the method further comprises prompting a monitoring center system to call the ESP in regard to the high priority digital emergency service request in parallel with transmitting the high priority digital emergency service request to the ESP. In some embodiments, the method further comprises transmitting the emergency alert or the high priority digital emergency service request to the monitoring center system. In some embodiments, the method further comprises determining the monitoring center system as appropriate for responding to the high priority digital emergency service request. In some embodiments, determining the monitoring center system as appropriate for responding to the high priority digital emergency service request comprises retrieving a plurality of geofences associated with a plurality of monitoring center systems comprising the monitoring center system and determining that a location associated with the high priority digital emergency service request falls within a geofence associated with the monitoring center system. In some embodiments, the emergency alert is generated by an alert source associated with a private security system; and determining the monitoring center system as appropriate for responding to the high priority digital emergency service request comprises determining that the monitoring center system is associated with the private security system.

In some aspects of the disclosure, a method for facilitating communications between monitoring centers and private security systems, the method comprising: receiving an emergency alert from a private security system, the emergency alert comprising emergency data comprising a user identifier and an emergency location; after receiving the emergency alert, determining that a monitoring account associated with the user identifier has not been created for the user identifier; initiating creation of the monitoring account associated with the user identifier, wherein the monitoring account is associated with a monitoring center system and comprises the user identifier and the emergency location; and transmitting at least a portion of the emergency data to the monitoring center system for display within a graphical user interface provided by a software application executed on a computing device associated with the monitoring center system.

Emergency Response Data Platform

In various embodiments, disclosed herein are devices, systems, and methods for managing emergency data and emergency communications for more effective and efficient emergency response. FIG. 1 depicts a diagram of an emergency response data platform in accordance with one embodiment of the present disclosure. In a simple example, in some embodiments, an emergency data source 110 transmits emergency data to an emergency response data platform (ERDP) 120 before, during, or after an emergency, and the emergency response data platform shares the emergency data with an emergency service provider (ESP) 130. The ESP 130 can then use the emergency data to more efficiently and effectively respond to corresponding emergencies. In some embodiments, the emergency data source 110 is a third-party server system (hereinafter, "third-party server"). For example, in some embodiments, the emergency data source 110 is a third-party server (e.g., a backend server system) of a technology company that produces software for electronic devices, such as Apple or Google. In some embodiments, the emergency data source 110 is an electronic device. For example, the emergency data source 110 may be a communication device (e.g., a walkie talkie or two-way radio, a mobile or cellular phone, a computer, a laptop, etc.), a wearable device (e.g., a smartwatch), or an Internet of Things (IoT) device such as a home assistant (e.g., an Amazon Echo) or a connected smoke detector (e.g., a Nest Protect smoke and carbon monoxide alarm). In some embodiments, an electronic device includes a display, a processor, a memory (e.g., an EPROM memory, a RAM, or a solid-state memory), a network component (e.g., an antenna and associated components, Wi-Fi adapters, Bluetooth adapters, etc.), a data storage, a user interface, an emergency alert program, one or more location components, and one or more sensors. In some embodiments, the processor is implemented as one or more microprocessors, microcomputers, microcontrollers, digital signal processors, central processing units, state machines, logic circuitries, and/or devices that manipulate signals based on operational instructions. Among other capabilities, the processor is configured to fetch and execute computer-readable instructions stored in the memory.

In some embodiments, the display is part of the user interface (e.g., a touchscreen is both a display and a user interface in that it provides an interface to receive user input or user interactions). In some embodiments, the user interface includes physical buttons such as an on/off button or volume buttons. In some embodiments, the display and/or the user interface comprises a touchscreen (e.g., a capacitive touchscreen), which is capable of displaying information and receiving user input. In some embodiments, the communication device includes various accessories that allow for additional functionality. In some embodiments, these accessories (not shown) include one or more of the following: a microphone, a camera, speaker, a fingerprint scanner, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage includes a location data cache and a user data cache. In some embodiments, the location data cache is configured to store locations generated by the one or more location components.

In some embodiments, the emergency alert program is a web application or mobile application. In some embodiments, the emergency alert program is configured to record user data, such as a name, address, or medical data of a user associated with the electronic device. In some embodiments, the emergency alert program is configured to detect when an emergency request is generated or sent by the electronic device (e.g., when a user uses the electronic device to make an emergency call). In some embodiments, in response to detecting an emergency request generated or sent by the electronic device, the emergency alert program is configured to deliver a notification to the ERDP 120. In some embodiments, the notification is an HTTP post containing information regarding the emergency request. In some embodiments, the notification includes a location (e.g., a device-based hybrid location) generated by or for the electronic device. In some embodiments, in response to detecting an emergency request generated or sent by the electronic device, the emergency alert program is configured to deliver user data to the ERDP 120.

In some embodiments, the emergency response data platform (ERDP) 120 includes an ERDP operating system, an ERDP CPU, an ERDP memory unit, an EMS communication element, and one or more software modules. In some embodiments, the ERDP CPU is implemented as one or more microprocessors, microcomputers, microcontrollers, digital signal processors, central processing units, state machines, logic circuitries, and/or devices that manipulate signals based on operational instructions. Among other capabilities, the ERDP CPU is configured to fetch and execute computer-readable instructions stored in the ERDP memory unit. The ERDP memory unit optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The ERDP memory unit optionally includes modules, routines, programs, objects, components, data structures, etc., which perform particular tasks or implement particular abstract data types.

In some embodiments, the ERDP 120 includes one or more ERDP databases, one or more servers, and a clearinghouse 121. In some embodiments, the clearinghouse 121, as described in further detail below, is an input/output (I/O) interface configured to manage communications and data transfers to and from the ERDP 120 and external systems and devices. In some embodiments, the clearinghouse 121 includes a variety of software and hardware interfaces, for example, a web interface, a graphical user interface (GUI), and the like. The clearinghouse 121 optionally enables the ERDP 120 to communicate with other computing devices, such as web servers and external data servers. In some embodiments, the clearinghouse 121 facilitates multiple communications within a wide variety of networks and protocol types, including wired networks, for example, LAN, cable, etc., and wireless networks, such as WLAN, cellular, or satellite. In some embodiments, the clearinghouse 121 includes one or more ports for connecting a number of devices to one another or to another server. In some embodiments, the clearinghouse 121 includes one or more sub-clearinghouses, such as location clearinghouse and additional data clearinghouse, configured to manage the transfer of locations and additional data, respectively. In some embodiments, the ERDP 120 additionally includes a user information module that receives and stores user information (e.g., personal information, demographic information, medical information, location information, etc.) within the ERDP 120. In some embodiments, users can submit user information through a website, web application, or mobile application, such as during a registration process for an emergency response application. In some embodiments, when the ERDP 120 receives emergency data including user information, such as through an emergency alert received by the clearinghouse 121 (as described below), the ERDP 120 stores the user information in the user information module. In some embodiments, user information stored within the user information module is received by the ERDP 120 from a third-party server system, as described above. In some embodiments, user information stored within the user information module is associated with an identifier of a user or an electronic device associated with a user, such as a phone number or an email address. APIs may be used to query data from the clearinghouse. For example, LIS App for querying location information and ADR App for querying additional data about an emergency. A query from an ESP agency may be received via such API and the response will be returned in response to the query and may be displayed within the GUI at the ESP.

As mentioned above, in some embodiments, the emergency response data platform (ERDP) 120 shares emergency data with an emergency service provider (ESP) 130. In some embodiments, an ESP 130 (e.g., a public safety answering point (PSAP)) is a system that includes one or more of a display, a user interface, at least one central processing unit or processor, a network component, an audio system, (e.g., microphone, speaker and/or a call-taking headset), and an ESP application (e.g., a computer program) such as a computer aided dispatch (CAD) program or an emergency call taking program (also referred to as customer premise equipment or CPE). In some embodiments, the ESP application comprises a database of emergency responders, such as medical assets, police assets, fire response assets, rescue assets, safety assets, etc. In some embodiments, the ESP application is an emergency response application provided by the ERDP 120, as described below. In some embodiments, the ESP application is installed on a computing device at the ESP 130 and comprise one or more software modules, such as a call taking module, an ESP display module, a supplemental or updated information module, or a combination thereof. In some embodiments, the ESP application displays the information on a map (e.g., on the display). In some embodiments, the ESP application is accessible or executable on mobile devices associated with ESP 130, such as first responder devices. In some embodiments, the ESP application is an emergency response application provided by the ERDP 120, as described below.

Emergency Clearinghouse

In some embodiments, as mentioned above with respect to FIG. 1, an emergency response data platform (ERDP) 120 includes a clearinghouse 121 (also referred to as an "Emergency Clearinghouse") for receiving, storing, retrieving, and transmitting emergency data. In some embodiments, as depicted by FIG. 1, through the clearinghouse 121, the ERDP 120 can receive emergency data from an emergency data source 110 (as described above) and transmit the emergency data to an emergency data recipient, such as an emergency service provider (ESP) 130 (as described above). In this way, the ERDP 120 acts as a data pipeline between emergency data sources 110 and ESPs 130. The emergency data that passes through the clearinghouse 121 may include (but is not limited to) location data (e.g., fixed addresses or device-based hybrid locations generated in real time) and additional data (e.g., medical history, personal information, or contact information, etc.). In some embodiments, through the clearinghouse 121, the ERDP 120 transmits emergency data to ESPs 130 to aid the ESPs 130 in responding to emergencies. For example, location data may allow emergency responders to arrive at the scene of an emergency faster, and additional data may allow emergency responders to be better prepared for the emergencies that they face.

The clearinghouse 121 may receive emergency data in various ways. For example, in some embodiments, an emergency data source 110 can unilaterally transmit emergency data to the clearinghouse 121. For example, in one embodiment, an emergency alert is triggered by an electronic device manually (e.g., in response to the selection of a soft or hard emergency button) or automatically based on sensor data received by the electronic device (e.g., smoke alarms). The electronic device can then transmit the emergency alert and any associated data to the ERDP 120, such as to an endpoint provided by the clearinghouse 121. Or, for example, in some embodiments, after an emergency alert is received by the ERDP 120 from a first emergency data source, the ERDP 120 can query a second emergency data source for emergency data (e.g., emergency data associated with the emergency alert received from the first emergency data source). For example, the emergency alert received from the first emergency data source may include a user identifier (e.g., a telephone number or an email address) for an owner or user of the first emergency data source. The ERDP 120 can then query the second emergency data source with the user identifier to retrieve additional emergency data associated with the owner or user of the first emergency data source. In some embodiments, emergency data received by the ERDP 120 is received in a format that is compatible with industry standards for storing and sharing emergency data. In some embodiments, the ERDP 120 formats emergency data that it receives into a format that is compatible with industry standards. For example, in some embodiments, the emergency data is formatted to be compatible with National Emergency Number Association (NENA) standards. In some embodiments, emergency data is formatted by the ERDP 120 to be compliant with the Presence Information Data Format Location Object (PIDF-LO) standard. In some embodiments, emergency data (or emergency call data, as described below) is formatted by the ERDP to be compliant with the Emergency Incident Data Object (EIDO) standard. In some embodiments, emergency data received by the ERDP 120 is stored within one or more databases 125. In some embodiments, emergency data received by the ERDP 120 is associated with one or more identifiers, such as a device or user identifier.

The clearinghouse 121 may share emergency data in various ways. For example, in some embodiments, an emergency data recipient, such as an ESP 130, can query the ERDP 120 for emergency data. For example, in some embodiments, an ESP 130 can query the ERDP 120 with an emergency data request including a user identifier (e.g., a telephone number or an email address) to receive emergency data gathered or received by the ERDP 120 associated with the user identifier. Or for example, in some embodiments, an ESP 130 can query the ERDP 120 with a geospatial area to receive emergency data gathered or received by the ERDP 120 associated with the geospatial area. Alternatively, in some embodiments, the ERDP 120 can autonomously transmit emergency data to an emergency data recipient without first receiving a query from the emergency data recipient (also referred to as "pushing" emergency data, as opposed to emergency data being "pulled" with a query). In some embodiments, the ERDP 120 pushes emergency data to an emergency data recipient using an emergency data subscription system. Using the emergency data subscription system, an emergency data recipient can subscribe to the clearinghouse 121 for a particular device identifier, user identifier, ESP account, or geospatial area. After subscribing to a subscription, the emergency data recipient may automatically receive updates regarding the subscription without first sending a query for emergency data. For example, if an ESP 130 subscribes to a phone number, whenever the ERDP 120 receives updated emergency data associated with the phone number, the clearinghouse 121 can instantly and automatically transmit the updated emergency data associated with the phone number to the ESP 130.

Emergency Data Geofencing

In some embodiments, a geofence system 122 is applied to egress from the clearinghouse 121 or the ERDP 120 to protect sensitive emergency data from being shared with unintended recipients. For example, the geofence system 122 may check the authorization of a requesting agency to see if the emergency location is within the jurisdictional area of the requesting agency. As depicted in FIG. 1, in some embodiments, when emergency data (e.g., an emergency location or additional data) is received by the ERDP 120 from an emergency data source 110 (ingress data), the emergency data is first filtered via the geofence system 122 before being ingested by the clearinghouse 121 (not shown). Similarly, in some embodiments, when a query for emergency data is received by the ERDP 120 from an emergency data recipient (e.g., an ESP 130), the query is processed by the geofence system 122 before response emergency data is transmitted to the emergency data recipient. In some embodiments, the query comprising a user identifier (e.g., a phone number) is sent to a location app (e.g., LIS App), where the response comprises a location (e.g., a lat/long, an address) of an emergency. Although not shown, queries may be sent to an additional data app (e.g., ADR app) for additional information (e.g., user data, medical data, sensor data) about an emergency.

Generally, a geofence is a virtual perimeter that represents a real-world geographic area. A geofence can be dynamically generated—as in a radius around a point location—or a geofence can be a predefined set of boundaries (such as school zones or neighborhood boundaries). For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP) or a public safety service (PSS; e.g., a police department, a fire department, a federal disaster management agency, national highway police, etc.), which have jurisdiction over a designated area (sometimes, overlapping areas). Geofences are used to define the jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

In some embodiments, the ERDP 120 maintains a geofence database including one or more geofences associated with each ESP 130 that is or has ever been communicatively coupled to the ERDP 120. In some embodiments, a geofence associated with an ESP 130 may be submitted to the ERDP 120 by an administrator of the ESP 130, such as through an emergency response application (as described below) or via email. In some embodiments, when emergency data is received by the ERDP 120 the ERDP 120 identifies a location associated with the emergency data (e.g., an emergency location included in an emergency alert) and determines if the location is within the combined authoritative jurisdiction (i.e., within any one of the geofences stored in the geofence database). In some embodiments, if the location is not within the combined authoritative jurisdiction, the ERDP 120 rejects or drops the emergency data (also referred to as "ingress filtering"). In some embodiments, when the ERDP 120 receives a query for emergency data from an ESP 130, the ERDP 120 identifies a geofence associated with the ESP 130 and returns only emergency data associated with locations that are within the geofence associated with the ESP 130 (also referred to as "egress filtering). In some embodiments, geofences are used in routing emergency data that is pushed to an emergency data recipient. In some embodiments, example, as mentioned above, an emergency data recipient may subscribe to a geofence. Then, when the ERDP 120 receives emergency data associated with a location that is within the geofence to which the emergency data recipient has subscribed, the ERDP 120 can instantly and automatically push the emergency data to the emergency data recipient.

Emergency Response Application

As mentioned above, in some embodiments, data and information is shared between the emergency response data platform (ERDP) and an emergency service provider (ESP) through an emergency response application. In some embodiments, as described in further detail below, the emergency response application may additionally be provided to an ESP to: a) facilitate communications between the ESP and an emergency caller (e.g., a person requesting emergency assistance) or b) facilitate communications between the ESP and one or more other ESPs. In some embodiments, the emergency response application is a software application either installed on a computing device at the ESP or accessed via the internet through a web browser on the computing device (e.g., the emergency response application is hosted on a cloud computing system by the ERDP). In some embodiments, the emergency response application functions to both facilitate a two-way communication link between the ERDP and the ESP and visualize data (e.g., emergency data) received by the ESP from the ERDP. The emergency response application optionally includes various components, such as a front-end application (hereinafter "graphical user interface" or "GUI"), a backend application, an authorization module, and a user database. In some embodiments, the emergency response application additionally or alternatively includes a credential management system or a geofence system (which may include or be otherwise communicatively coupled to a credentials database or a geofence database). In some embodiments, the credential management system and the geofence system are external to the emergency response application and communicatively coupled to the emergency response application (e.g., the credential management system or geofence system can be housed or hosted on a cloud computing system by the ERDP). Any or all of the components of the emergency response application may be hosted on a cloud computing system by the ERDP, a computing device at an ESP, or some combination thereof.

In some embodiments, the emergency response application is a webpage or web application that can be accessed through an internet or web browser. In such embodiments, the emergency response application can be quickly and easily integrated into the systems used by emergency service providers (ESPs), such as public safety answering points (PSAPs), because accessing and using emergency response application requires no additional software or hardware outside of standard computing devices and networks. As previously discussed, one of the greatest hinderances that PSAPs face in providing emergency assistance to people experiencing emergency situations is in acquiring accurate locations of the emergencies and the people involved, because PSAPs are currently typically limited to verbally asking for and verbally receiving locations from callers. In some embodiments, the clearinghouse is capable of receiving accurate locations (as well as additional emergency data, as described above) from electronic devices such as smartphones and delivering the accurate locations to the appropriate PSAPs during emergency situations. Therefore, it is advantageous to provide the emergency response application to PSAPs in the form of a webpage accessible through a standard web browser, in order to provide the potentially life-saving information stored within the clearinghouse to those capable of providing emergency assistance as quickly and easily as possible. However, in some embodiments, the emergency response application is a software application installed on a computing device at an ESP. The emergency response application may be provided by the ERDP or by a third-party.

Figure 2:
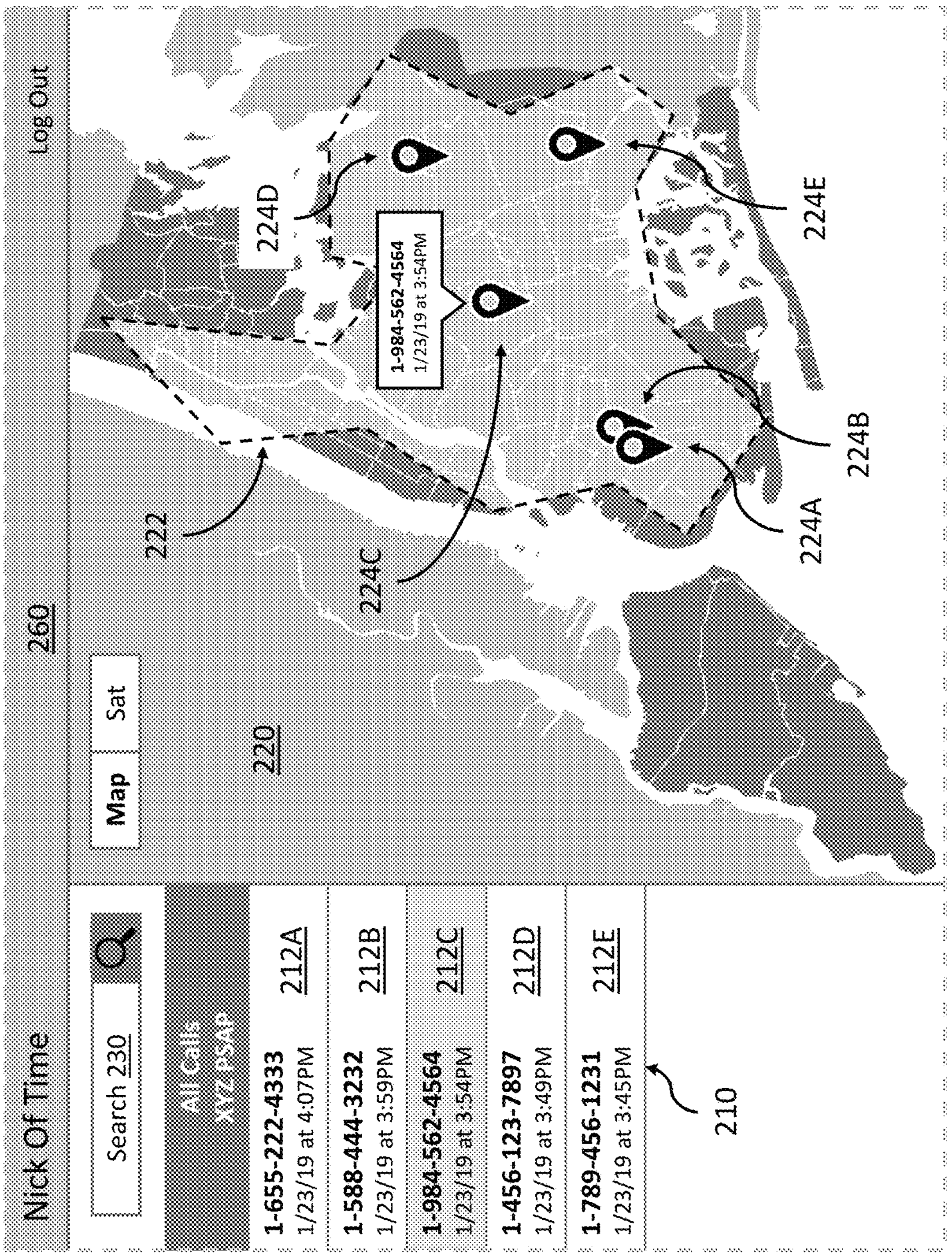
FIG. 2 illustrates a graphical user interface provided by an emergency response application, in accordance with some embodiments.

FIG. 2 illustrates a graphical user interface (GUI) provided by an emergency response application 260, in accordance with some embodiments. In some embodiments, the GUI provides interactive elements that allow a user at an ESP to receive data from the ERDP, visualize data received from the ERDP, and transmit data to the ERDP. For example, in some embodiments, the GUI includes an entry field 230 through which a user can submit a device identifier, such as by typing or pasting the device identifier into the entry field 230. In some embodiments, after submitting a device identifier through the entry field 230, the user can prompt the emergency response application to generate and send an emergency data request by selecting a search button. The emergency response application 260 then generates an emergency data request including the device identifier and any other necessary information (e.g., a temporary access token) and transmits the emergency data request to the ERDP. The ERDP can then return any available emergency data associated with the device identifier to the emergency response application 260, as described above and below. In another example, in some embodiments, the emergency response application 260 can automatically receive emergency data from the ERDP for emergencies relevant to an ESP (e.g., emergencies located within the jurisdiction of the ESP) without requiring a user to generate an emergency data request, as described above and below. After receiving emergency data from the ERDP, the emergency response application 260 can then visualize the emergency data within the GUI of the emergency response application 260. For example, in some embodiments, the emergency response application 260 includes a list of incidents 210 and an interactive map 220, as illustrated by FIG. 2. As shown, an example display at a PSAP is depicted with two queues-one queue may show calls coming into the PSAP ("All Calls") and another queue specific to the call taker/dispatcher position "My Calls." In some embodiments, when the emergency response application 260 receives a location (e.g., an emergency location) and a device identifier associated with an emergency occurring within the jurisdiction 222 of the receiving ESP, the emergency response application 260 displays the location associated with the emergency within the interactive map 220 as a location marker 224 (also referred to as an "incident location") and displays the device identifier associated with the emergency within the list of incidents 210 as an incident 212.

In addition to emergency locations, the emergency response application 260 can receive and visualize numerous types of emergency data from the ERDP. For example, the emergency response application 260 can receive additional data regarding an emergency, such as demographic or medical data associated with a person involved in the emergency (e.g., an emergency caller). In another example, the emergency response application 260 can receive data from sensors associated with the emergency, such as heart-rate data collected by a sensor on an emergency caller's smartwatch. Or, for example, the emergency response application 260 can receive data regarding emergency response assets available for an emergency, as described below. In some embodiments, the emergency response application receives and visualizes messages received from emergency callers or other ESPs, as described below. The emergency response application 260 can visualize any emergency data received from the ERDP within the GUI of the emergency response application.

Emergency Data Transmission

Figure 3A:
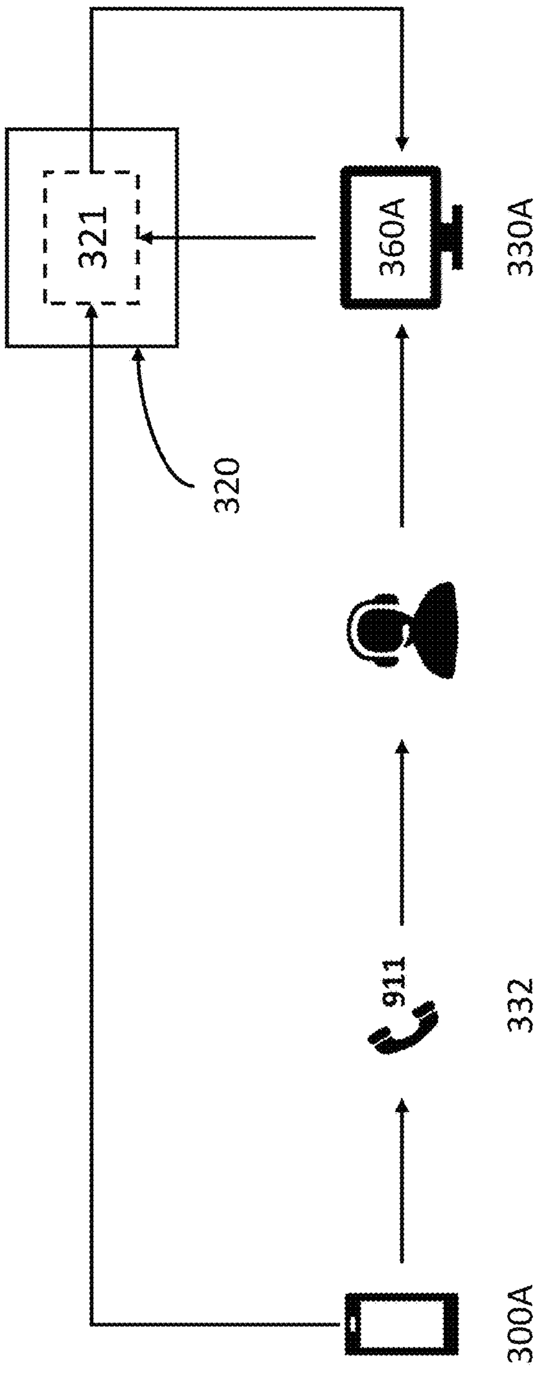
FIG. 3A depicts systems and processes for receiving and transmitting emergency data by an emergency response data platform, in accordance with some embodiments.
Figure 3B:
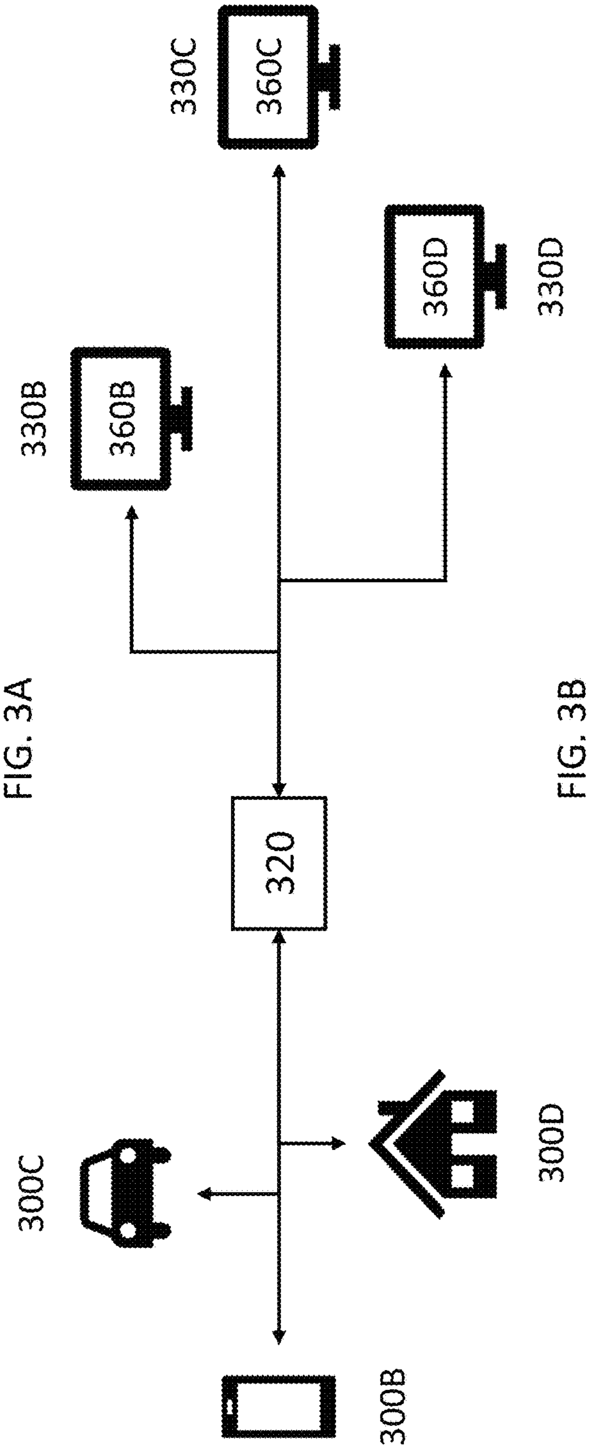
FIG. 3B depicts systems and processes for receiving and transmitting emergency data by an emergency response data platform, in accordance with some embodiments.

FIGS. 3A and 3B depict systems and processes for receiving and transmitting emergency data by an emergency response data platform, in accordance with some embodiments of the present disclosure. As described above, in some embodiments, an emergency response data platform (ERDP) maintains a clearinghouse that obtains and shares emergency data to aid emergency service providers (ESPs) in responding to emergencies via queries and responses as shown in FIG. 1. In another example, as depicted in FIG. 3A, during an emergency, an ESP 330A can send a query for emergency data (also referred to as an "emergency data request") to the ERDP 320 (e.g., through an emergency response application 360A, as described above) for a particular emergency, and, in response, the ERDP 320 can send any available emergency data associated with the emergency back to the ESP 330A (such as through emergency response application 360A). In some embodiments, as described above, the emergency response application 360A includes an identifier associated with an emergency alert in the emergency data request. The ERDP 320 can then use the identifier associated with the emergency alert to retrieve emergency data associated with the emergency alert from the clearinghouse 321. For example, as described above, an ESP 330A (e.g., a public safety answering point (PSAP)) can receive an emergency alert in the form of a 9-1-1 phone call 332 (representative of an emergency or potential emergency) from a mobile phone 300A associated with a phone number (e.g., (555) 555-5555). The ESP 330A can then send an emergency data request including the phone number (i.e., the identifier associated with the emergency alert) to the ERDP 320, which can then retrieve any emergency data within the clearinghouse 321 associated with the phone number and return the available emergency data to the requesting ESP 330A. This process of returning emergency data to an ESP in response to an emergency data request is referred to as "pulling" emergency data from the clearinghouse.

As described above, in some embodiments, the emergency response data platform (ERDP) can "push" emergency data from the Emergency Clearinghouse to emergency service providers (ESPs), such as by using an emergency data subscription system (hereinafter, "subscription system"). FIG. 3B depicts a flow diagram of a process for pushing emergency data from the Emergency Clearinghouse to one or more ESPs. In some embodiments, a member of an ESP (e.g., a PSAP staff member) logs into the emergency response application 360B at an ESP system 330B (e.g., a computing device associated with the ESP) by accessing the emergency response application 360B (e.g., by navigating to the emergency response application 360B through a web browser) and submitting their login information through the GUI of the emergency response application 360B. In some embodiments, when the ESP member logs into the emergency response application 360B by submitting their login information, the emergency response application 360B or ERDP 320 then determines an ESP account ID associated with the ESP member's account and establishes a persistent or active communication link (e.g., a websocket connection) with the ESP system 330B, thereby automatically subscribing the ESP console to the ESP account ID for the duration of their login session. Then, as described above, when the ERDP 320 receives an emergency alert including a location (e.g., when an emergency call is made from a communication device 300B and sends an emergency alert to the ERDP 320 including a location generated by the communication device 300B), the ERDP 320 retrieves a geofence associated with every ESP registered with the ERDP 320 and determines if the location falls within any of the geofences. In response to determining that the location falls within a geofence associated with the ESP associated with the ESP account ID, the ERDP 320 then associates the location with the ESP account ID, determines if there are any active or persistent communication links between the ERDP 320 and any computing devices subscribed to the ESP account ID. In this instance, because the ESP system 330B is subscribed to the ESP account ID and actively linked to the ERDP 320 through the persistent or active communication link, the ERDP 320 automatically pushes (e.g., from the clearinghouse) the emergency alert or emergency data associated with the emergency alert (e.g., the location, a phone number, etc.) to the ESP system 330B for display within the emergency response application 360B. In some embodiments, emergency alerts or emergency data associated with emergency alerts that have been pushed to an ESP are displayed within a jurisdictional awareness view, as described below.

For example, ESP system 330B and ESP system 330C are two different ESP consoles associated with the same ESP (e.g., two computing devices at the same public safety answering point (PSAP)), PSAP A. ESP system 330D is associated with a second ESP, PSAP B. One day, PSAP call-takers access and successfully log into the emergency response application 360 (emergency response application 360B-360D) at each of the three ESP system (ESP systems 330B-330D), thereby establishing three separate active communication links, one active communication link between the ERDP 320 and each of the three ESP consoles. The ESP consoles are automatically subscribed by the ERDP 320 to the ESP account IDs associated with their respective ESPs (ESP ID A for PSAP A and ESP ID B for PSAP B). Both PSAP A and PSAP B are associated with only one geofence, geofence A and geofence B, respectively. Geofences A and B do not overlap. The geofences have previously been tagged within the ERDP 320 with their respective ESP account IDs (e.g., during a registration process for the emergency response application).

Later that day, an emergency call is made from communication device 300B, which causes communication device 300B to generate a first emergency alert including a first location of the communication device 300B and transmit the first emergency alert to the ERDP 320. When the ERDP 320 receives the first emergency alert, the ERDP 320 retrieves some or all of the geofences stored within the ERDP 320 and determines if the first location falls within any of the geofences stored within the ERDP 320. In this example, the ERDP 320 determines that the first location falls within geofence A, associated with PSAP A. In response, the ERDP 320 tags the first location with the ESP account ID associated with geofence A, ESP ID A. The ERDP 320 then determines if there are any active communication links between the ERDP and any ESP consoles subscribed to ESP ID A and automatically pushes (e.g., from the clearinghouse) the first emergency alert to those ESP consoles. In this example, both ESP system 330B and ESP system 330C are subscribed to ESP ID A, so the ERDP 320 automatically pushes the first emergency alert to both ESP system 330B and ESP system 330C for display within emergency response applications 360B and 360C, respectively, such as through a jurisdictional awareness view (as described below). The first location does not fall within geofence B, because geofence A and geofence B do not overlap, so the first emergency alert is not pushed to ESP system 330D, even though an active communication link has been established between the ERDP 320 and ESP system 330D.

Three minutes later, the ERDP 320 receives an emergency alert from electronic device 300D (e.g., a home security system) including a second location of the electronic device 300D. When the ERDP 320 receives the second emergency alert, the ERDP again retrieves some or all of the geofences stored within the ERDP 320 and determines if the second location falls within any of the geofences stored within the ERDP 320. In this example, the ERDP 320 determines that the second location falls within geofence B, associated with PSAP B. In response, the ERDP 320 tags the second location within the ESP account associated with geofence B, ESP ID B and automatically pushes the second emergency alert to ESP system 330D for display within emergency response application 360D, because ESP system 330D has an active communication link established with the ERDP 320 and ESP system 330D is subscribed to ESP ID B. The ERDP 320 does not push the second emergency alert to ESP system 330B or ESP system 330C. Although ESP system 330B and ESP system 330C have active communication links established with the ERDP 320, they are not subscribed to ESP ID B, and geofence A and geofence B do not overlap, meaning the second location does not fall within geofence A. Two minutes after that, the ERDP 320 receives an emergency alert from electronic device 300C (e.g., an intelligent vehicle system) including a third location of the electronic device 300C. The ERDP 320 determines that the third locations falls within geofence A (like the first location included in the first emergency alert) and thus automatically pushes the third emergency alert to both ESP system 330B and ESP system 330C for display within emergency response application 360B and 360C. In some embodiments, emergency response application 360B and emergency response application 360C display the first emergency alert and the third emergency alert simultaneously, such as through a jurisdictional awareness view, as described below.

Jurisdictional Awareness View

In some embodiments, the systems, applications, servers, devices, methods, and media of the instant application provide a jurisdictional awareness view within the emergency response application. In some embodiments, the jurisdictional awareness view enables an ESP to view one or more ongoing or recently received emergency alerts (e.g., emergency calls) within one or more geofenced jurisdictions. FIG. 2 illustrates the jurisdictional awareness view displayed within the emergency response application, in accordance with one embodiment of the present disclosure. In some embodiments, the jurisdictional awareness view includes one or more lists of incidents 210 that displays one or more incidents 212 associated with one or more device identifiers (e.g., phone numbers, IP addresses). Here, the display includes two lists—one includes all calls received by an agency and another one is for the calls received by a particular position (which is a subset of all calls queue). In some embodiments, the jurisdictional awareness view additionally or alternatively includes an interactive map 220 that displays one or more incident locations 224 associated with the one or more incidents 212 associated with the one or more device identifiers, as described below. In some embodiments, the jurisdictional awareness view displays incidents and incident locations only for emergencies occurring within the jurisdiction 222 of the ESP at which the emergency response application 260 is being accessed.

For example, in the example illustrated in FIG. 2, an ESP has accessed an emergency response application 260 provided by the ERDP. In this example, the ERDP has pushed emergency data associated with five different emergency alerts to the ESP (as described above) through the emergency response application 260. Accordingly, the emergency response application 260 displays five different incidents 212 (e.g., incidents 212A-212E) within the list of incidents 210 and five corresponding incident locations 224 (e.g., incident locations 224A-224E) within the interactive map 220. As illustrated by FIG. 2, in some embodiments, incidents 212 and incident locations 224 may be selected or hovered over to highlight a particular incident 212. In this example, incident 212C and its corresponding incident location 224C have been selected and highlighted. In some embodiments, selecting a particular incident 212 or corresponding incident location 224 prompts the emergency response application 260 to display additional information associated with the particular incident 212 (e.g., additional emergency data or information associated with the emergency alert for which the particular incident 212 was created) within a single-incident view that displays only emergency data associated with the particular incident (as described below). Because the jurisdictional awareness view can show an ESP numerous incidents 212 occurring within the jurisdiction 222 of the ESP simultaneously, the jurisdictional awareness view can provide the ESP with situational awareness that the ESP otherwise would not have. For example, with the knowledge that incidents 212A and 212B originated in close proximity and at approximately the same time, an ESP personnel (e.g., a call taker at a public safety answering point) can determine that the two incidents may be related.

Emergency Flow Management System

In some embodiments, as depicted in FIG. 1, the emergency response data platform (ERDP) includes an emergency flow management system (EFMS) 123. Generally, the EFMS functions to provide digital connectivity to emergency services to devices and applications otherwise unable to access them. Using the EFMS, an administrator of a device or application can access an emergency flow editor (also referred to as an "emergency console"), select a default emergency flow or define their own custom emergency flow, and receive an emergency flow trigger script including an emergency flow identifier (also referred to as an "emergency flow ID") unique to their chosen emergency flow. The emergency flow trigger script can then be quickly and easily integrated into the administrator's device or application. When the emergency flow trigger script is executed by the administrator's device or application, an electronic notification including the emergency flow ID is transmitted to an endpoint provided by the EFMS, which prompts the EFMS to execute the associated emergency flow chosen by the administrator.

An emergency flow may prompt the EFMS to perform a variety of functions, including (but not limited to) transmitting a notification to an emergency contact, transmitting a request for emergency service to an emergency service provider (ESP), establishing an emergency communication bridge to facilitate a Voice over Internet Protocol (VOIP) call between two or more participants, transmitting emergency data to one or more emergency data recipients, or any combination thereof, depending on the administrator's intended use case. In some embodiments, the emergency console provides a set of default emergency flows to choose from. In some embodiments, the emergency console provides a graphical user interface (GUI) that a user (e.g., an administrator of a device or application) can use to create a custom emergency flow. In some embodiments, the GUI of the emergency console allows a user to create a custom emergency flow by dragging and dropping (or otherwise manipulating) graphical representations of emergency flow building blocks into various arrangements, which prompts the EFMS to automatically generate an emergency flow according to the arrangement of the emergency flow building blocks. In some embodiments, an emergency flow building block is defined by a short script (e.g., a compilation or block of written programming commands), written in a programming language, that contains instructions for executing one or more functions. In some embodiments, when a user arranges one or more emergency flow building blocks within the GUI of the emergency console, the EFMS generates an emergency flow according to the arrangement of the one or more emergency flow building blocks by compiling the short scripts defining each of the one or more emergency flow building blocks into a single emergency flow script. In some embodiments, the emergency console allows a user to edit or create an emergency flow script directly (e.g., without the use of graphical representations of emergency flow building blocks, such as by inputting written program commands directly into a programming language input field).

Figure 4:
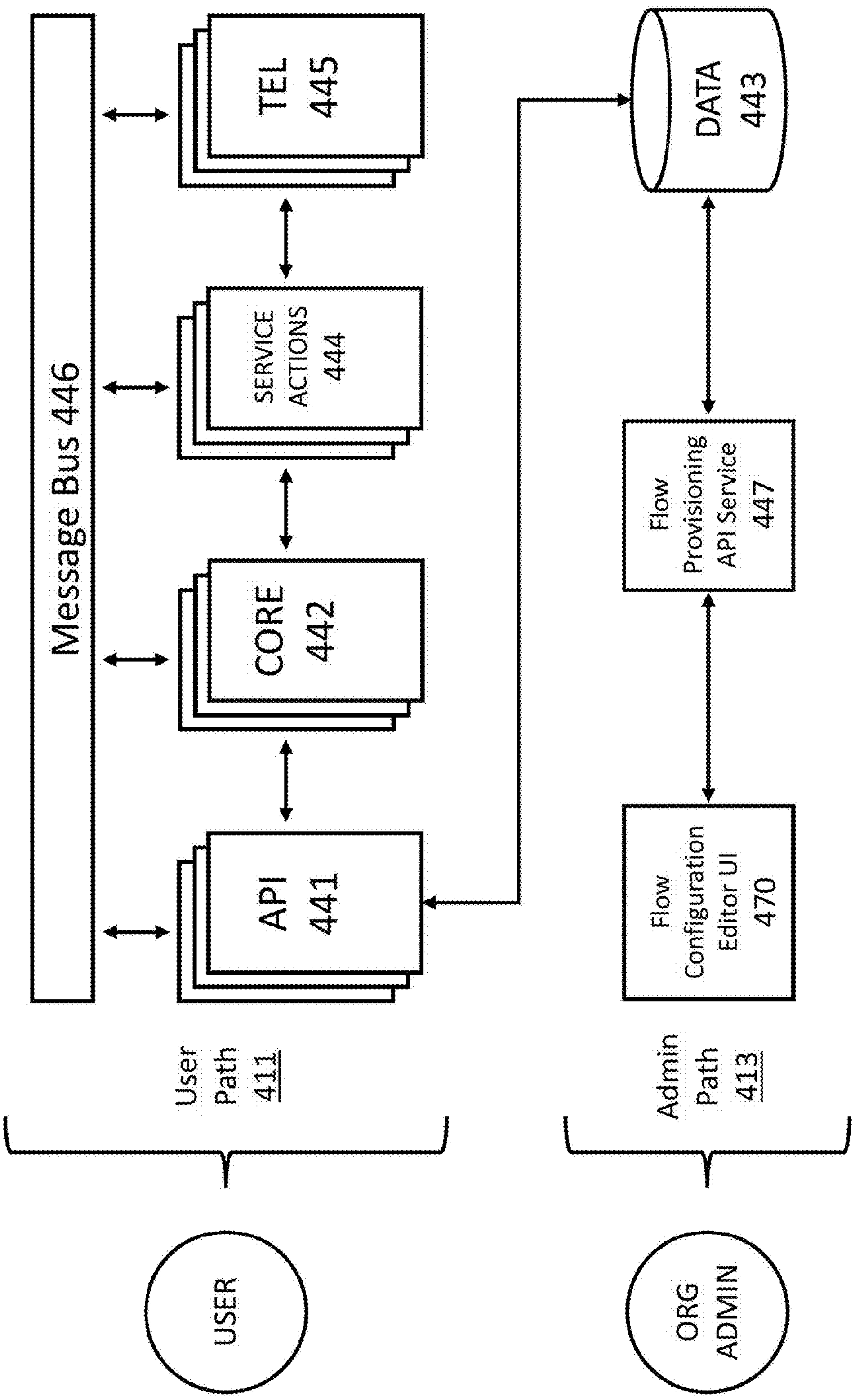
FIG. 4 depicts a diagram of an emergency flow management system, in accordance with some embodiments.

FIG. 4 depicts a non-limiting embodiment of an emergency flow management system (EFMS). As depicted in FIG. 4, in some embodiments, the EFMS contains two pathways: an administrator pathway 413 (admin path) and a user pathway 411 (user path). The admin path 413 is initiated by an administrator of a device or application, as described above. In the admin path, the administrator accesses an emergency flow editor 470 to configure an emergency flow to fit the needs of the administrator's product or service. In some embodiments, in the admin path, an emergency flow provisioning module 447 compiles the emergency flow into an emergency flow script, assigns an emergency flow ID to the emergency flow script, and stores the emergency flow script within a data module 443. Finally, the EFMS provides the administrator with an emergency flow trigger script including the emergency flow ID, which the administrator can integrate into their device or application. The user path 411 is initiated by a user, or a device associated with a user, of the product or service provided by the administrator. In some embodiments, in the user path, the API module 441 receives an electronic notification including the emergency flow ID from a device or application that the administrator has integrated the emergency flow trigger script into. In some embodiments, the API module 441 then references the data module 443 with the emergency flow ID to identify the emergency flow script corresponding to the emergency flow ID and delivers the emergency flow script to the core module 442 for execution. In some embodiments, the core module 442 then employs the service actions module 444 and the telephony module 445 to execute the various functions included in the emergency flow script. In some embodiments, the API module 441, the core module 442, the service actions module 444, and the telephony module 445 are separately and simultaneously in communication with the message bus 446, which facilitates and coordinates synchronous and asynchronous communication functions (e.g., a communication bridge, text messages, etc.) between the modules and various users and accounts (e.g., a user, emergency contacts, emergency responders, etc.). In some embodiments, the electronic notification including the emergency flow ID also contains emergency data, such as user data, location data, or any other additional data, according to the administrator's use case. In some embodiments, emergency data ingested by the EFMS is received and shared by the emergency clearinghouse, as described above.

Figure 5:
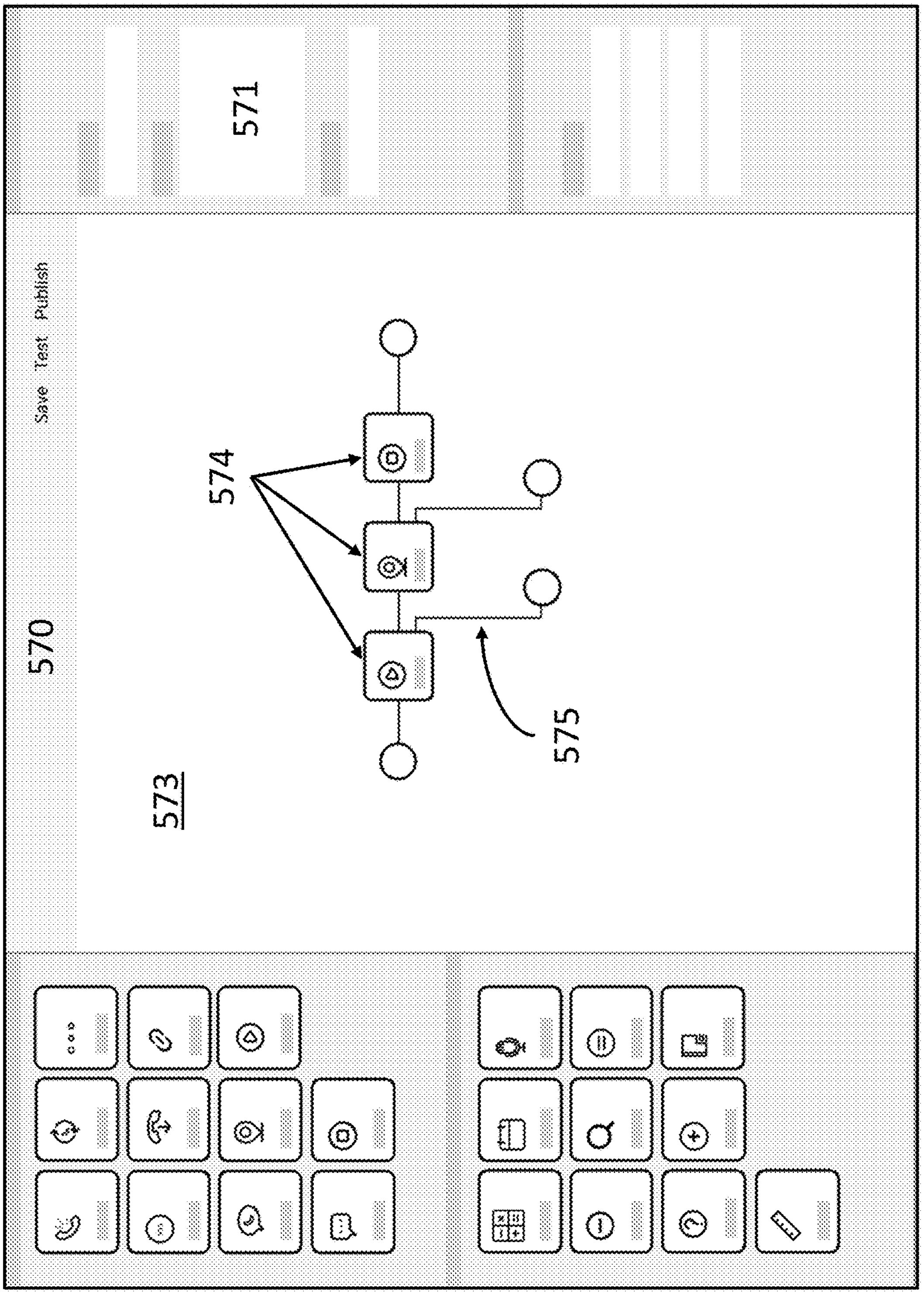
FIG. 5 illustrates a graphical user interface of an emergency flow configuration editor, in accordance with some embodiments.

FIG. 5 depicts a view of an emergency flow configuration editor 570 (also referred to as the Emergency Console or an emergency flow editor). In some embodiments, the emergency flow editor 570 is used to configure customized emergency flows. In some embodiments, the emergency flow editor 570 includes a programming language input field 571 in which users manually program an emergency flow by inputting written programming commands to create a script (not shown; also referred to as an "emergency flow script") that defines the emergency flow. In some embodiments, the emergency flow editor additionally or alternatively includes a graphical user interface 573 (also referred to as an "interactive space") which users can use to visually assemble emergency flows by dragging and dropping (or otherwise manipulating) graphical representations of emergency flow building blocks 574 into various arrangements. In some embodiments, an emergency flow building block is defined by a short script (e.g., a compilation or block of written programming commands), written in a programming language, that contains instructions for executing various functions (also referred to as emergency response functions) relating to an emergency flow. A single emergency flow building block generally contains instructions relating to one emergency flow function, as will be described in greater detail, and generally does not represent an entire emergency flow. In some embodiments, an arrangement of emergency flow building blocks in the graphical user interface 573 automatically results in the creation of a script (e.g., an emergency flow script), which is optionally displayed in the programming language input field 571. In some embodiments, an emergency flow building block receives at least one input, performs at least one emergency response function based upon the at least one input, and generates at least one output. In some embodiments, at least one input for an emergency flow building block comprises an output received from another emergency flow building block. In some embodiments, adjacent emergency flow building blocks in an emergency flow script are connected such that an output of a preceding emergency flow building block forms an input for at least one succeeding emergency flow building block. In some embodiments, the emergency flow editor 570 includes either the programming language input field 571 or the graphical user interface 573, but not both. In some embodiments, the emergency flow editor includes both the programming language input field 571 and the graphical user interface 573. In some embodiments, the emergency flow editor 570 includes options or buttons to save, test, and publish an emergency flow. While users can use the emergency flow editor 570 to visually assemble customized emergency flows, the emergency flow editor 570 may additionally or alternatively allow users to access default or premade emergency flows provided by the emergency flow management system (EFMS).

In some embodiments, the Emergency Console allows a variety of customizable emergency flows between users, emergency contacts, emergency services, and related third parties by establishing a multitude of voice and data connections to Public Safety Answering Points (PSAPs) through a variety of trigger mechanisms. In some embodiments, the trigger mechanisms enable implementation in a variety of scenarios including software panic buttons (e.g., within mobile applications), remote activation by associated emergency contacts, dial-in activation (as described below), and others. The Emergency Console allows for the customization and generation of emergency flows while ensuring that the generated emergency flows comply with regulatory constraints (Federal, State or local laws, regulations, policies, best practices, etc.) applicable to the location and type of emergency. In some embodiments, the Emergency Console is a part of the EMS. In some embodiments, the Emergency Console is part of an ESP such as a PSAP. In some embodiments, the Emergency Console is operated on an emergency response server. In some embodiments, the EMS comprises an emergency response server. In some embodiments, the Emergency Console is a web interface that provides tools for generating and testing emergency flows. In some embodiments, the Emergency Console allows for emergency flows to be initiated via simple API triggers from any device.

As described above, in some embodiments, emergency flow building blocks 574 are visually arranged into an emergency flow within the graphical user interface 573 of the emergency flow editor 570. In some embodiments, the emergency flow building blocks are connected with one or more connectors 575. A single emergency flow building block 574 may be connected to a plurality of other emergency flow building blocks preceding the single emergency flow building block 574 and/or a plurality of other emergency flow building blocks succeeding the single emergency flow building block 574. In some embodiments, the emergency flow building blocks 574 and connectors 575 that make up an emergency flow define a pathway of execution for the emergency flow. In such embodiments, the emergency flow management system executes the emergency flow according to the pathway of execution defined by the emergency flow building blocks and connectors. In some embodiments, as described in further detail below, an emergency flow can be designed to automate some or all of the phone calls that a monitoring center must make in responding to an alarm. Such an emergency flow may be referred to as an "automated monitoring call flow." In some embodiments, as described in further detail below, an emergency flow can be designed to automate some or all of an intake process for an emergency service provider. Such an emergency flow may be referred to as an "emergency response call flow."

In some embodiments, the emergency flow editor 570 (e.g., the Emergency Console) contains a set of predefined emergency flow building blocks. Below is a non-exhaustive list of emergency flow building blocks that are optionally included in the set of predefined emergency flow building blocks and that may be incorporated into a customized emergency flow (e.g., customized emergency flow script).

(a) Create Emergency Bridge Block: In some embodiments, the create emergency bridge block instructs the EFMS to create a communication bridge in which one or more calls are dynamically added or removed. The communication bridge serves as a hub for various calls that are made during the execution of an emergency flow. In some embodiments, the create emergency bridge block takes no inputs and produces no outputs. In some embodiments, the create emergency bridge block is a core component included in every emergency flow. In some embodiments, the create emergency bridge block is an implied emergency flow building block (e.g., the script defining the create emergency bridge block is included in every emergency flow but the create emergency bridge block is not depicted in the graphical user interface 573). In some embodiments, the create emergency bridge block (or a similar block) selects a telephone number from a pool of telephone numbers to create a sustained communication bridge to which additional callers may be dynamically added or removed. The create emergency bridge block may associate the pool-selected telephone number with a particular alert ID, with a particular MCS telephone number (e.g., an extension to a particular operator/call-taker), and/or with a particular PSS telephone number, for example.

(b) Call User Block: In some embodiments, the call user block instructs the EFMS to initiate a phone call to a phone number associated with the user associated with the triggering device and connect the phone call with a communication bridge. The input for the call user block is the phone number associated with the user. The outputs of the call user block are: (i) the user answered the phone call or (ii) the user did not answer the phone call.

(c) Play Pre-Recorded Message Block: In some embodiments, the play pre-recorded message block instructs the EFMS to play a pre-recorded audio file to one or more parties currently connected to a communication bridge. The input for the play pre-recorded message block is the name or file location of the pre-recorded audio file. The play pre-recorded message block has no output.

(d) Play TTS Message Block: In some embodiments, the play TTS (text-to-speech) message block instructs the EFMS to play an audio file adaptation of a text file to one or more parties currently connected to a communication bridge. The input for the play TTS message block is the text of the message to be converted to audio. The play TTS message block has no output.

(e) Send SMS Message Block: In some embodiments, the send SMS message block instructs the EFMS to deliver a SMS message to a user or a group of users. In some embodiments, the SMS message includes information pertaining to the status of the emergency flow session. The inputs for the send SMS message block are the contents of the text message to be sent and the phone number(s) of the intended recipients of the text message. The send SMS message block has no output.

(f) Timeout Block: The timeout block instructs the EFMS to add a timeout instruction for a desired event. For example, in some embodiments, an administrator can add a timeout instruction to another emergency flow building block, such as the call user block, and specify an amount of time that the emergency flow should wait at the call user block before autonomously determining a negative outcome (e.g., in the case of the call user block, the user did not answer). The input for the timeout block is the amount of time (e.g., 1-30 seconds). The output of the timeout is a confirmed negative outcome.

(g) Location Block: In some embodiments, the location block instructs the EFMS to query or detect a location of a user. In some embodiments, the location block instructs the EFMS to parse a location database for a location. In some embodiments, the location block instructs the EFMS to communicate with a triggering device to determine the location of the triggering device. The input for the location block is an account associated with a user (e.g., a phone number of the user). The output of the location block is a location of the user.

(h) API/HTTP Request Block: In some embodiments, the API/HTTP request block instructs the EFMS to execute an API or HTTP post to an internet-based service to provide status, alerts, and notifications regarding the current emergency. The API or HTTP post may be provided by the user or included in the Emergency Console. In some embodiments, the inputs for the API/HTTP request block are a URL and any necessary parameters (named parameters included in HTTP post). In some embodiments, the outputs of the API/HTTP request block are (i) success or (ii) failure.

(i) Find Next Available Contact Block: In some embodiments, the find next available contact block instructs the EFMS to loop through a list of contacts (e.g., accounts associated with a user or emergency contacts), call each one-by-one in sequence, play an audio message to them and wait for confirmation to determine whether to call the next contact. In some embodiments, a contact can confirm readiness to speak to an EDC or emergency dispatch center by responding to the audio message (e.g., by pressing 1). In some embodiments, the call of the find next available contact block is an interactive call (as discussed below). In some embodiments, the input for the find next available contact block is a list of contacts, the list of contacts including phone numbers and names. In some embodiments, the outputs of the find next available contact block are (i) contact answers the call, (ii) contact does not answer the call, and/or (iii) there are no available contacts (also referred to as an NAC response).

(j) Interactive Call/IVR Block: In some embodiments, the interactive call/IVR (interactive voice response) block instructs the EFMS to call a phone number (e.g., an account associated with a user), play an audio message to the recipient of the call, and wait for a dial tone response (e.g., an interactive call) to determine whether the recipient of the call confirms readiness to speak to an EDC or emergency dispatch center. In some embodiments, the interactive call/IVR block only plays the audio message and waits for the dial tone response (e.g., if a call has already been established). In some embodiments, the interactive call presents the recipient with a plurality of options to choose from (e.g., press 1 to dial 9-1-1, press 2 to call an emergency contact, press * to hang up). In some embodiments, the inputs for the interactive call/IVR block are a name and associated phone number of the intended recipient of the call and an audio message to play to the recipient. In some embodiments, the inputs for the interactive call include a plurality of options for the recipient to choose from. In some embodiments, the outputs of the interactive call/IVR block are (i) a dial tone response from the recipient (ii) the call was answered or (iii) the call was unanswered.

(k) Connect to Customer Call/Operations Center Block: In some embodiments, the connect to customer/operations center block instructs the EFMS to initiate a call with an operations center associated with the administrator. The input for the connect to customer call/operations center is a phone number of the customer call/operations center. In some embodiments, the outputs of the connect to customer call/operations center are (i) successful connection to customer call/operations center or (ii) unsuccessful connection to customer call/operations center. In some embodiments, the call of the connect to customer call/operations center block is an interactive call (as described above).

(l) Connect to 9-1-1 Block: In some embodiments, the connect to 9-1-1 block instructs the EFMS to call 9-1-1 (or another emergency response/dispatch center number), add the call to a communication bridge, and provide the EDC with a location and name of a user. The inputs for the connect to 9-1-1 block are the location of the user and the name and phone number of the user. The outputs of the connect to 9-1-1 block are (i) successful connection to 9-1-1 or (ii) unsuccessful connection to 9-1-1.

(m) Add 3rd Party Block: In some embodiments, the add third party block instructs the EFMS to initiate a call with an additional party (e.g., an emergency contact, customer service, a suicide hotline, etc.) and add the call with the additional party to a communication bridge. The inputs for the add 3rd party block are a name and number of a third party. The outputs of the add third party block are (i) successful connection to third party or (ii) unsuccessful connection to third party.

(n) Failsafe Block: In some embodiments, the failsafe block instructs the EFMS to detect a failure within an emergency flow and deliver a message to a user notifying the user that the emergency flow has failed. In some embodiments, the failsafe block further instructs the API to prompt the user to call 9-1-1. In some embodiments, the failsafe block is an implied emergency flow building block (e.g., the script defining the failsafe block is included in every emergency flow but the "create emergency bridge" block is not depicted in the graphical user interface 573). In some embodiments, the failsafe block is an implied additional or associated component of every emergency flow building block configured within an emergency flow. In general, the failsafe block functions to ensure that an emergency flow is at least as reliable as a traditional emergency call (e.g., calling 9-1-1 in the United States). In some embodiments, the input for the failsafe block is a failed outcome of a previous or associated emergency flow building block (e.g., the previous or associated emergency flow building block failed to execute its intended function). The failsafe block has no output.

In some embodiments, in addition to the emergency flow building blocks, the Emergency Console contains one or more utility building blocks. For example, in some embodiments, utility building blocks may perform computational or logistical functions, as opposed to emergency functions. For example, the utility building blocks may include a calculator building block configured to perform a mathematical equation on two inputs, a datetime building block configured to return the current day and time, an evaluate building configured to evaluate an expression (e.g., an algebraic expression), a compare building block configured to execute an if/then statement. In some embodiments, the utility building blocks may include increase and decrease building blocks configured to increase or decrease the value of a numerical variable, respectively.

The Emergency Console optionally contains any number of emergency flow building blocks defining any number of emergency response functions. In some embodiments, additional emergency response functions include, but are not limited to, at least one of the following: delivering a location of a user to an emergency dispatch center or database accessible by the emergency dispatch center, identifying an emergency dispatch center suitable for responding to an emergency alert based on location data associated with or received from an electronic device associated with a user, calling an emergency contact of a user for whom an emergency alert has been received, calling an associated device of the user, and obtaining sensor data from a network of sensors associated with the user or user's electronic device. In some embodiments, the Emergency Console allows administrators to edit the short script of an emergency flow building block to reprogram the building block to be more applicable to the needs of the administrator. For example, in some embodiments, the Emergency Console may contain a predefined call user block that takes a single phone number as an input. In this example, the Emergency Console optionally allows an administrator to edit the short script of the predefined call user block such that the edited call user block now takes a list of phone numbers as its input and dials each number in the list of phone numbers one-by-one in sequence until one of the numbers is successfully reached. In some embodiments, the Emergency Console allows administrators to configure any parameter of an emergency flow building block, including, but not limited to: the input, output, and emergency response function. In some embodiments, the Emergency Console allows administrators to design their own original emergency flow building blocks, such as by writing their own short script in the programming language input field 571. In some embodiments, the Emergency Console includes a shared (e.g., accessible to all administrators) library of administrator generated emergency flow building blocks.

Emergency Data Sharing System

Figure 6:
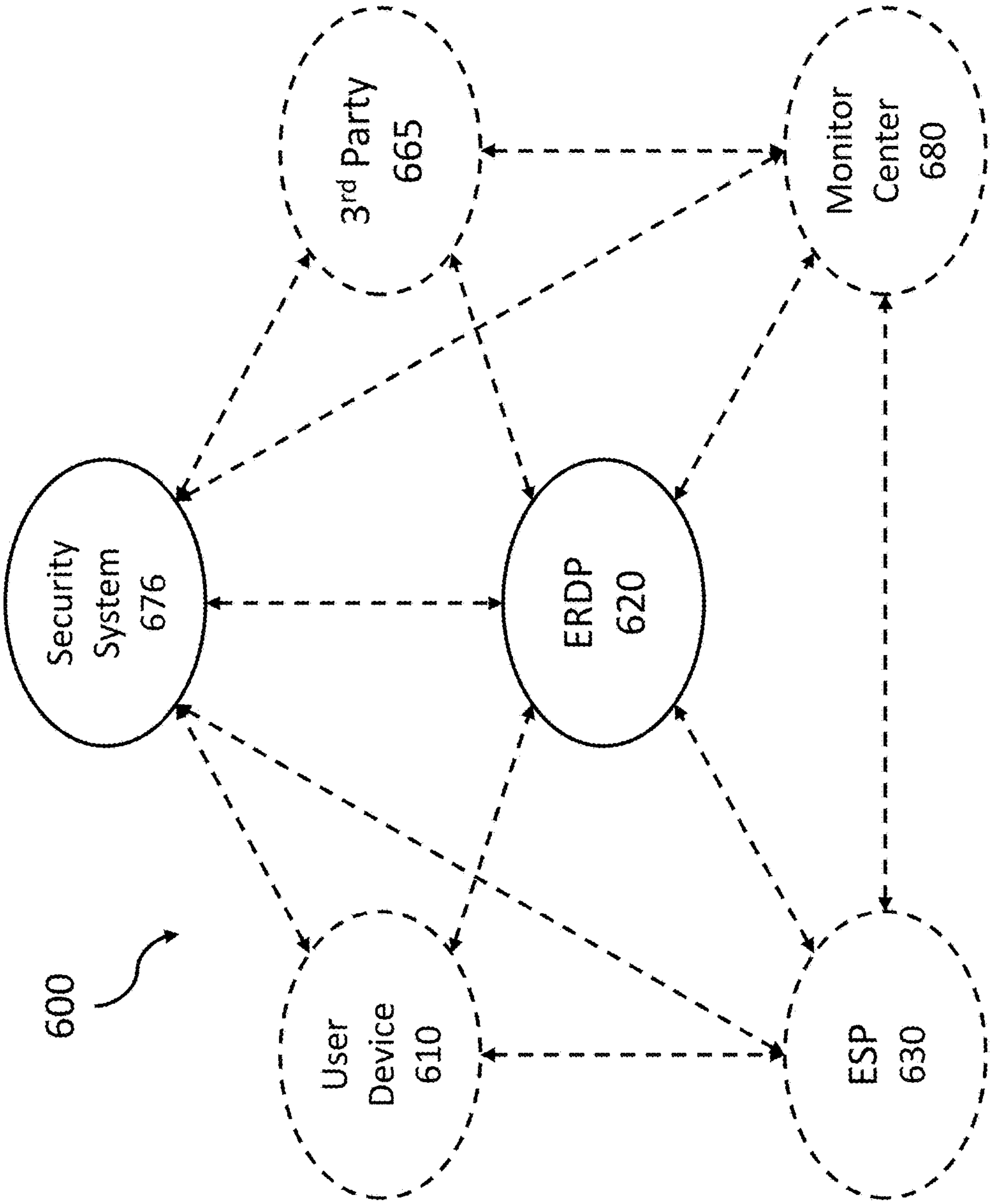
FIG. 6 depicts a diagram of a system for providing emergency response assistance by an emergency response data platform, in accordance with some embodiments.

FIG. 6 depicts a diagram of a system 600 for providing emergency response assistance by an emergency response data platform. In some embodiments, as depicted by FIG. 6, the system 600 includes a private security system 676 (as described below), an emergency response data platform (ERDP) 620 (as described above), and a monitoring center system 680 (as described below). In some embodiments, the system 600 includes the private security system 676, the ERDP 620, the monitoring center system 680, and an emergency service provider (ESP) 630 (as described above). In some embodiments, the system 600 includes the private security system 676, the ERDP 620, and the ESP 630. In some embodiments, the system 600 optionally includes a user device 610 or a third-party server system 665. For example, the third-party server system 665 may provide a pool of telephone number used by the ERDP 620 to establish audio-based communication bridges between the ESP 630, the monitor center 680, the security system 676, and/or the user device 610. In general, the components of the system 600 work cooperatively to generate emergency alerts, transmit the emergency alerts to relevant parties, and deliver emergency data related to the emergency alerts to the relevant parties. As depicted in FIG. 6, the ERDP 620 may be communicatively coupled to any and all components of the system 600 and is thereby able to function as a central communication hub for any and all of the components of the system 600.

Typically, as mentioned above, emergency service providers (ESPs; e.g., public safety answering points) are only capable of receiving verbal requests for emergency service (hereinafter, "traditional emergency service requests") through telephone calls. For example, typically, when a person in the United States experiences an emergency, they must dial 9-1-1 using a telephone to be connected to emergency service providers. Then, after dialing 9-1-1 and being connected to an emergency service provider, they must verbally relay the nature of their emergency as well as any additional relevant information (such as their location or medical history) to the emergency service provider over the phone. Or, for example, when a home security alarm is tripped (such as by a burglar), a notification is sent to a monitoring center (also referred to as a "central monitoring station" or a "central station"), and a call-taker at the monitoring center must call 9-1-1 (or an administrative phone number associated with an ESP, as described below) and verbally relay the nature of the emergency to an emergency service provider. System 600 provides various mechanisms for sharing emergency data associated with emergency alerts between private security systems, monitoring center systems, and emergency service providers, as described below.

Figure 7:
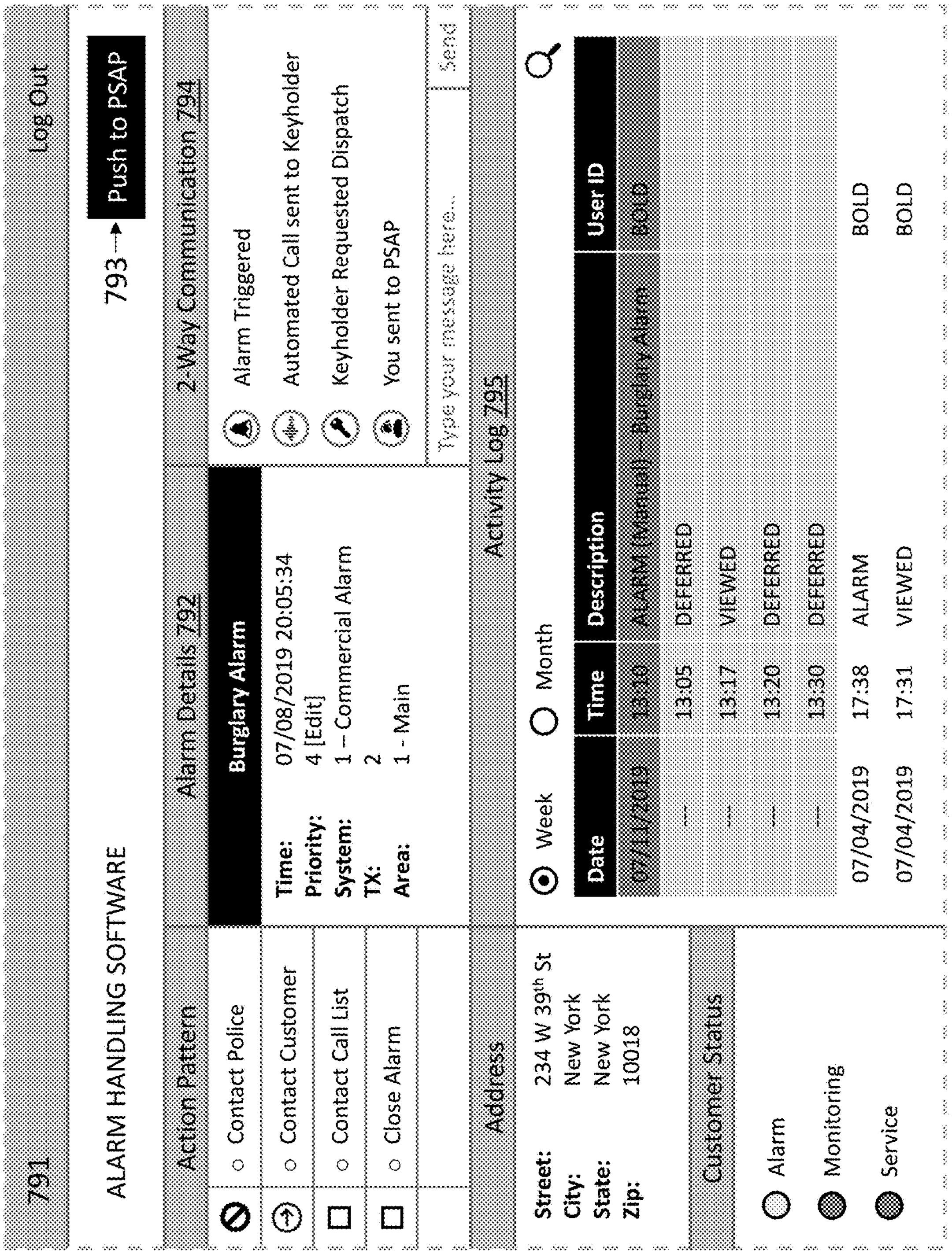
FIG. 7 illustrates a graphical user interface provided by an alarm handling application, in accordance with some embodiments.

For example, in some embodiments, when an emergency alert is generated by an alert source 676 (e.g., a mobile phone, an intelligent vehicle system, a home security system, etc.), the emergency alert is transmitted by the alert source to a monitoring center system 680. In some embodiments, when the emergency alert is transmitted to the monitoring center system 680, the emergency alert and any available emergency data associated with the emergency alert is transmitted to the emergency response data platform (ERDP) 620 in parallel (e.g., directly transmitted to the ERDP by the alert source or automatically transmitted to the ERDP by the monitoring center system upon receipt). In some embodiments, when the emergency alert is received by the monitoring center system 680, the emergency alert is displayed through an alarm handling software application, as illustrated in FIG. 7. In some embodiments, the alarm handling software application 791 additionally displays information regarding the emergency alert. In some embodiments, the emergency alert or information regarding the emergency alert is additionally or alternatively displayed within an emergency response application (e.g., a monitoring center portal, as described below) provided by the ERDP 620 and accessed by the monitoring center system 680. In some embodiments, after the emergency alert is received by the monitoring center system 680, the monitoring center system 680 (e.g., a call-taker at a monitoring center associated with the monitoring center system) attempts to verify the emergency alert by calling a person associated with emergency alert. For example, if the emergency alert is an alarm (e.g., a home security alarm), a call-taker at the monitoring center system 680 may call the homeowner of the house where the home security alarm was triggered or a neighbor of the house where the home security alarm was triggered. If a person associated with the emergency alert verifies that the emergency alert was legitimate (e.g., that a break-in to the house where the home security alarm was triggered did occur), or if the call-taker is unable to contact any of the persons associated with the emergency alert, the call-taker can select a Push to PSAP button 793 (also referred to as a "request dispatch button") to digitally deliver emergency data associated with the emergency alert to an emergency service provider (ESP) 630 through the ERDP 620.

In some embodiments, when the Push to PSAP button 793 is selected, emergency data associated with the emergency alert is transmitted from the monitoring center system 680 to the ERDP 620, which can then transmit the emergency data associated with the emergency alert to an emergency service provider 630. In some embodiments, emergency data associated with the emergency alert is transmitted from the monitoring center system 680 to the ERDP 620 when the emergency alert is received by the monitoring center system 680, but the ERDP 620 does not transmit the emergency data associated with the emergency alert to an emergency service provider 630 until the Push to PSAP button 793 is selected. In some embodiments, when the Push to PSAP button 793 is selected, emergency data associated with the emergency alert is transmitted directly from the monitoring center system 680 to an emergency service provider 630. In some embodiments, the emergency data associated with the emergency alert is transmitted to an emergency service provider 630, whether by the ERDP 620 or the monitoring center system 680, using an application programming interface (API). In some embodiments, the emergency data associated with the emergency alert is transmitted to an emergency service provider 630, whether by the ERDP 620 or the monitoring center system 680, using a standardized protocol, such as the automated secure alarm protocol (ASAP, also referred to as "ASAP to PSAP"). In some embodiments, when emergency data associated with an emergency alert is transmitted directly from the monitoring center system 680 to an emergency service provider 630, the ERDP 620 provides the monitoring center system 680 with the endpoint for the appropriate emergency service provider 630. In some embodiments, when emergency data associated with an emergency alert is transmitted to an emergency service provider (ESP) 630, the ERDP 620 establishes a two-way communication link between the monitoring center system 680 and the ESP 630 to facilitate a text-based communication session 794 between the monitoring center system 680 and the ESP 630. In some embodiments, the text-based communication session 794 is facilitated through an alarm handling software application 791, as illustrated in FIG. 7. In some embodiments, the alarm handling software application 791 provides a GUI showing an activity log 795. In some embodiments, the text-based communication session is facilitated through an emergency response application provided to the monitoring center system 680 by the ERDP 620. For example, the text-based communication session may be facilitated through a monitoring center portal, as illustrated in FIG. 8.

Figure 8:
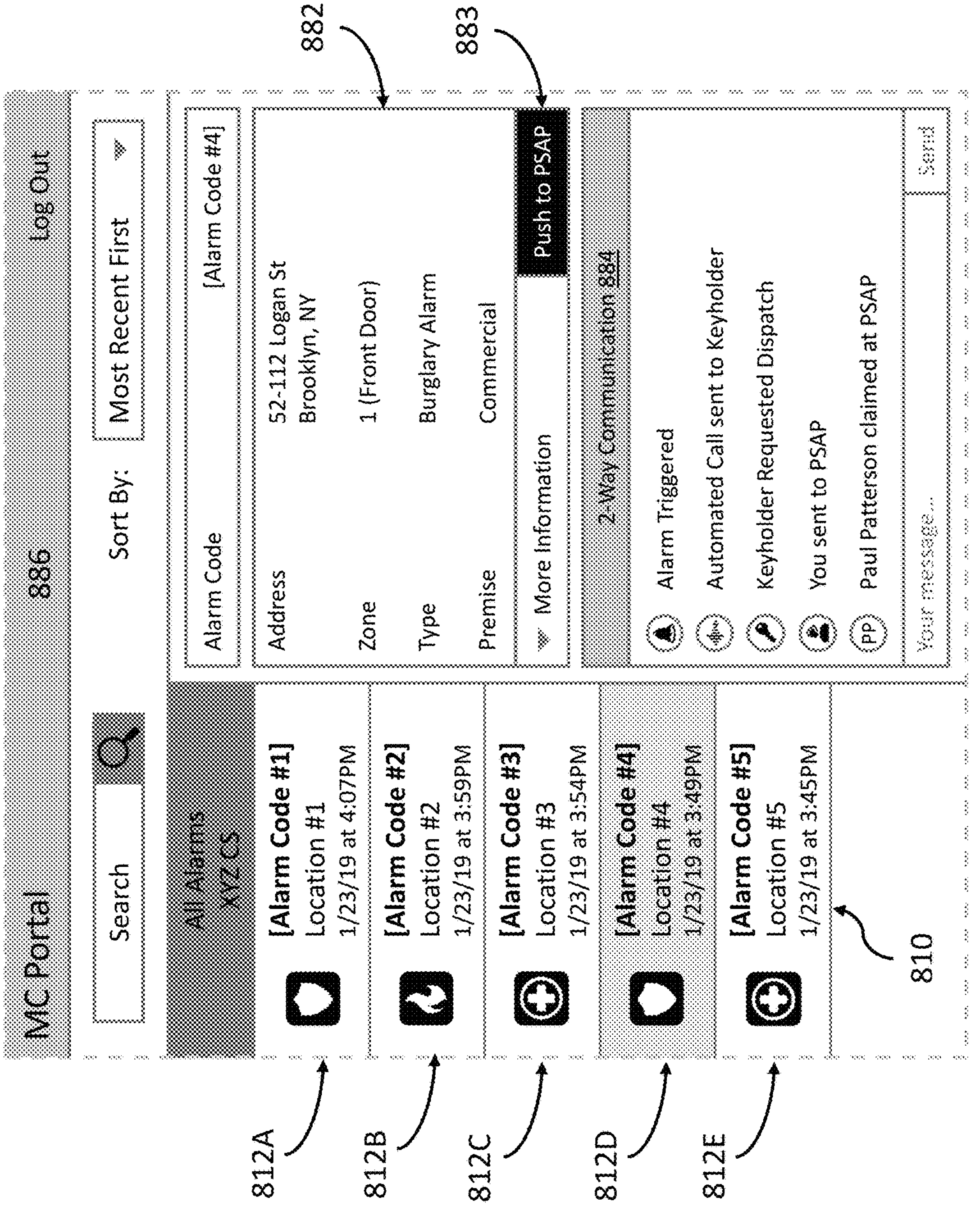
FIG. 8 illustrates a graphical user interface provided by a monitoring center portal, in accordance with some embodiments.

FIG. 8 illustrates an exemplary embodiment of a monitoring center portal. As mentioned above, in some embodiments, an emergency response data platform (ERDP) provides an emergency response application to monitoring center systems. In some embodiments, the emergency response application is a monitoring center portal, as illustrated in FIG. 8. In some embodiments, the monitoring center portal 886 is a web application accessible by the monitoring center system 680 through a standard web browser. In some embodiments, the monitoring center portal 886 includes an alarm queue 810, an alarm details section 882, and a text-based communication session 884. In some embodiments, the alarm queue 810 displays one or more alarms 812 (such as alarms 812A-812E). In some embodiments, when a monitoring center system 680 receives an emergency alert (e.g., an alarm), the emergency alert and any associated data are not transmitted to the ERDP 620 in parallel. Instead, in some embodiments, the monitoring center system 680 (e.g., a call-taker at a monitoring center associated with the monitoring center system) must choose to transmit the emergency alert and any associated emergency data to the ERDP 620, such as by selecting a Push to PSAP button within an alarm handling software application, as described above. In some embodiments, as described above, when a monitoring center system 680 receives an emergency alert (e.g., an alarm), the emergency alert and any associated emergency data (e.g., an alarm and any associated alarm data) is transmitted to the ERDP 620 in parallel. After receiving an emergency alert and any associated emergency data (e.g., from an alert source in parallel to the monitoring center, in response to an action by the monitoring center, or automatically transmitted from by the monitoring center), the ERDP 620 can then display the emergency alert and the associated data within the monitoring center portal 886. In the example illustrated in FIG. 8, the ERDP 620 has received five alarms (alarms 812A-812E) and displays the five alarms 812 within the alarm queue 810. As illustrated in FIG. 8, in some embodiments, an alarm 812 can be selected within the alarm queue 810 to show alarm data associated with the alarm within the alarm details section 882. In the example illustrated in FIG. 8, alarm 812D has been selected and alarm data associated with alarm 812D is shown within the alarm details section 882.

In some embodiments, the ERDP 620 can facilitate a two-way, text-based communication session 884 between a monitoring center system 680 and an emergency service provider (ESP) 630 through the monitoring center portal 886. For example, in some embodiments, when a call-taker at a monitoring center selects a Push to PSAP button (also referred to as a "request dispatch button") within an alarm handling software application (also referred to as "automation software") for a particular alarm, the alarm handling software application is configured to launch the monitoring center portal 886 (e.g., by autonomously launching an internet browser window and navigating to a URL associated with the monitoring center portal) and prompt the ERDP 620 to transmit the alarm and any associated alarm data to an ESP 630. The ERDP 620 can then facilitate a two-way, text-based communication session between the monitoring center system 680 and the ESP 630 through the monitoring center portal 886, as illustrated in FIG. 8. In another example, in some embodiments, as described above, when a monitoring center system 680 receives an alarm, the alarm and any associated alarm data are automatically transmitted to the ERDP 620 (e.g., through an alarm handling software application), which can subsequently display the alarm and associated alarm data within the monitoring center portal 886, accessed by the monitoring center system 680. In this example, the ERDP 620 does not facilitate a two-way, text-based communication session between the monitoring center system 680 and an ESP 630 until a call-taker at a monitoring center associated with the monitoring center system 680 selects a Push to PSAP button (also referred to as a "request dispatch button") 883 within the monitoring center portal 886. Selecting the Push to PSAP button 883 prompts the ERDP 620 to transmit the alarm and any associated data to an appropriate emergency service provider (ESP) 630 and facilitate a two-way, text-based communication session 884 between the monitoring center 680 and the ESP 630, as illustrated in FIG. 8. Through the two-way, text-based communication session 884, text-based messages may be exchanged between the monitoring center system 680 (e.g., a call-taker at a monitoring center associated with the monitoring center system) and the ESP 630 (e.g., a call-taker at the ESP). Additionally, information or updates regarding the alarm may also be exchanged between the monitoring center system 680 and the ESP 630. For example, as illustrated by FIG. 8, statuses such as when an alarm was triggered, if any persons associated with the alarm have been contacted, if any persons associated with the alarm have requested dispatch (e.g., they have confirmed the alarm), when a call-taker at a monitoring center associated with the monitoring center system requested dispatch (e.g., by selecting the Push to PSAP button 883), when a call-taker has claimed the alarm at the ESP (as described below), and more can be exchanged and displayed through the two-way, text-based communication session 884.

Figure 9:
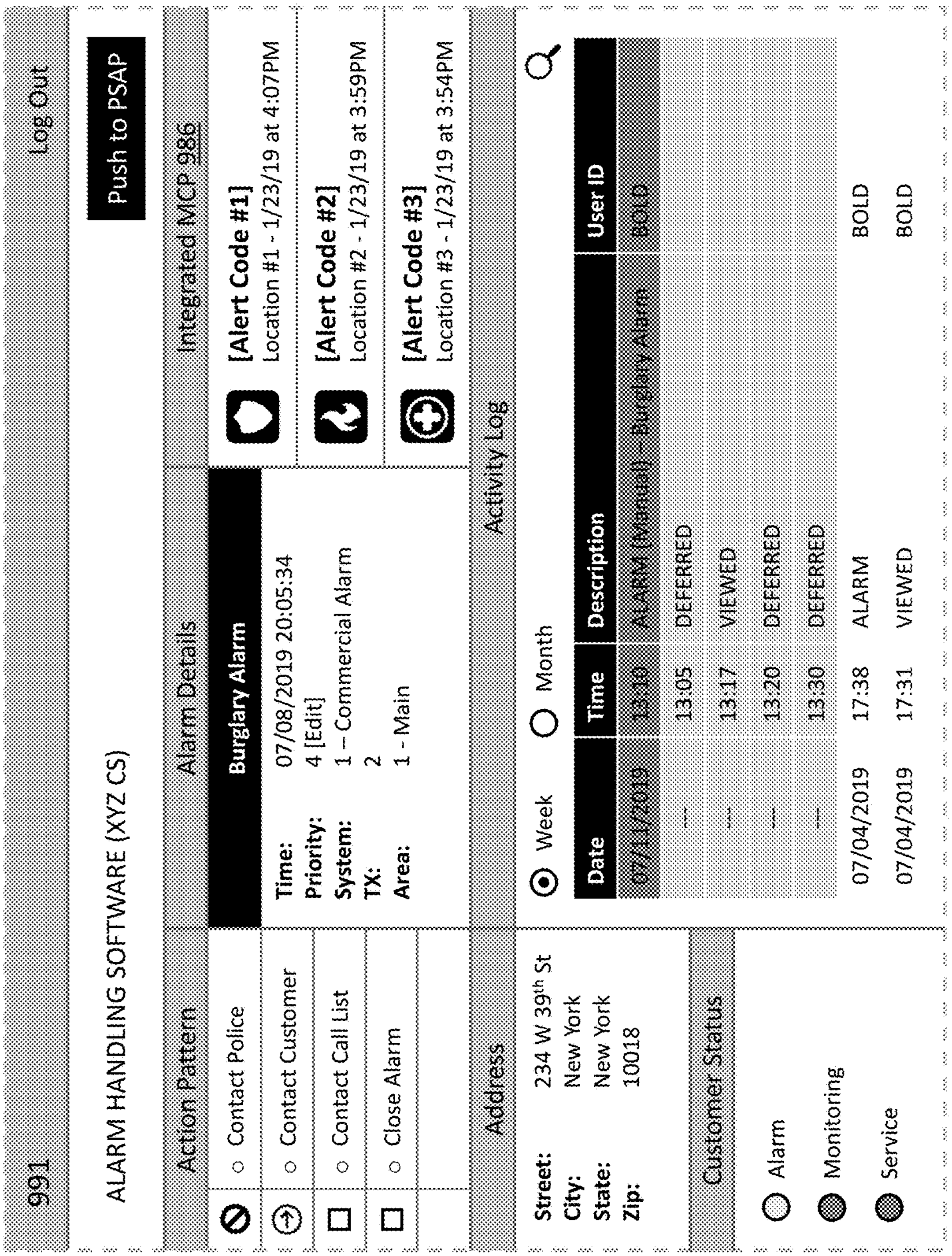
FIG. 9 illustrates a monitoring center portal integrated into a graphical user interface provided by an alarm handling application, in accordance with some embodiments.

In some embodiments, a monitoring center portal can be integrated into an alarm handling software application. A monitoring center portal integrated into an alarm handling software application may be referred to as an "integrated monitoring center portal." For example, in some embodiments, as illustrated in FIG. 9, an integrated monitoring center portal (e.g., integrated monitoring center portal 986) is a website or a web application executed within a graphical user interface of an alarm handling software application 991. In some embodiments, because the integrated monitoring center portal 986 may be executed within a relatively small window of the graphical user interface of the alarm handling software application 991, the integrated monitoring center portal 986 provides only a subset of the information, features, or graphical user interface elements that a monitoring center portal not integrated into an alarm handling software application (as described above) would provide at any given moment. For example, in the example illustrated in FIG. 9, integrated monitoring center portal 986 is provided to the same monitoring center system, XYZ CS, that monitoring center portal 886 (as illustrated in FIG. 8) is provided to, at the exact same time. However, while monitoring center portal 886 displays an alarm queue 810 including five most recently generated alarms, an alarm details section 882, and a text-based communication session 884, integrated monitoring center portal 986 displays only an alarm queue including three most recently generated alarms, because the integrated monitoring center portal 986 is displayed within a significantly smaller window than non-integrated monitoring center portal 886. In some embodiments, an integrated monitoring center portal 986 (or a non-integrated monitoring center portal 886) responsively displays more information, features, or graphical user interface elements as the area of the window that the integrated monitoring center portal 986 is displayed within is increased, and less information, features, or graphical user interface elements as the area of the window that the integrated monitoring center portal 986 is displayed within is decreased. However, in some embodiments, while an integrated monitoring center portal may display only a subset of the information, features, or graphical user interface elements that a non-integrated monitoring center portal would provide at any given moment, all of the information, features, or graphical user interface elements provided by a non-integrated monitoring center portal can be accessed through an integrated monitoring center portal by engaging with the information, features, or graphical user interface elements provided by the integrated monitoring center portal.

In some embodiments, the ERDP 620 can facilitate the transmission of a digital request for emergency service (also referred to as a "digital primary request for emergency service" or a "digital emergency service request") to an emergency service provider 630. As mentioned above, typically, a person experiencing an emergency may only submit a primary request for emergency service (also referred to as a "primary emergency service request" or an "emergency service request") to an emergency service provider (e.g., a public safety answering point (PSAP)) verbally, such as by dialing 9-1-1 in the United States and verbally articulating the details of their emergency over a phone call. This process takes time away from providing emergency response, is prone to human error, and requires that the person is physically able to verbally articulate the details of their emergency, which is far from a given. Even in the case of a home security alarm, the alarm is typically sent to a monitoring center where a call-taker at the monitoring center must call an emergency service provider and verbally articulate the details of the potential emergency. Provided herein are systems and methods for delivering digital emergency service requests to emergency service providers. By delivering digital emergency service requests to emergency service providers, as opposed to verbally delivering emergency service requests (e.g., emergency phone calls), significant time can be saved in providing emergency response, human error can be eliminated, and people who are not able (physically, such as when a person has fallen unconscious, or otherwise, such as when a person is kidnapped and fearing for their life) to verbally articulate the details of their emergency may still submit an emergency service request to an emergency service provider. Traditional emergency service requests (e.g., emergency calls) can and typically must be serviced by an emergency service provider (e.g., a call-taker at a PSAP can and typically must answer an emergency call received by the PSAP). Similarly, a digital emergency service request must provide one or more options for servicing (e.g., the ability to be claimed or ignored, as described below).

Figure 10:
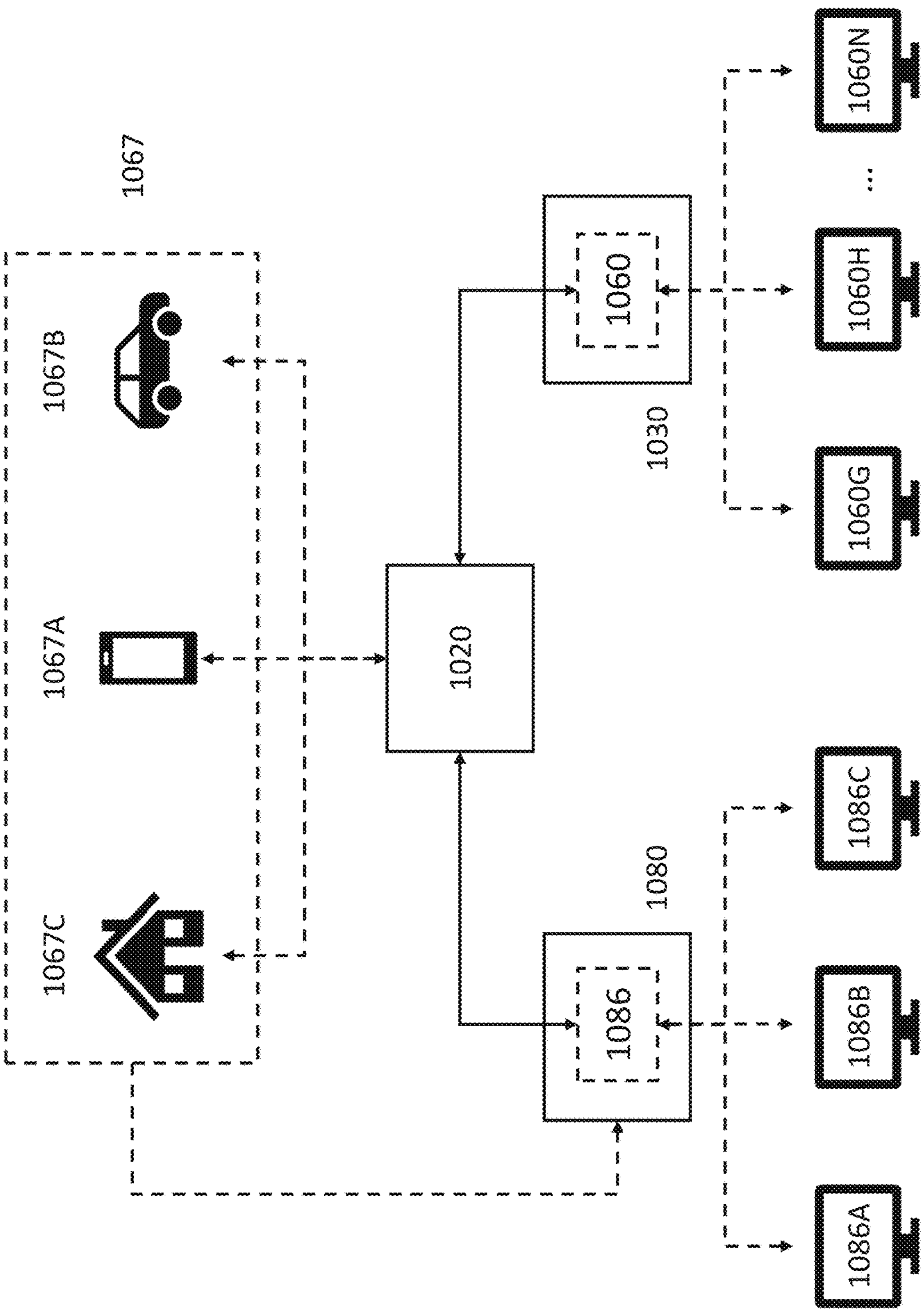
FIG. 10 depicts a diagram of a system facilitated by an emergency response data platform for sharing emergency data between alert sources, monitoring center systems, and emergency service providers, in accordance with some embodiments.

For example, as depicted in FIG. 10, in some embodiments, when an emergency alert is generated by an alert source 1067 (e.g., mobile phone 1067A, intelligent vehicle system 1067B, or home security system 1067C), the emergency alert is transmitted (e.g., by a private security system associated with the alert source, as described below) to either or both of a monitoring center system 1080 (as described below) and an emergency response data platform (ERDP) 1020. In some embodiments, the emergency alert is first received by an alert aggregator (not shown; also referred to as a "receiver" or an "alarm receiver") before being transmitted to a monitoring center system 1080 or the ERDP 1020. In some embodiments, when an emergency alert is generated by an alert source 1067, the emergency alert is transmitted (e.g., by the alert source, or by a private security system associated with the alert source) only to a monitoring center system 1080. In some embodiments, when an emergency alert is generated by an alert source 1067, the emergency alert is transmitted only to the ERDP 1020. In some embodiments, when an emergency alert is generated by an alert source 1067, the emergency alert is transmitted to a monitoring center system 1080 and the ERDP 1020 in parallel. In some embodiments, after receiving the emergency alert, a monitoring center system 1080 (e.g., a call-taker associated with the monitoring center system) can select to transmit the emergency alert, and any emergency data associated with the emergency alert, to the ERDP 1020 (e.g., by selecting a "Push to PSAP" button within a graphical user interface of an alarm handling software application or a monitoring center portal, as described above). In some embodiments, after receiving an emergency alert, a monitoring center system 1080 verifies the emergency alert (e.g., by contacting a user associated with the alert source 1067 that generated the emergency alert to confirm the emergency) before transmitting the emergency alert to the ERDP 1020. In some embodiments, after receiving the emergency alert (e.g., from a monitoring center system 1080 or a private security system associated with the alert source that generated the emergency alert), the ERDP 1020 generates and transmits a digital emergency service request associated with the emergency alert to an ESP 1030. In some embodiments, when the ERDP 1020 receives an emergency alert, the ERDP 1020 does not generate or transmit a digital emergency service request associated with the emergency alert to an ESP 1030 until the ERDP 1020 receives a request to generate and transmit a digital emergency service request associated with the emergency alert to an ESP 1030 from a monitoring center system 1080 that also received the emergency alert (e.g., after a call-taker associated with the monitoring center system selects a "Push to PSAP" button within a graphical user interface of an alarm handling software application or a monitoring center portal, as described above).

In some embodiments, when the ERDP 1020 generates and transmits a digital emergency service request associated with an emergency alert to an ESP 1030, the ERDP 1020 determines an appropriate ESP 1030 to receive the digital emergency service request using a location associated with the emergency alert. For example, in some embodiments, the emergency alert includes a location associated with the emergency alert (e.g., a location generated by the alert source that generated the emergency alert), and the ERDP 1020 determines an appropriate ESP 1030 to receive the digital emergency service request associated with the emergency alert using a geofencing system, as described above. For example, using a geofence system, the ERDP 1020 gathers geofences associated with ESPs 1030 and determines if the location associated with the emergency alert falls within any of the geofences. After determining that the location associated with the emergency alert falls within a geofence associated with a particular ESP 1030, the ERDP 1020 then determines if there are any active or persistent communication links established between the ERDP 1020 and the ESP 1030. If so, the ERDP 1020 can automatically generate and transmit a digital emergency service request associated with the emergency alert to the ESP 1030 through the active or persistent communication link established between the ERDP 1020 and the ESP 1030. In some embodiments, when the ERDP 1020 generates and transmits a digital emergency service request, the ERDP 1020 determines an appropriate ESP 1030 to receive the digital emergency service request using additional data alternatively or in addition to a location associated with the emergency alert, such as the type of alert (e.g., an emergency type) or the alert source. For example, in some embodiments, if an emergency alert is generated by a home security system (e.g., the home security system detects a break in through a window), the ERDP 1020 can generate a digital emergency service request and transmit the digital emergency service request directly to a police department based on the type of the emergency alert being a home security alarm. In another example, in some embodiments, if an emergency alert is generated by a smoke detector, the ERDP 1020 can generate a digital emergency service request and transmit the digital emergency service request directly to a fire department based on the source of the emergency alert being a smoke detector. However, the ERDP 1020 may determine an appropriate ESP 1030 to receive a digital emergency service request based on any other factor.

Figure 11A:
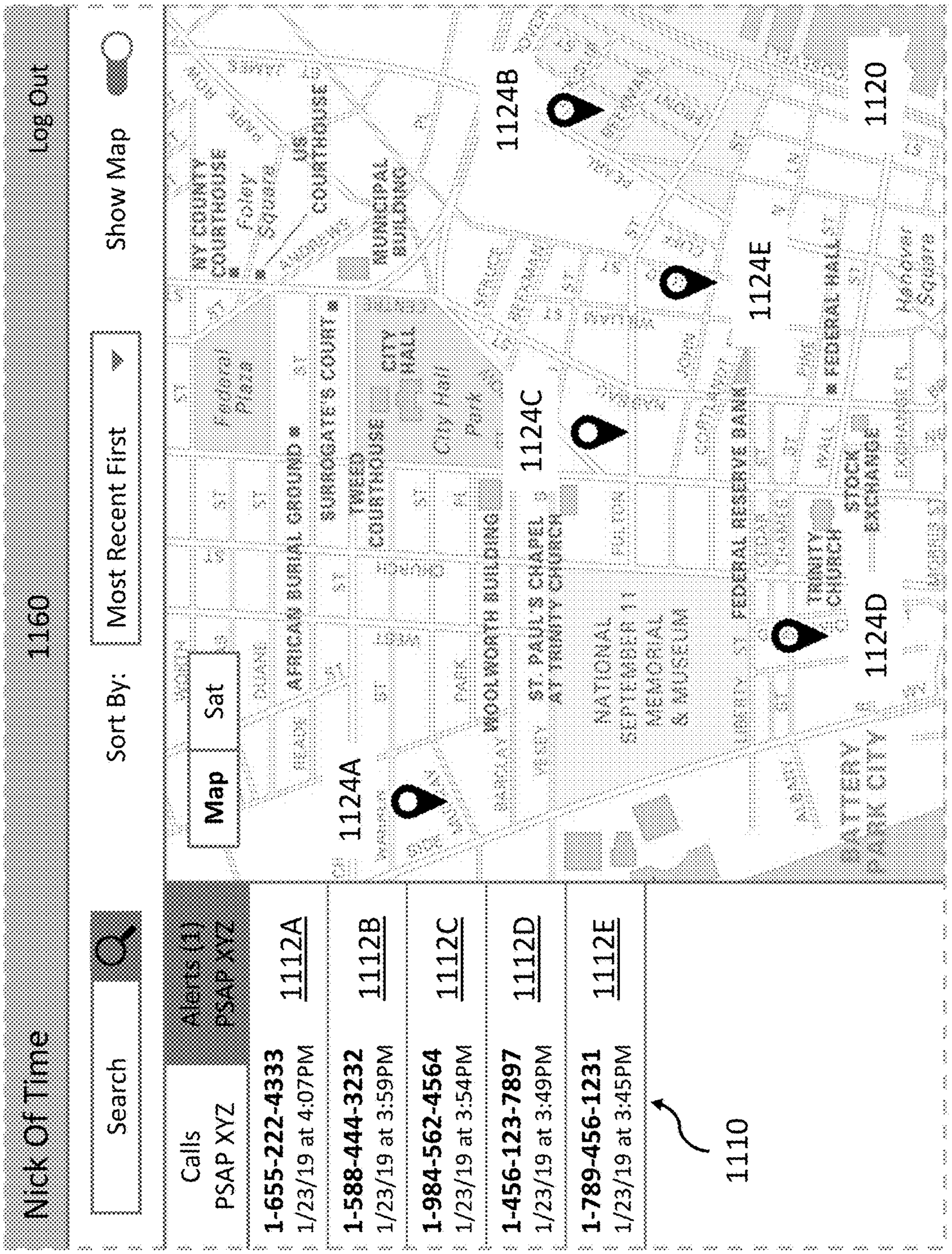
FIG. 11A illustrates a view of a graphical user interface provided by an emergency response application, in accordance with some embodiments.
Figure 11B:
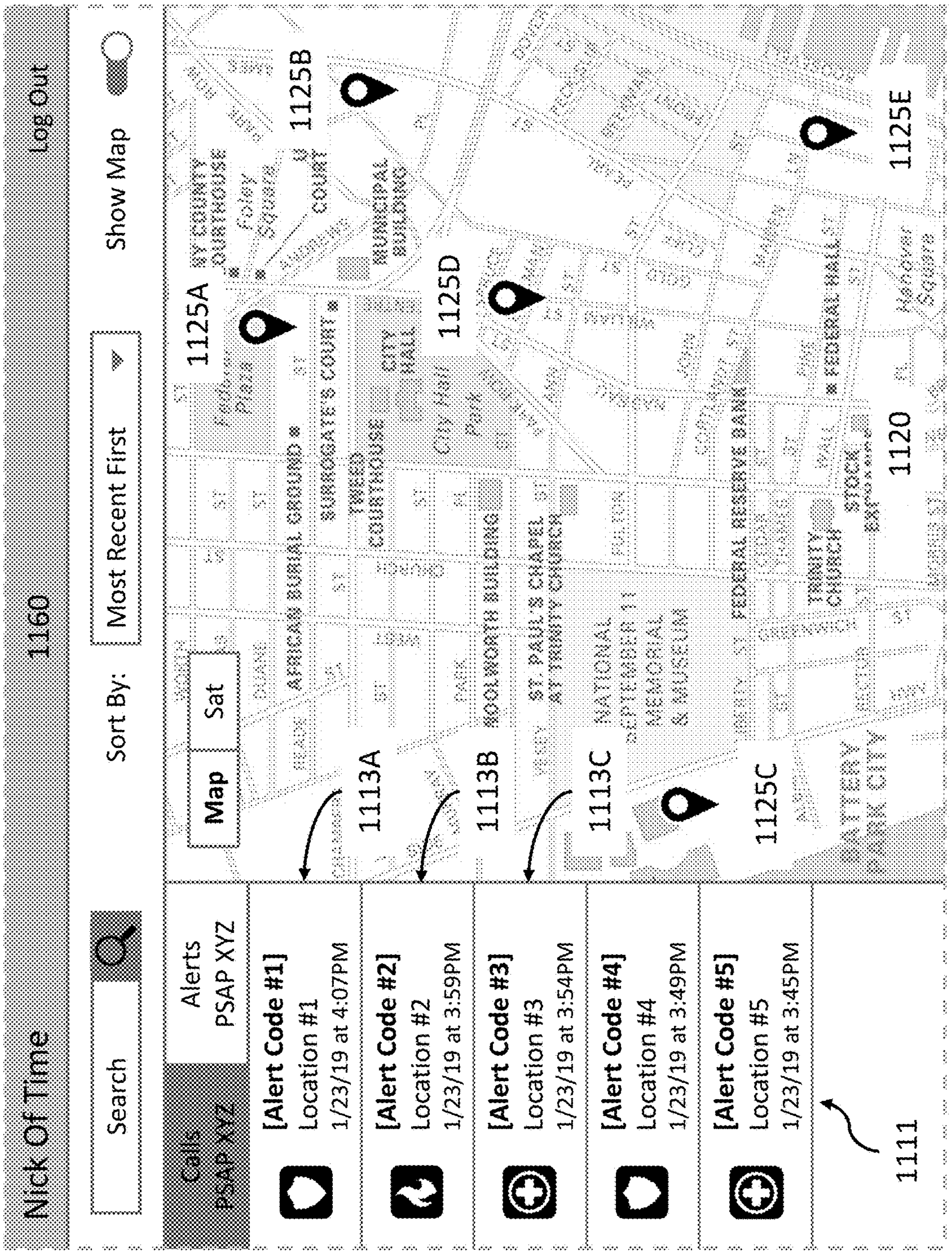
FIG. 11B illustrates a view of a graphical user interface provided by an emergency response application, in accordance with some embodiments.
Figure 11C:
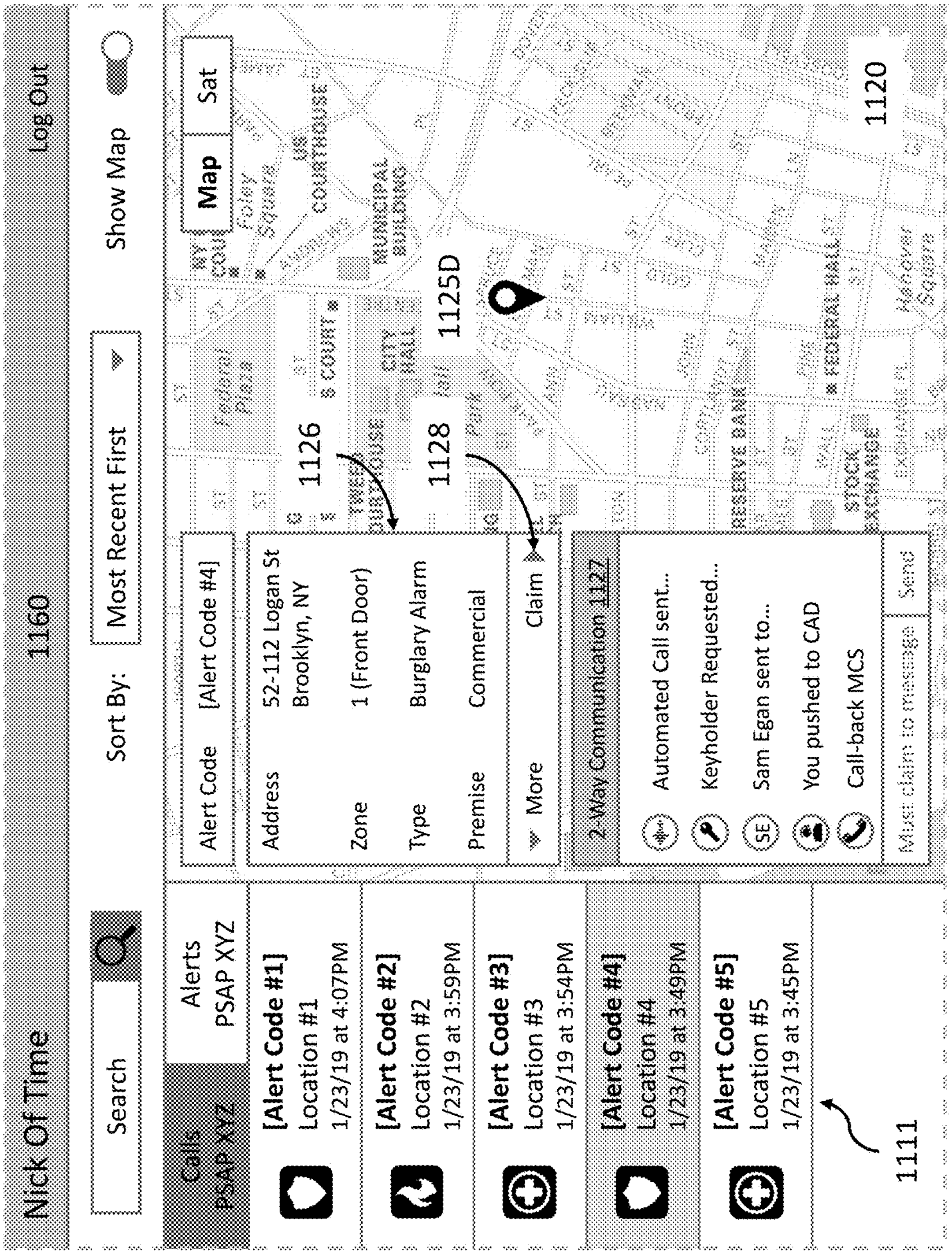
FIG. 11C illustrates a view of a graphical user interface provided by an emergency response application, in accordance with some embodiments.

In some embodiments, the emergency response data platform (ERDP) is integrated into existing systems within an emergency service provider (ESP), such as a call handling software application or computer aided dispatch (CAD) system. In some such embodiments, the ERDP can transmit a digital emergency service request to an ESP through the integrations with the existing systems within the ESP. In some embodiments, the ERDP provides an emergency response application to ESPs through which the ERDP can transmit digital emergency service requests, as depicted in FIGS. 11A-11C. As described above, in various embodiments, an emergency response application provided to an ESP by the ERDP includes a graphical user interface (GUI) that list of incidents (also referred to as an "incident queue") and an interactive map. For example, in some embodiments, as illustrated in FIG. 11A, the list of incidents 1110 includes one or more incidents 1112 (e.g., incidents 1112A-1112E), and the interactive map 1120 includes one or more incident locations 1124 (e.g., incident locations 1124A-1124E) associated with one or more incidents 1112 included in the list of incidents 1110. In some embodiments, as illustrated in FIG. 11B, the emergency response application 1160 includes a list of digital emergency service requests 1111 (also referred to as an "alerts queue"). For example, in some embodiments, as illustrated in FIGS. 11A-11C, the emergency response application 1160 includes both a list of incidents and a list of digital emergency service requests, and a user of the emergency response application can choose between the list of incidents and the list of digital emergency service requests by selecting an incidents tab (e.g., the Calls tab, as illustrated in FIG. 11A) or a digital emergency service requests tab (e.g., the Alerts tab, as illustrated in FIG. 11A). In some embodiments, as illustrated in FIG. 11A, the digital emergency service requests tab displays the number of digital emergency service requests transmitted to an ESP through the emergency response application from the ERDP since the list of digital emergency service requests was last displayed within the GUI of the emergency response application. Similarly, in some embodiments, the incidents tab displays the number of incidents transmitted to an ESP through the emergency response application from the ERDP since the list of incidents was last displayed within the GUI of the emergency response application.

In some embodiments, as illustrated in FIG. 11B, a list of digital emergency service requests 1111 includes one or more digital emergency service requests 1113 (e.g., the five digital emergency service requests represented by Alert Codes #1-#5) transmitted to an ESP through the emergency response application 1160. In some embodiments, as illustrated in FIG. 11B, when the emergency response application 1160 is displaying a list of digital emergency service requests 1111, the emergency response application 1160 also displays one or more emergency locations associated with one or more of the digital emergency service requests 1113 (e.g., emergency locations included in or associated with an emergency alert for which a digital emergency service request was generated) as one or more alert locations 1125 (e.g., alert locations 1125A-1125B) within an interactive map 1120. In some embodiments, as illustrated in FIG. 11B, a digital emergency service request 1113 is associated with an emergency type (e.g., fire, medical, police, etc.), and the emergency response application 1160 displays an icon representing the emergency type (also referred to as an "emergency type icon") associated with the digital emergency service request 1113 alongside the digital emergency service request 1113 within the list of digital emergency service requests 1111. For example, in the example illustrated in FIG. 11B, digital emergency service request 1113A is associated with a police emergency type, and the emergency response application 1160 displays a police emergency type icon alongside digital emergency service request 1113A within the list of digital emergency service requests 1111. Similarly, digital emergency service requests 1113B and 1113C are associated with fire and medical emergency types, respectively, and the emergency response application 1160 accordingly displays a fire emergency type icon and a medical emergency type icon alongside digital emergency service request 1113B and digital emergency service request 1113C, respectively, within the list of digital emergency service requests 1111. In some embodiments, an icon displayed within the interactive map 1120 for an alert location 1125 is displayed in a different shape, size, or color than an icon displayed within the interactive map 1120 for an incident location 1124. In some embodiments, an icon displayed within the interactive map 1120 for an alert location 1125 is displayed in the same shape, size, and color as an icon displayed within the interactive map 1120 for an incident location 1124. In some embodiments, as illustrated in FIG. 11B, a digital emergency service request 1113 is displayed within the list of digital emergency service request 1111 with emergency data associated with the emergency alert for which the digital emergency service request 1113 was generated, such as an alarm code, a location or address, and the date and time at which the emergency alert was generated. In some embodiments, a digital emergency service request 1113 is displayed within the list of digital emergency service requests 1111 with an indication of a status associated with the digital emergency service request (e.g., whether or not the digital emergency service request 1113 has been claimed, as described below).

In some embodiments, as illustrated in FIG. 11C, when a user of the emergency response application 1160 selects a digital emergency service request 1113 from within the list of digital emergency service requests 1111, the emergency response application 1160 displays a single alert view. In some embodiments, a single alert view displays additional information or emergency data associated with the selected digital emergency service request 1113. In some embodiments, as illustrated in FIG. 11C, the additional information or emergency data associated with the selected digital emergency service request 1113 is displayed with a data card 1126 separate from the list of digital emergency service requests 1111. In some embodiments, as illustrated in FIG. 11C, the data card 1126 is overlaid atop the interactive map 1120. In some embodiments, when the emergency response application 1160 displays a single alert view, only the alert location 1125 associated with the selected digital emergency service request 1113 is displayed within the interactive map 1120. For example, in the example illustrated in FIG. 11C, the digital emergency service request represented by Alert Code #4 has been selected from within the list of digital emergency service request 1111. As a result, in this example, the graphical user interface of the emergency response application 1160 now displays only the alert location 1125D associated with the selected digital emergency service request within the interactive map 1120 and a data card 1126 overlaid atop the interactive map 1120 displaying additional information regarding the selected digital emergency service request. In some embodiments, as illustrated in FIG. 11C, a single alert view provides a user of the emergency response application 1160 with access to a two-way communication session 1127 (e.g., a text-based communication session) between the ESP accessing the emergency response application 1160 and a monitoring center system (MCS) associated with the selected digital emergency service request 1113 (e.g., a monitoring center system that received the emergency alert for which the digital emergency service request was generated, as described above). In some embodiments, information regarding a digital emergency service request, such as statuses, may always be accessible through the two-way communication session 1127, but a user of the emergency response application 1160 must claim the digital emergency service request (e.g., by selecting a claim button 1128) before the user is able to exchange messages with a monitoring center system associated with the digital emergency service request. In one embodiment, an ESP operator may select “Call-back MCS” from the menu of communication session 1127 to (re) establish a telephone call with the call-taker of the MCS. The ERDP (hosting the emergency response application 1160) may select a telephone number from a pool of numbers and may associate the number from the pool with a particular alert ID (e.g., Alert Code #4) and a MCS call-taker phone number, until the alert is resolved or until a pre-determined period of time lapses (e.g., 10 minutes). In some embodiments, a single alert view provides a user of the emergency response application 1160 to access a two-way communication session between the ESP accessing the emergency response application 1160 and a contact associated with the selected digital emergency service request (e.g., a person associated with the alert source that generated the emergency alert for which the digital emergency service request was generated). In some embodiments, a user of the emergency response application 1160 can access a single alert view for a digital emergency service request 1113 by selecting an alert location 1125 associated with the digital emergency service request 1113 from within the interactive map 1120.

In some embodiments, the ERDP provides and facilitates failsafe procedures for digital emergency service requests. As mentioned above, similar to emergency phone calls, because a digital emergency service request is a primary request for emergency service, a digital emergency service request must be responded to by an ESP that received the digital emergency service request. In some embodiments, to ensure that a digital emergency service request is responded to by an ESP that received the digital emergency service request, it may be necessary to implement a failsafe procedure. For example, in some embodiments, after the ERDP transmits a digital emergency service request to an ESP (e.g., through an emergency response application, as described above), if the digital emergency service request is not claimed or otherwise acted on by the ESP within a predetermined time window (e.g., 5 seconds, 30 seconds, 1 minute, 5 minutes, etc.), the ERDP implements a failsafe procedure for the digital emergency service request. In some embodiments, the ERDP implements a failsafe procedure for a digital emergency service request by transmitting a second digital emergency service request (e.g., a duplicate of the first digital emergency service request) to the ESP (e.g., through an emergency response application, as described above). In some embodiments, the ERDP implements a failsafe procedure for a digital emergency service request by prompting an emergency response application that the digital emergency service request is displayed within to emphasize the appearance of the digital emergency service request within a graphical user interface of the emergency response application. For example, in some embodiments, the ERDP can prompt the emergency response application to highlight or enlarge the digital emergency service request within a list of digital emergency service requests (as described above) or highlight or enlarge an alert location associated with the digital emergency service request and displayed within an interactive map (as described above).

In some embodiments, the ERDP implements a failsafe procedure for a digital emergency service request by prompting a monitoring center system associated with the digital emergency service request (e.g., a monitoring center system that received the emergency alert for which the digital emergency service request was generated) to call the ESP that received the digital emergency service request (e.g., by dialing a ten-digit phone number associated with the ESP) in regard to the digital emergency service request. In some embodiments, when the ERDP implements a failsafe procedure for a digital emergency service request that was generated for an emergency alert that was not transmitted by an alert source (or a private security system associated with the alert source, for example) to a monitoring center system, the ERDP can select a monitoring center system communicatively coupled to the ERDP, transmit the emergency alert or the digital emergency service request to the selected monitoring center system, and prompt the selected monitoring center system to call the ESP that received the digital emergency service request in regard to the digital emergency service request. In some embodiments, when selecting a monitoring center system as part of a failsafe procedure implemented for a digital emergency service request, the ERDP selects a monitoring center system based at least in part on a location associated with the digital emergency service request (e.g., an emergency location included in an emergency alert for which the digital emergency service request was generated). For example, in some embodiments, when selecting a monitoring center system as part of a failsafe procedure implemented for a digital emergency service request, the ERDP selects a monitoring center system using a geofence system (such as the geofence system described above with respect to determining an appropriate ESP to receive an emergency alert or a digital emergency service request generated for an emergency alert). For example, in some embodiments, the ERDP can identify a location associated with the digital emergency service request, retrieve geofences associated with one or more monitoring center systems registered with or communicatively coupled to the ERDP, and determine if the location associated with the digital emergency service request falls within any of the geofences associated with the one or more monitoring center systems. If the location associated with the digital emergency service request does fall within one of the geofences, the ERDP can select the monitoring center system associated with that geofence. In some embodiments, when selecting a monitoring center system as part of a failsafe procedure implemented for a digital emergency service request, the ERDP selects a monitoring center system based at least in part on an alert source that generated an emergency alert for which the digital emergency service request was generated. For example, in some embodiments, the ERDP associates every alert source communicatively coupled to the ERDP with a monitoring center system communicatively coupled to the ERDP. In such an embodiment, when selecting a monitoring center system as part of a failsafe procedure implemented for a digital emergency service request generated for an emergency alert generated by an alert source, the ERDP automatically selects a monitoring center system preemptively associated with the alert source. In some embodiments, when selecting a monitoring center system as part of a failsafe procedure implemented for a digital emergency service request, the ERDP selects a monitoring center system based at least in part on an emergency type associated with the digital emergency service request. In some embodiments, when the ERDP selects a monitoring center system as part of a failsafe procedure implemented for a digital emergency service request, the ERDP transmits the digital emergency service request, or information associated with the digital emergency service request, to the monitoring center system (e.g., through an alarm handling software application or a monitoring center portal executed on a computing device associated with the monitoring center system, as described above). In some embodiments, the ERDP implements a failsafe procedure for a digital emergency service request by delivering a failsafe call to the ESP that received the digital emergency service request. In some embodiments, the failsafe call is a voice over internet protocol (VOIP) call. In some embodiments, the failsafe call is an interactive voice response (IVR) call.

High Priority Alerts

As described above, in various embodiments, an emergency response data platform (ERDP) can receive an emergency alert generated by an alert source, generate a digital emergency service request for the emergency alert, and transmit the digital emergency service request to an emergency service provider (ESP). In some embodiments, as described above, the digital emergency service request is a primary request for emergency service and provides one or more options for servicing or responding to the digital emergency service request. In some embodiments, when an alert source generates an emergency alert, the emergency alert is transmitted to the ERDP and a monitoring center system in parallel. In some embodiments, when an alert source generates an emergency alert, the emergency alert is transmitted first to a monitoring center system, and then to the ERDP only after the monitoring center system requests that the ERDP generate a digital emergency service request for the emergency alert, as described above. In some embodiments, when an alert source generates an emergency alert, the emergency alert is transmitted first to the ERDP, and then to a monitoring center system only after the ERDP selects the monitoring center system as part of a failsafe procedure, as described above.

In some embodiments, an emergency alert includes information specifying how the emergency alert should be processed by the ERDP. For example, in some embodiments, as mentioned above, an emergency alert includes an emergency type. In some embodiments, as mentioned above, when an emergency alert includes an emergency type, a digital emergency service request generated for the emergency alert and transmitted to an ESP through an emergency response application will be displayed within a graphical user interface of the emergency response application alongside an emergency type icon representing the emergency type included in the emergency alert. In some embodiments, as mentioned above, when an emergency alert includes an emergency type, the ERDP selects or determines an ESP to receive a digital emergency service request generated for the emergency alert at least in part on the emergency type. In some embodiments, an emergency alert includes an indication as to whether or not the ERDP should generate a digital emergency service request for the emergency alert if the ERDP receives the emergency alert. In some such embodiments, the ERDP only generates a digital emergency service request for an emergency alert if the emergency alert includes an indication that the ERDP should generate a digital emergency service request for the emergency alert if the ERDP receives the emergency alert.

Figure 12A:
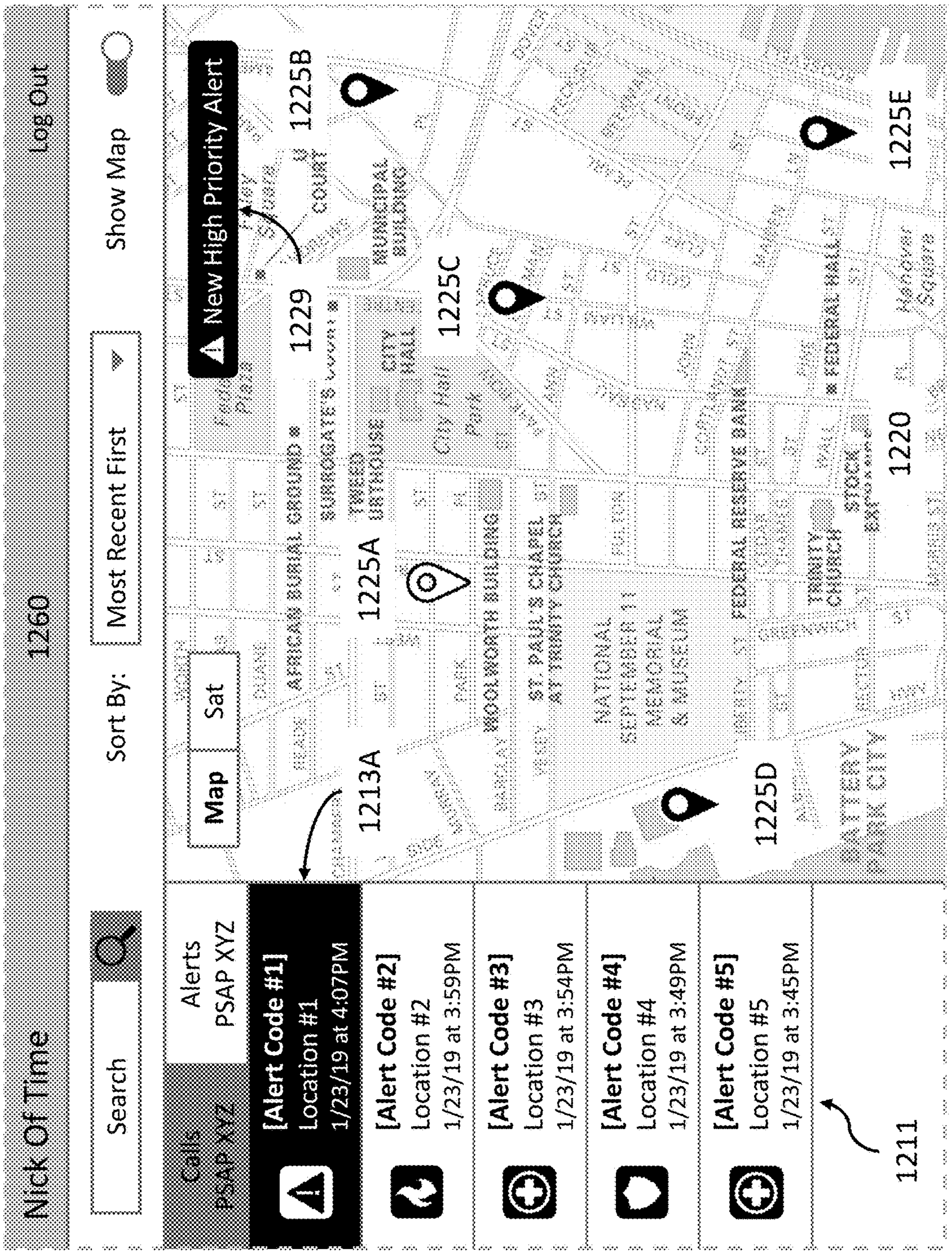
FIG. 12A illustrates a graphical user interface provided by an emergency response application, in accordance with some embodiments.
Figure 12B:
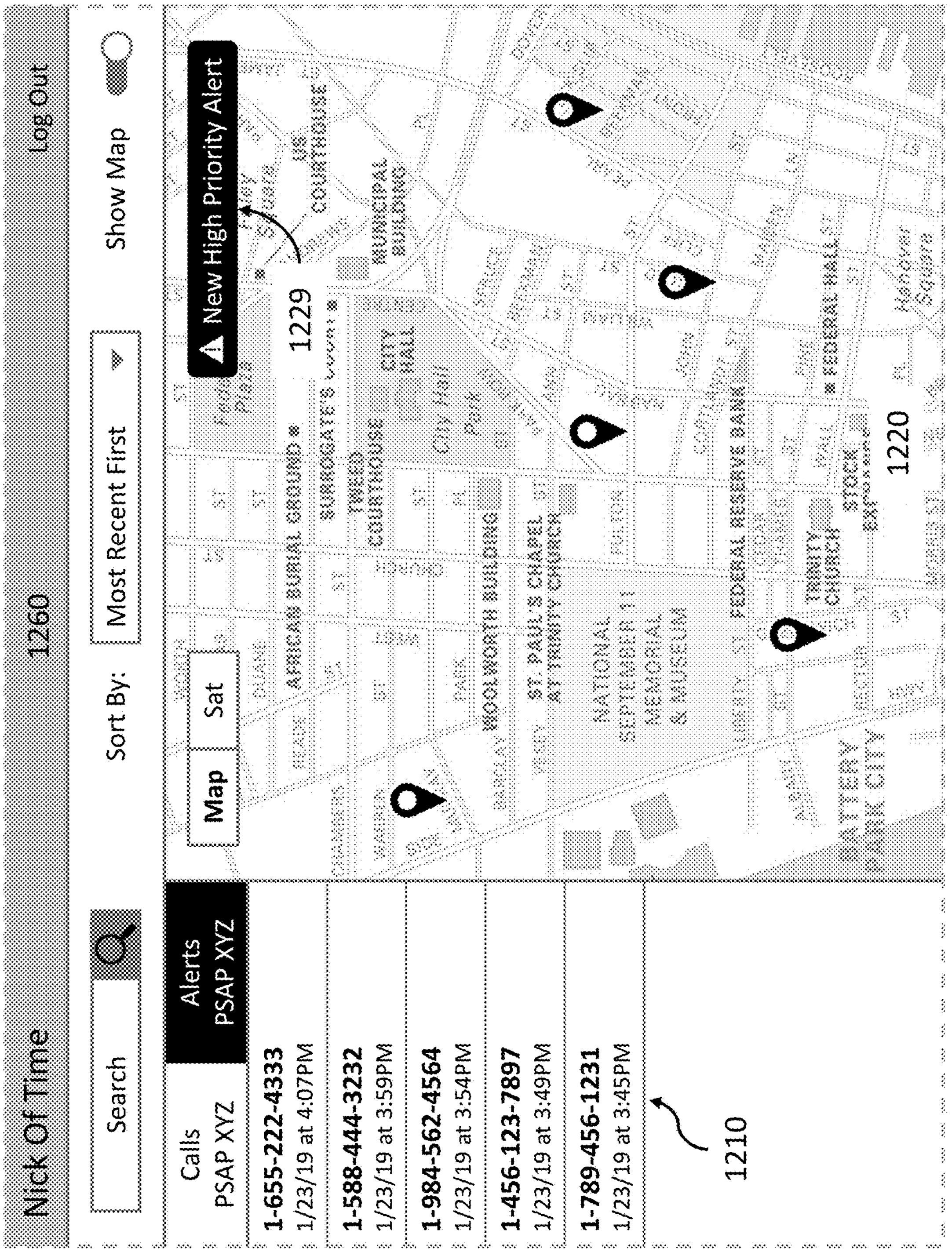
FIG. 12B illustrates a graphical user interface provided by an emergency response application, in accordance with some embodiments.

In some embodiments, an emergency alert includes an indication as to whether or not the emergency alert represents a high priority emergency (also referred to as a "high severity" emergency; e.g., a mass shooting). In some such embodiments, when the ERDP receives an emergency alert that includes an indication that the emergency alert represents a high priority emergency, the ERDP automatically generates a digital emergency service request for the emergency alert (i.e., whether or not the ERDP receives a request to generate a digital emergency service request for the emergency alert), transmits the digital emergency service request to an appropriate ESP, and immediately prompts an emergency response application that the digital emergency service request is displayed within to emphasize the appearance of the digital emergency service request within a graphical user interface of the emergency response application (i.e., without implementing a failsafe procedure). In this way, the ERDP can increase the likelihood that a digital emergency service request generated for a high priority emergency is received and acted on by an ESP as quickly as possible. A digital emergency service request generated for an emergency alert that includes an indication that the emergency alert represents a high priority emergency may be referred to as a "high priority digital emergency service request" or a "high priority alert." For example, FIG. 12A illustrates a high priority alert displayed within a graphical user interface of an emergency response application. In the example illustrated in FIG. 12A, the ERDP has received an emergency alert including an indication that the emergency alert represents a high priority emergency, automatically generated a high priority digital emergency service request for the emergency alert, transmitted the high priority digital emergency service request to an appropriate ESP through the emergency response application 1260, and immediately prompted the emergency response application 1260 to emphasize the appearance of the high priority digital emergency service request. The high priority digital emergency service request 1213A is now displayed with a list of digital emergency service requests 1211. In this example, to emphasize the appearance of the high priority digital emergency service request 1213A, the emergency response application 1260 has 1) highlighted the background of high priority digital emergency service request 1213A within the list of digital emergency service requests 1211 with a color different than that of the background of digital emergency service requests within the list of digital emergency service requests that are not high priority digital emergency service requests, 2) displayed the text of the high priority digital emergency service request 1213A in a color different than that of the text of digital emergency service requests within the list of digital emergency service requests that are not high priority digital emergency service requests, and 3) displayed a high priority emergency type icon alongside the high priority digital emergency service request 1213A. Additionally, in this example, to emphasize the appearance of the high priority digital emergency service request 1213A, the emergency response application 1260 has also displayed the alert location 1225A associated with the high priority digital emergency service request 1213A within the interactive map 1220 in a color different than that of the color of alert locations 1225 not associated with a high priority digital emergency service request. Additionally, in this example, to emphasize the appearance of the high priority digital emergency service request 1213A, the emergency response application 1260 has also displayed a New High Priority Alert icon 1229 within the graphical user interface of the emergency response application 1260. In some embodiments, as illustrated in FIG. 12B, when the graphical user interface of an emergency response application 1260 includes an incidents tab (as described above) and a digital emergency service requests tab (as described above), and when a high priority digital emergency service request is transmitted to an ESP through the emergency response application 1260 while the graphical user interface of the emergency response application 1260 is displaying a list of incidents 1210 and not a list of digital emergency service requests, the emergency response application 1260 highlights the digital emergency service requests tab, displays a New High Priority Alert icon 1229, or both, to emphasize the appearance of the high priority digital emergency service request. However, an emergency response application 1260 may emphasize the appearance of a high priority digital emergency service request in any other way.

In some embodiments, when the ERDP receives an emergency alert including an indication that the emergency alert represents a high priority emergency, alternatively, or in addition, to automatically generating a high priority digital emergency service request for the emergency alert, transmitting the high priority digital emergency service request to an appropriate ESP, and immediately prompting an emergency response application that the digital emergency service request is displayed within to emphasize the appearance of the digital emergency service request within a graphical user interface of the emergency response application, the ERDP immediately prompts a monitoring center system to call the ESP in regard to the high priority digital emergency service request (i.e., without waiting for the expiration of a predetermined time window to implement a failsafe procedure, as described above). In this way, the ERDP does not have to depend solely on a user of an emergency response application through which the high priority digital emergency service request was transmitted to the ESP noticing the high priority digital emergency service request within a graphical user interface of the emergency response application. In some embodiments, before prompting a monitoring center system to call an ESP in regard to a high priority digital emergency service request, the ERDP must first select an appropriate monitoring center system. In some embodiments, the ERDP selects an appropriate monitoring center system based at least in part on a location associated with the high priority digital emergency service request (e.g., an emergency location included in an emergency alert for which the digital emergency service request was generated). For example, in some embodiments, when selecting an appropriate monitoring center system, the ERDP selects a monitoring center system using a geofence system (such as the geofence system described above with respect to determining an appropriate ESP to receive an emergency alert or a digital emergency service request generated for an emergency alert). For example, in some embodiments, the ERDP can identify a location associated with the high priority digital emergency service request, retrieve geofences associated with one or more monitoring center systems registered with or communicatively coupled to the ERDP, and determine if the location associated with the high priority digital emergency service request falls within any of the geofences associated with the one or more monitoring center systems. If the location associated with the high priority digital emergency service request does fall within one of the geofences, the ERDP can select the monitoring center system associated with that geofence as the appropriate monitoring center system. In some embodiments, when selecting an appropriate monitoring center system, the ERDP selects a monitoring center system based at least in part on an alert source that generated an emergency alert for which the digital emergency service request was generated. For example, in some embodiments, the ERDP associates every alert source communicatively coupled to the ERDP with a monitoring center system communicatively coupled to the ERDP. In such an embodiment, when selecting an appropriate monitoring center system for a high priority digital emergency service request generated for an emergency alert generated by an alert source, the ERDP automatically selects a monitoring center system preemptively associated with the alert source. In some embodiments, when selecting an appropriate monitoring center system, the ERDP selects a monitoring center system based at least in part on an emergency type associated with the digital emergency service request. In some embodiments, when the ERDP prompts a monitoring center system to call an ESP in regard to a high priority digital emergency service request, the ERDP transmits the high priority digital emergency service request, or information associated with the high priority digital emergency service request, to the monitoring center system (e.g., through an alarm handling software application or a monitoring center portal executed on a computing device associated with the monitoring center system, as described above).

Monitoring Center Solutions

Figure 13:
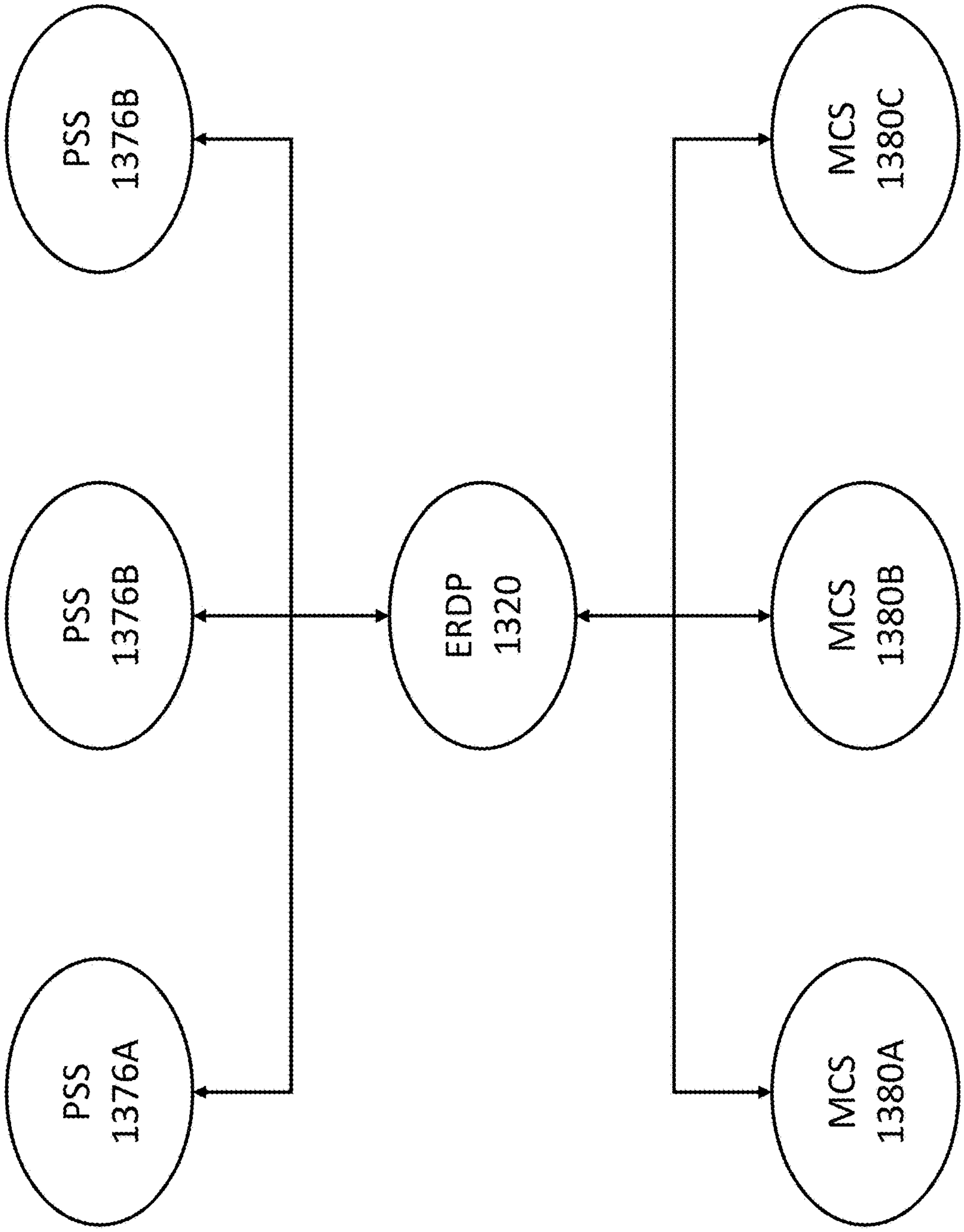
FIG. 13 depicts a diagram of an emergency response data platform in communication with a plurality of private security systems and a plurality of monitoring center systems, in accordance with some embodiments.

FIG. 13 depicts a diagram of an emergency response data platform (ERDP) 1320 communicatively coupled to a plurality of private security systems 1376 and a plurality of monitoring center systems 1380. As mentioned above, because the ERDP 1320 is communicatively coupled to both private security systems 1376 and monitoring center systems 1380, the ERDP 1320 can function as a central communication hub between private security systems 1376 and monitoring center systems 1380. As mentioned above, a monitoring center is an organization that provides monitoring and call-taking services for security systems. A monitoring center staffs one or more call-takers (typically on a 24/7 basis) who monitor the status of one or more security systems, and, when an alarm (e.g., an emergency alert autonomously generated by a device or system) is generated by one of the one or more security systems, one of the one or more call-takers responds to the alarm according to a predetermined response protocol (e.g., by calling one or more persons associated with the security system, such as a homeowner or a security guard, or by contacting emergency services). The monitoring and call-taking services provided by monitoring centers for security systems perform an essential role in emergency response by determining if an alarm represents a real emergency (and, if so, informing the appropriate authorities), or if an alarm does not represent a real emergency (e.g., a false positive). In some embodiments, a monitoring center system 1380 is associated with one or more monitoring centers (e.g., physical locations that house hardware, software, or human components of the monitoring center system). In some embodiments, a monitoring center system 1380 is not associated with any particular physical location but is instead composed of a distributed network of hardware, software, and human components. As used herein, a "monitoring center system" includes all of the hardware components (e.g., one or more computing devices, one or more server systems, etc.), software components (e.g., alarm handling software applications, call handling software applications, etc.), and human components (e.g., one or more call-takers) of a monitoring center. As used herein, a "private security system" (PSS) is an entity that provides alert-generating products and services for sale to the general public and includes all of the hardware components (e.g., devices and sensors, server systems, etc.) and software components (e.g., web applications, mobile applications, etc.) necessary to provide those alert-generating products and services. For example, in some embodiments, a private security system 1376 is a "do it yourself" (DIY) home security company that provides off-the-shelf devices (e.g., security cameras, smoke detectors, etc.) that a consumer can purchase and install in their home. The consumer may be able to configure or otherwise control those off-the-shelf devices by using a mobile application provided by the DIY home security company and installed on the consumer's mobile device (e.g., the consumer's cell phone). Or, for example, in some embodiments, a private security system 1376 is a personal emergency response system (PERS) company that provides a smartwatch that can detect when a wearer is experiencing low blood oxygen levels. Or, for example, in some embodiments, a private security system 1376 is a ride sharing company that provides a mobile application through which a rider can call for help in the event that the rider experiences an emergency during a ride (e.g., a vehicular accident or a kidnapping). However, a private security system 1376 may embody any other appropriate form. Although the ERDP 1320 is shown in FIG. 13 as communicatively coupled to a plurality of PSSs 1376 and a plurality of MCSs 1380, the ERDP 1320 may be communicatively coupled to only a single PSS 1376 and a plurality of MCSs 1380 or a plurality of PSSs 1376 and a single MCS 1380.

Figure 14A:
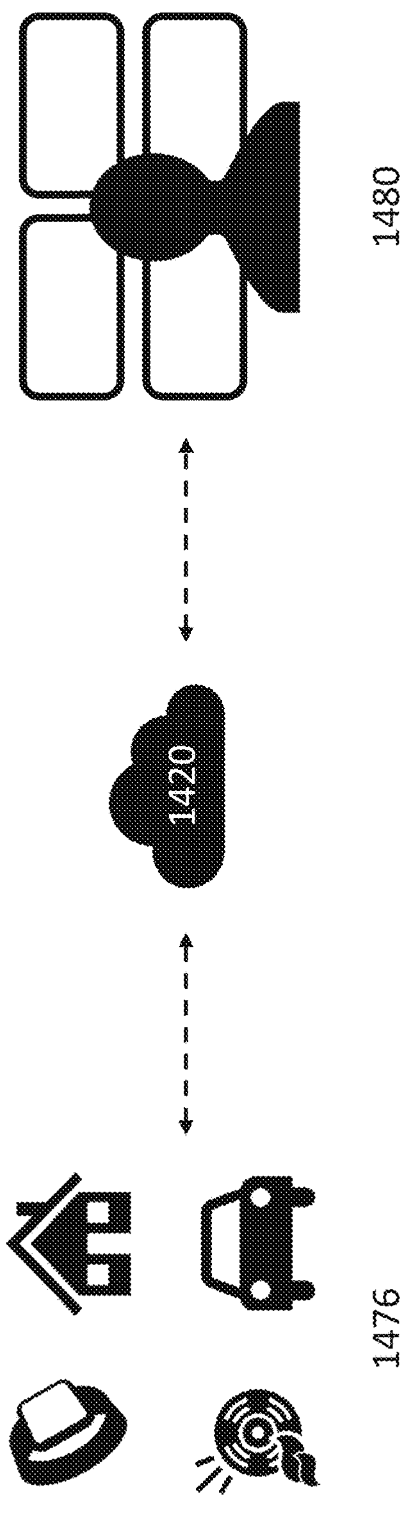
FIG. 14A depicts a process for facilitating communications between a private security system and a monitoring center system by an emergency response data platform, in accordance with some embodiments.
Figure 14B:
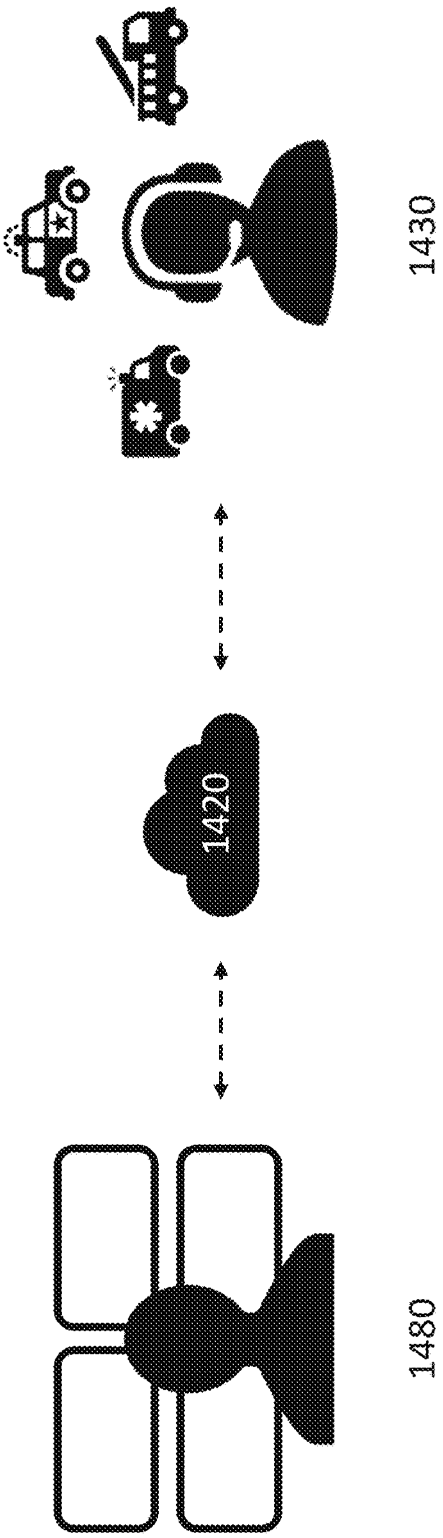
FIG. 14B depicts a process for facilitating communications between a monitoring center system and an emergency service provider by an emergency response data platform, in accordance with some embodiments.

For many private security systems, there is an advantage in providing their customers with the monitoring and call-taking services provided by monitoring centers. Consider a PERS company that provides a smartwatch that can detect when a wearer has fallen and notify the wearer's emergency contacts. Prospective customers of the PERS company may be more willing to purchase the smartwatch if the PERS company can guarantee that wearers of the smartwatch will be automatically connected to a call-taker at a 24/7 monitoring center whenever the smartwatch detects a fall. Or consider a DIY home security company that provides an off-the-shelf smoke detector that notifies homeowners when the smoke detector detects a fire. Prospective customers of the DIY home security company may be more willing to purchase the smoke detector if the DIY home security company can guarantee that a call-taker at a 24/7 monitoring center will be notified whenever the smoke detector detects a fire, so that the call-taker can call an emergency service provider on the homeowner's behalf (e.g., if the homeowner is unavailable). The monitoring and call-taking services provided by monitoring centers can therefore be extremely valuable to private security systems; however, integrating the monitoring and call-taking services provided by a monitoring center into the products and services provided by a private security system can be difficult, expensive, or time-intensive for the private security system. For example, the private security system must first find and negotiate terms with an appropriate monitoring center system. Then the private security system must engineer their products and services to incorporate elements or processes for communicating with the monitoring center system. The monitoring center system may also need to re-engineer their hardware or software systems to communicate with the products and services provided by the private security system. In addition to the time and monetary expenses incurred by the private security system in engineering their products and services to integrate with the monitoring and call-taking services provided by the monitoring center, the private security system may also have to reimburse the monitoring center system for the engineering work done by the monitoring center system to integrate with products and services provided by the private security system. As described in further detail below, by functioning as a central communication hub between private security systems 1476 and monitoring center systems 1480, the ERDP 1420 simplifies the process of integrating monitoring and call-taking services provided by monitoring centers into the products and services provided by private security systems (as depicted in FIG. 14A). Furthermore, as described in further detail below, by functioning as a central communication hub between monitoring center systems 1480 and emergency service providers (ESPs) 1430, the ERDP 1420 enables monitoring center systems to be more efficient in communicating the details of emergencies to ESPs (as depicted in FIG. 14B). In various embodiments, described herein are methods and systems for facilitating communications between monitoring center systems, private security systems, and emergency service providers.

On-the-Fly Account Creation

As mentioned above, by functioning as a central communication hub between private security systems and monitoring center systems, an emergency response data platform (ERDP) simplifies the process of integrating monitoring and call-taking services provided by monitoring center systems into the products and services provided by private security systems. For example, in some embodiments, the ERDP provides an on-the-fly (OTF) account creation service for private security systems (PSSs) and monitoring center systems (MCSs). For a typical PSS, a user purchases one or more products (e.g., security cameras, smoke detectors, PERS devices, etc.) or services (e.g., 24/7 monitoring, 911 connectivity, etc.) provided by the PSS, and the products or services are registered to a security account created for the user. The security account may be associated with information associated with the user, such as a user identifier (e.g., a phone number or an email address) and a location (e.g., the user's home address). The PSS can then provide security accounts for which monitoring or call-taking services are to be provided to an MCS, which can then create a monitoring account for each of the security accounts and store the monitoring accounts in a monitoring account database. For a typical MCS, a monitoring account must be created for a security account before the MCS can provide monitoring or call-taking services to the security account on behalf of a PSS, and the monitoring account must include at least a user identifier and a location. These requirements present complications for many PSSs. For example, providing security accounts to an MCS requires a PSS to have established a working relationship with the MCS prior to users purchasing products and services from the PSS (which, as previously discussed, poses its own set of challenges). Or for example, the location of a user of a product or service provided by a PSS may not be static or may not be provided by the user to the PSS upfront (e.g., the product provided by the PSS is a fall-detecting watch), and thus the PSS cannot preemptively provide an accurate location associated with the user to an MCS. The ERDP provides PSSs and MCSs with an OTF account creation service to alleviate these complications.

Figure 15:
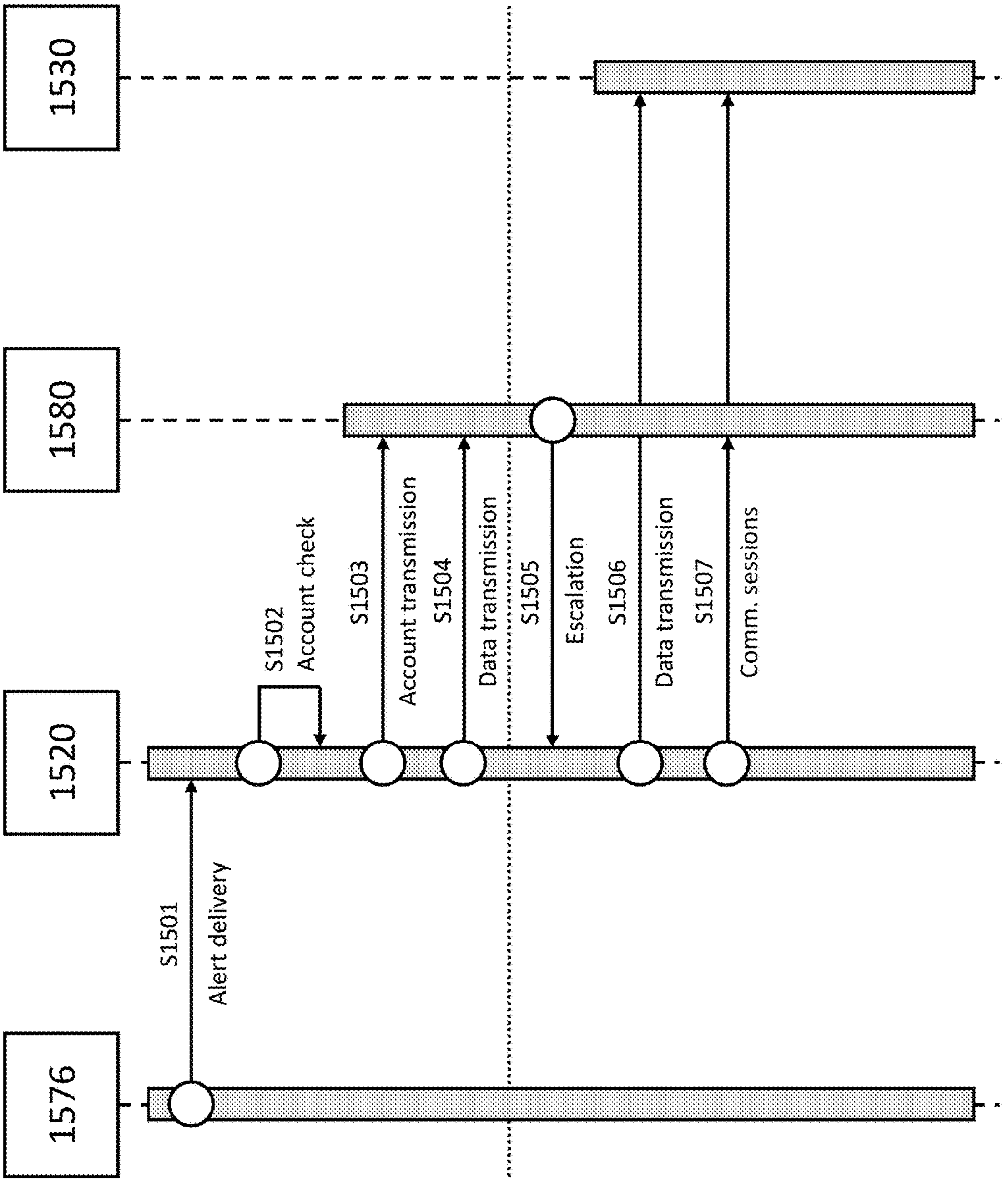
FIG. 15 depicts a diagram of an on-the-fly account creation process, in accordance with some embodiments.

FIG. 15 depicts a ladder diagram of an exemplary on-the-fly (OTF) account creation process. As depicted in FIG. 15, in some embodiments, an OTF account creation process begins at step S1501, when a private security system (PSS) 1576 transmits an emergency alert (e.g., an alarm) including emergency data including at least a user identifier and an emergency location (e.g., a device-based hybrid location) associated with a security account (as described above) to the emergency response data platform (ERDP) 1520. In some embodiments, after the ERDP 1520 receives the emergency alert, at step S1502, the ERDP 1520 cross-references the user identifier included in the emergency alert with a monitoring account database stored within or otherwise accessible to the ERDP 1520 to determine if a monitoring account associated with the user identifier has already been created. If a monitoring account associated with the user identifier has been created, the ERDP 1520 updates the monitoring account to include the emergency location included in the emergency alert. If a monitoring account associated with the user identifier has not been created, the ERDP 1520 creates a monitoring account associated with the user identifier (or initiates the creation of a monitoring account associated with the user identifier; e.g., by transmitting the user identifier and the emergency location to a monitoring center system), including at least the user identifier and the emergency location included in the emergency alert, and stores the monitoring account associated with the user identifier in the monitoring account database. In some embodiments, when the ERDP 1520 creates a monitoring account (or initiates the creation of a monitoring account), the ERDP 1520 also assigns a monitoring center system (MCS) 1580 to the monitoring account. The monitoring account is then associated with both a user identifier and an MCS 1580. In some embodiments, after the ERDP 1520 creates the monitoring account, at step S1503, the ERDP 1520 provides the monitoring account associated with the user identifier to the MCS 1580. In some embodiments, the ERDP 1520 provides the monitoring account associated with the user identifier to the MCS 1580 by transmitting the monitoring account associated with the user identifier to the MCS 1580. In some embodiments, the monitoring account database is stored within the MCS 1580, such that the monitoring account associated with the user identifier is provided to the MCS 1580 as soon as it is created and stored within the monitoring account database by the ERDP 1520. In some embodiments, the monitoring account database is shared between the ERDP 1520 and the MCS 1580, such that the monitoring account associated with the user identifier is provided to the MCS 1580 as soon as it is created and stored within the monitoring account database by the ERDP 1520. In some embodiments, after the ERDP 1520 provides the monitoring account associated with the user identifier to the MCS 1580, at step S1504, the ERDP 1520 then transmits emergency data associated with the user identifier (e.g., the user identifier, the emergency location, and any other information or data associated with the emergency alert, such as personal data, health data, medical data, emergency contacts, multimedia, etc.) to the MCS 1580, so that the MCS 1580 can then provide monitoring and call-taking services to the security account on behalf of the PSS 1576 (as described above). In some embodiments, the emergency data associated with the user identifier is transmitted to the MCS 1580 for display within a graphical user interface (GUI) provided by a software application executed on a computing device associated with the MCS 1580 (e.g., automation software, or a monitoring center portal, as described above). In some embodiments, the emergency data is first received by the ERDP 1520 from the PSS 1576 before the ERDP 1520 transmits the emergency data to the MCS 1580. In some embodiments, a first portion of the emergency data is received by the ERDP 1520 from the PSS 1576 and a second portion of the emergency data is received by the ERDP 1520 from a third-party system, as described above. In some embodiments, the emergency data includes an account holder name associated with the security account. In some embodiments, after the ERDP 1520 transmits the emergency data to the MCS 1580, the ERDP 1520 receives updated emergency data associated with the user identifier from the PSS 1576 and then transmits the updated emergency data associated with the user identifier to the MCS 1580 (e.g., for display within a GUI provided by a software application executed on a computing device associated with the MCS 1580). By providing PSSs 1576 and MCSs 1580 with an OTF account creation service, the ERDP 1520 meaningfully alleviates the complications involved in integrating with MCSs 1580 for PSSs 1576 and thereby also increases business opportunities for MCSs 1580.

As mentioned above, in some embodiments, in addition to facilitating more efficient communications between PSSs 1576 and MCSs 1580, the ERDP 1520 also facilitates more efficient communications between MCSs 1580 and emergency service providers (ESPs) 1530. For example, in some embodiments, as depicted in FIG. 15, after the ERDP 1520 transmits the emergency data to the MCS 1580, the MCS 1580 determines, through monitoring and call-taking services provided by the MCS 1580 to the security account on behalf of the PSS 1576, that the emergency alert transmitted by the PSS 1576 to the ERDP 1520 represents a real emergency and that emergency services should be requested. Then, at step S1505, the MCS 1580 (e.g., a call-taker associated with the MCS 1580, as described above) prompts the ERDP 1520 to request emergency services by transmitting an escalation request to the ERDP 1520 (e.g., by selecting a Push to PSAP button within a GUI of a software application executed on a computing device associated with the MCS 1580, as described above). In some embodiments, after the ERDP 1520 receives the escalation request, at step S1506, the ERDP 1520 transmits the emergency data (or a portion of the emergency data) to an ESP 1530. In some embodiments, before transmitting the emergency data to an ESP 1530, the ERDP 1520 first determines an appropriate ESP 1530 to receive the emergency data using the emergency location included in the emergency alert (e.g., by processing the emergency location included in the emergency alert through a geofencing system, as described above). In some embodiments, after the ERDP 1520 transmits the emergency data (or a portion of the emergency data) to an ESP 1530, at step S1507, the ERDP 1520 facilitates a two-way communication session (as described above) between the MCS 1580 and the ESP 1530.

Automated Monitoring Call Flows

As mentioned above, monitoring center systems provide monitoring and call-taking services to the customers of security systems. For example, as mentioned above, when an alarm is generated by a security system (e.g., when a fire is detected by a smoke detector, or when a security camera detects an intruder, or when a user selects a panic button within a graphical user interface of a mobile application), a call-taker associated with a monitoring center system providing monitoring and call-taking services to the security system responds to the alarm according to a predetermined response protocol. For example, the predetermined response protocol may dictate that the call-taker first attempt to contact an account holder associated with a security account (as described above) for which the alarm was generated (e.g., by calling a phone number associated with the account holder). In this example, if the call-taker is able to contact the account holder and determine that the alarm does not represent a real emergency (e.g., a fire detected by a smoke detector is only a smoking toaster), the call-taker can close out the alarm and end the predetermined response protocol. In this example, if the call-taker is able to contact the account holder and determine that the alarm does represent a real emergency, the call-taker can request emergency services on behalf of the security account (e.g., by contacting an emergency service provider). In this example, if the call-taker is unable to contact the account holder, the predetermined response protocol dictates that the call-taker then attempt to contact an emergency contact associated with the security account (e.g., a spouse of the account holder). In this example, if the call-taker is able to contact the emergency contact and determine that the alarm does not represent a real emergency, the call-taker can close out the alarm and end the predetermined response protocol. In this example, if the call-taker is unable to contact the emergency contact, the predetermined response protocol dictates that the call-taker then request emergency services on behalf of the security account. However, a predetermined response protocol for an alarm may take on any appropriate form. A predetermined response protocol is typically a default protocol determined by the monitoring center system or a custom protocol determined by the security system. Different security systems may require different predetermined response protocols based on the nature of their security systems or the desires of their customers. Because of the varying, dynamic, and sensitive nature of these predetermined response protocols, call-takers associated with monitoring center systems must be extremely vigilant in executing the response protocols, especially when they must manually manage the process of attempting to contact account holders, emergency contacts, or emergency service providers.

Figure 16:
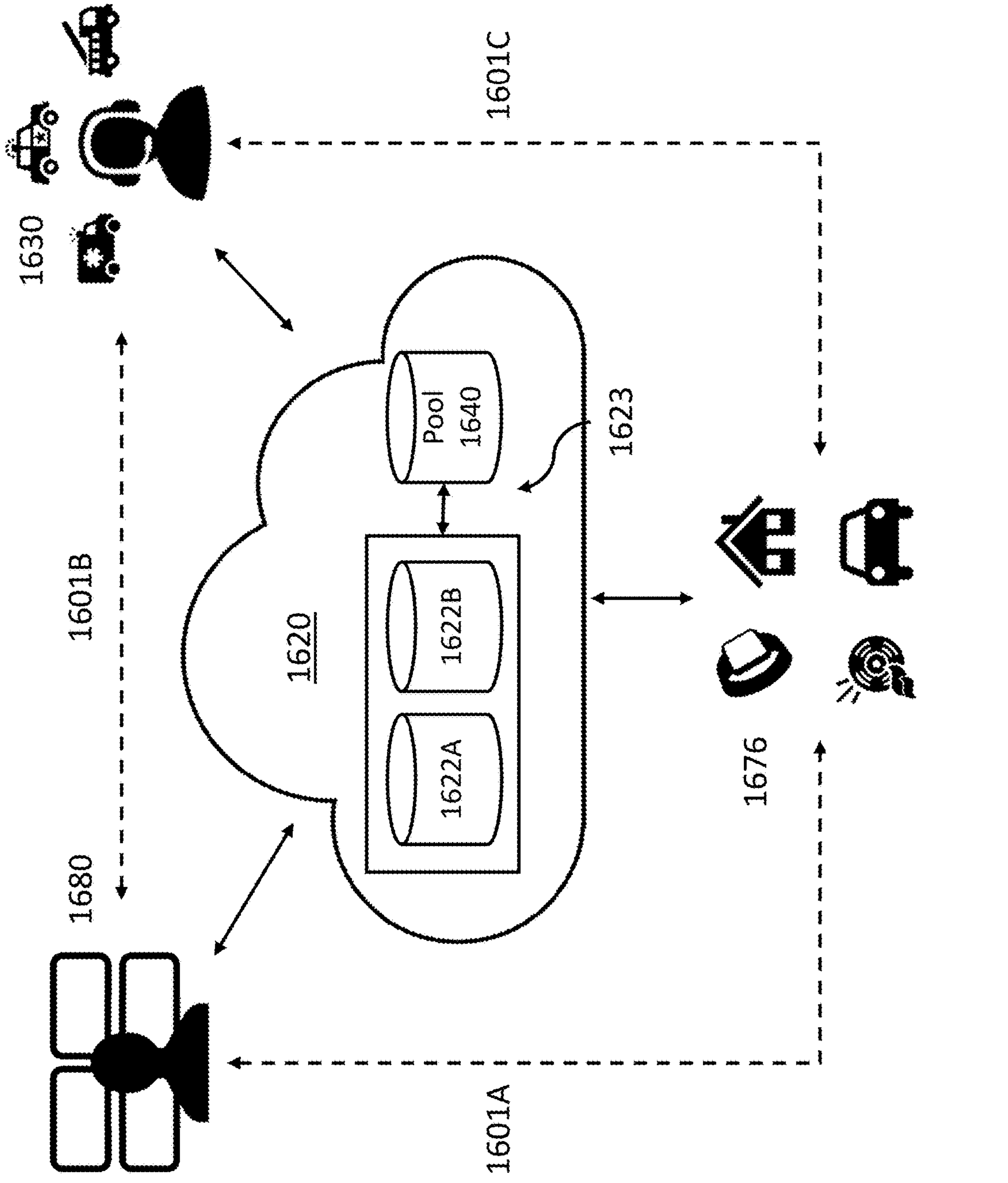
FIG. 16 depicts a system for facilitating communications between a private security system, a monitoring center system, and an emergency service provider by an emergency response data platform, in accordance with some embodiments.

In various embodiments, by functioning as a central communication hub between private security systems, monitoring center systems, and emergency service providers, an emergency response data platform (ERDP) can automate the execution of predetermined response protocols for monitoring center systems. FIG. 16 depicts a system for providing an automated monitoring call flow to a monitoring center system by an emergency response data platform. In some embodiments, as depicted in FIG. 16, the ERDP 1620 is communicatively coupled to a private security system (PSS) 1676, a monitoring center system (MCS) 1680, and an emergency service provider (ESP) 1630. Because the ERDP 1620 is communicatively coupled to both the PSS 1676 and the MCS 1680, the ERDP 1620 can establish a communication link 1601A between the PSS 1676 and the MCS 1680 and facilitate communication sessions between the PSS 1676 and the MCS 1680 through the communication link 1601A. Likewise, because the ERDP 1620 is communicatively coupled to both the MCS 1680 and the ESP 1630, the ERDP 1620 can establish a communication link 1601B between the MCS 1680 and the ESP 1630 and facilitate communication sessions between the MCS 1680 and the ESP 1630 through the communication link 1601B. Likewise, because the ERDP 1620 is communicatively coupled to both the ESP 1630 and the PSS 1676, the ERDP 1620 can establish a communication link 1601C between the ESP 1630 and the PSS 1676 and facilitate communication sessions between the ESP 1630 and the PSS 1676 through the communication link 1601C. Through communication links 1601A-1601C and employing the emergency flow management system (EFMS) 1623 (as described above), the ERDP 1620 can execute and automate most or all of the steps of a predetermined response protocol (as described above) for an MCS 1680.

For example, in some embodiments, a PSS 1676 can use the emergency flow management system 1623 to select or create an automated monitoring call flow mimicking the predetermined response protocol (e.g., within an emergency flow configuration editor, as described above) that the PSS 1676 would require an MCS 1680 to execute when the PSS 1676 transmits an emergency alert to the MCS 1680 (e.g., directly to the MCS 1680 or indirectly to the MCS 1680 through the ERDP 1620). For example, a PSS 1676 can select (e.g., from a default set of automated monitoring call flows provided by the EFMS 1623) or create an automated monitoring call flow that, when triggered, automatically performs the following steps: 1) creating a communication bridge; 2) establishing a voice call with the MCS 1680 and adding the voice call established with the MCS 1680 to the communication bridge; and 3) establishing a voice call with an account holder associated with a security account (as described above) for which the emergency alert was generated and adding the voice call established with the account holder to the communication bridge, so that the MCS 1680 can speak to the account holder to determine if the emergency alert represents a real emergency. In this example, if a voice call with the account holder cannot be established, the automated monitoring call flow then automatically establishes a voice call with an ESP 1630 and adds the voice call established with the ESP 1630 to the communication bridge, so that the MCS 1680 can request emergency services on behalf of the security account. In this example, if the voice call with the account holder can be established, the automated monitoring call flow provides the MCS 1680 with a first option to end the automated monitoring call flow (such as by entering a dial tone for '1'), should the MCS 1680 determine that the emergency alert does not represent a real emergency, and a second option to end the voice call with the account holder, establish a voice call with an ESP 1630, and add the voice call established with the ESP 1630 to the communication bridge (such as by entering a dial tone for '2'), should the MCS 1680 determine that the emergency alert does represent an emergency alert. The EFMS 1623 then associates the selected or created automated monitoring call flow with the PSS 1676 and stores the automated monitoring call flow within an automated monitoring call flow database 1622A. In this example, when the PSS 1676 transmits an emergency alert to the ERDP 1620, the ERDP 1620 retrieves a trigger script (as described above) associated with the automated monitoring call flow from the EFMS 1623 and provides the trigger script to an MCS 1680 (e.g., for display within a graphical user interface of a software application executed on a computing device associated with the MCS 1680). When the MCS 1680 selects the trigger script, the EFMS 1623 is prompted to execute the automated monitoring call flow, so that the MCS 1680 (e.g., a call-taker associated with the MCS 1680) does not have to manually execute a predetermined response protocol.

To enable call-back from ESP 1630 to MCS 1680, ERDP 1620 may use a pool 1640 of several telephone numbers that are allocated for establishing communication bridges. ERDP 1620 may select one of the telephone numbers from the pool 1640, associated the selected number with an alert identifier, and associate the selected number with a particular telephone number or telephone extension number of the call-taker associated with the MCS 1680 to establish communication bridge 1601B (and/or communication bridges 1601A/1601C). If a call-taker associated with the ESP 1630 needs additional information after a call, the ESP call-taker may select "dial-back", "call-back", or a similar button/feature in the emergency response application GUI. ERDP 1620 may use the established communication bridge (e.g., uses the selected number from the pool 1640) to re-connect a communication system of the ESP 1630 to a communication system of the MCS 1680. Often times an MCS may have several phone numbers with several operators. The individual phone numbers may be merged into a single number when external calls are made, so calling back the pertinent individual as an MCS may be nearly impossible for an ESP operator. The ERDP 1620 may solve this problem by using the pool 1640 and keeping a connection bridge active/available/reserved (e.g., for quick reconnection) until an associated alert is resolved and/or until a pre-determined time duration (e.g., 10 minutes) expires.

Figure 17:
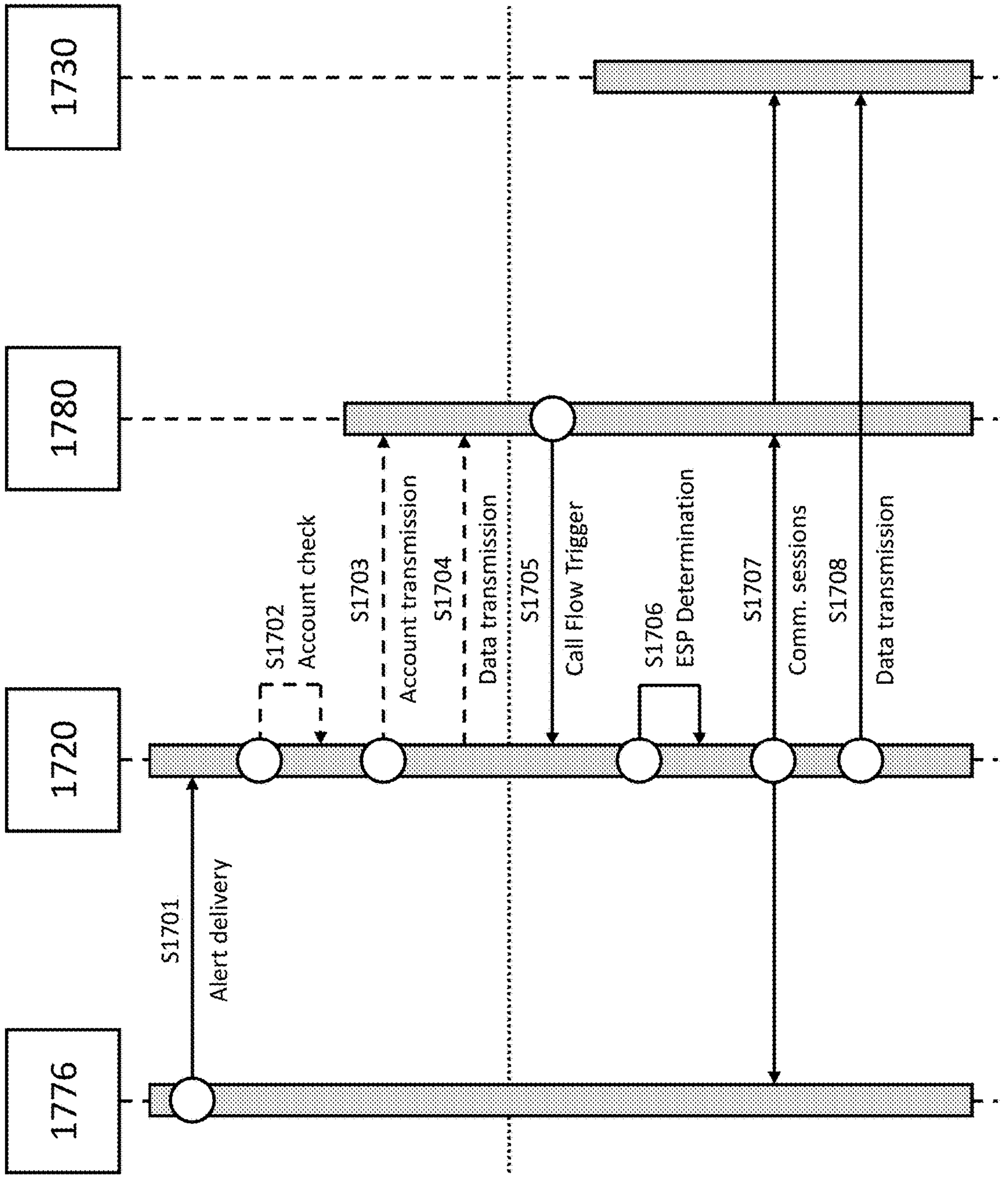
FIG. 17 depicts a diagram of an execution of an automated monitoring call flow, in accordance with some embodiments.
Figure 18A:
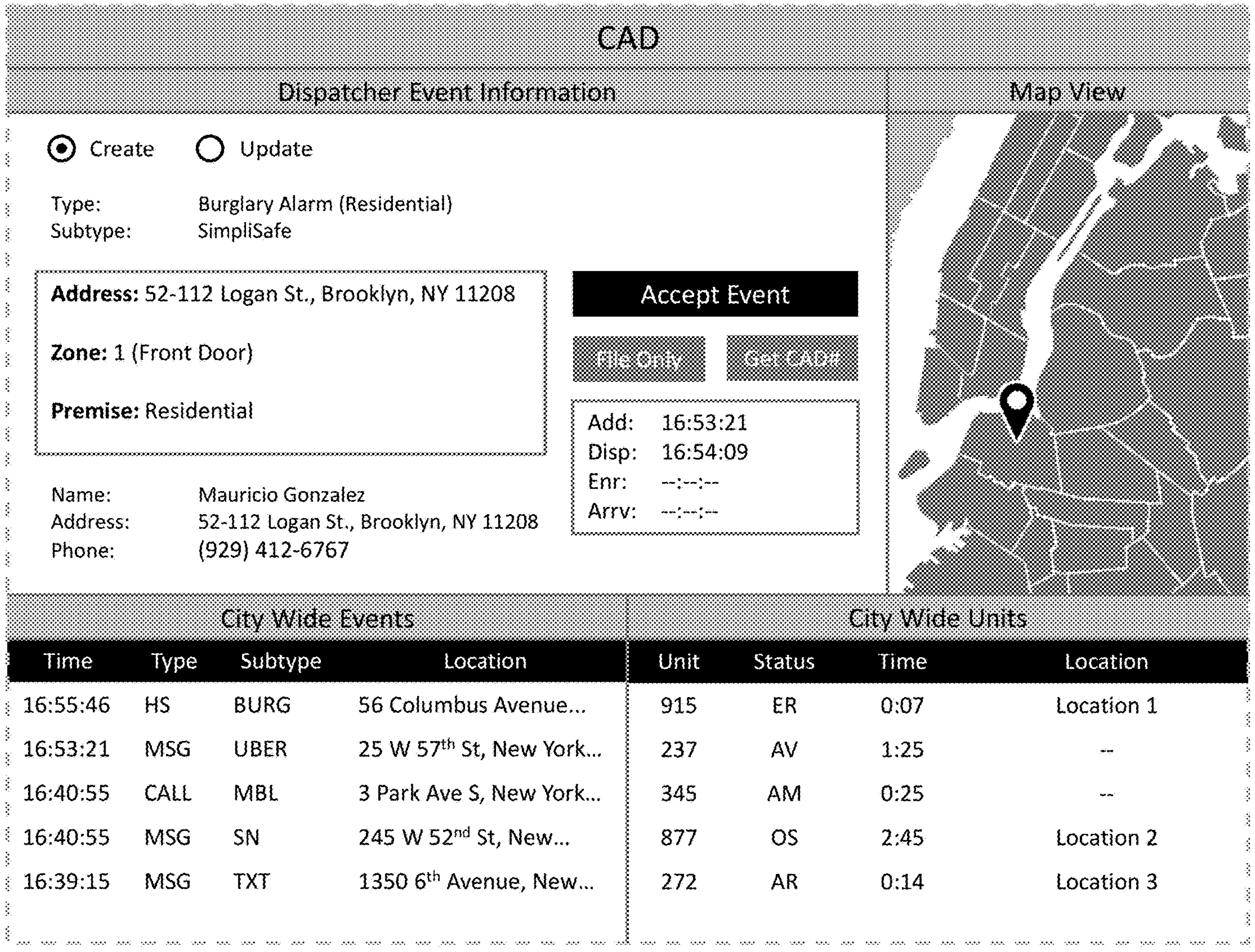
FIG. 18A illustrates a graphical user interface provided by a computer aided dispatch system, in accordance with some embodiments.
Figure 18B:
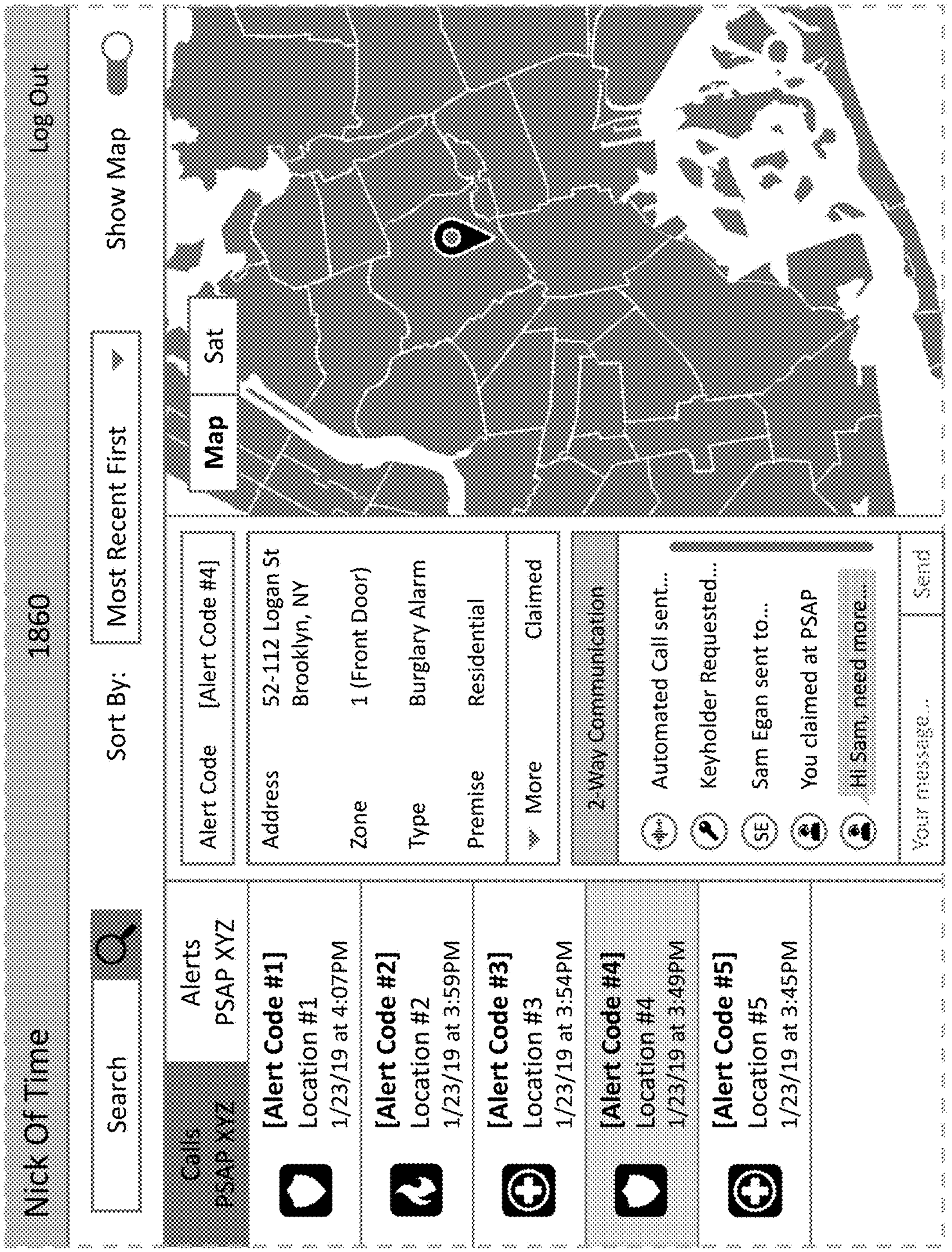
FIG. 18B illustrates a graphical user interface provided by an emergency response application, in accordance with some embodiments.

FIG. 17 depicts a ladder diagram of an exemplary execution of an automated monitoring call flow. As depicted in FIG. 17, in some embodiments, the execution of an automated monitoring call flow begins at step S1701, when a PSS 1776 transmits an emergency alert (e.g., an alarm) including emergency data including at least a user identifier and an emergency location (e.g., a device-based hybrid location) associated with a security account (as described above) to the ERDP 1720. In some embodiments, after the ERDP 1720 receives the emergency alert, at step S1705, the MCS 1780 triggers an automated monitoring call flow associated with the PSS 1776. In some embodiments, after the MCS 1780 triggers the automated call flow associated with the PSS 1776, at step S1706, the ERDP 1720 determines an ESP 1730 appropriate to respond to the emergency alert (although it will be appreciated that the ERDP 1720 can determine an ESP 1730 appropriate to respond to the emergency alert at any point before emergency data associated with the emergency alert is transmitted to an ESP 1730, or at any point before a communication session is facilitated between the MCS 1780 and an ESP 1730). In some embodiments, the ERDP 1720 determines an ESP 1730 appropriate to respond to the emergency alert using the emergency location included in the emergency alert (e.g., by processing the emergency location included in the emergency alert through a geofencing system, as described above). In some embodiments, after the MCS 1780 triggers the automated monitoring call flow associated with the PSS 1776, at step S1707, the ERDP 1720 (e.g., the EFMS included in the ERDP 1720, as described above) executes the automated monitoring call flow associated with the PSS 1776, including facilitating at least a first communication session between the MCS 1780 and an electronic device associated with the user identifier and a second communication session between the MCS 1780 and the ESP 1730 (however, as described above, an automated monitoring call flow may include any number or combination of communication sessions). In some embodiments, both the first and second communication sessions are voice-based communication sessions. In some embodiments, both the first and second communication sessions are text-based communication sessions. In some embodiments, one of the first and second communication sessions is a text-based communication session and the other is a voice-based communication session. In some embodiments, after the ERDP 1720 executes the automated monitoring call flow associated with the PSS 1776, at step S1708, the ERDP 1720 transmits emergency data (or a portion of the emergency data) associated with the emergency alert to the ESP 1730. In some embodiments, the emergency data transmitted to the ESP 1730 is displayed within a graphical user interface of a software application executed on a computing device associated with the ESP 1730. In some embodiments, as illustrated in FIG. 18A, the software application is a computer aided dispatch (CAD) program. In some embodiments, as illustrated in FIG. 18B, the software application is an emergency response application 1860 provided to the ESP 1730 by the ERDP 1720 (as described above). In some embodiments, as depicted in FIG.

17, after the PSS 1776 transmits the emergency alert to the ERDP 1720, the execution of the automated monitoring call flow continues with an on-the-fly (OTF) account creation process (as described above) in steps S1702-S1704 before the MCS 1780 triggers the automated monitoring call flow in step S1705.

Figure 19A:
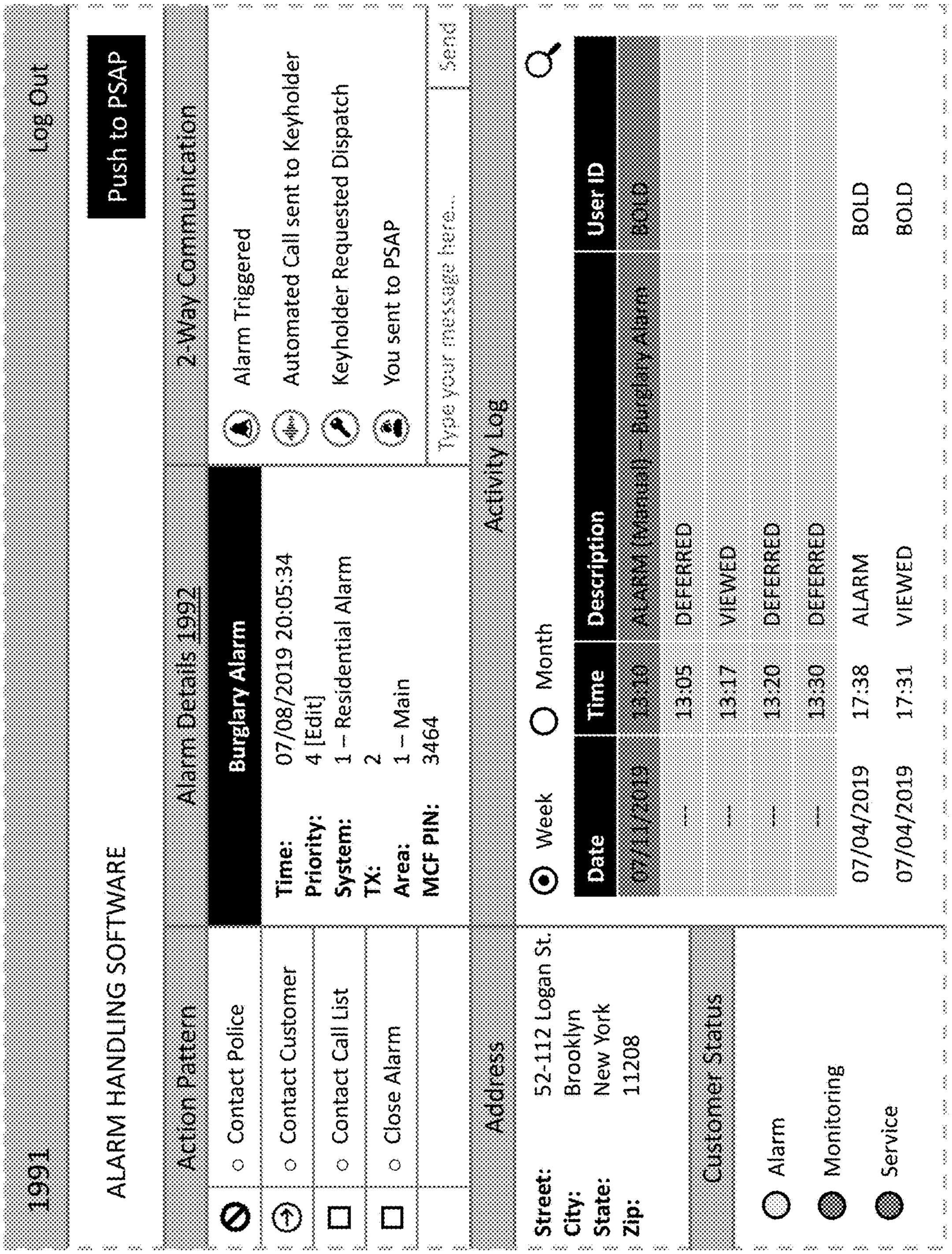
FIG. 19A illustrates a graphical user interface provided by an alarm handling application, in accordance with some embodiments.
Figure 19B:
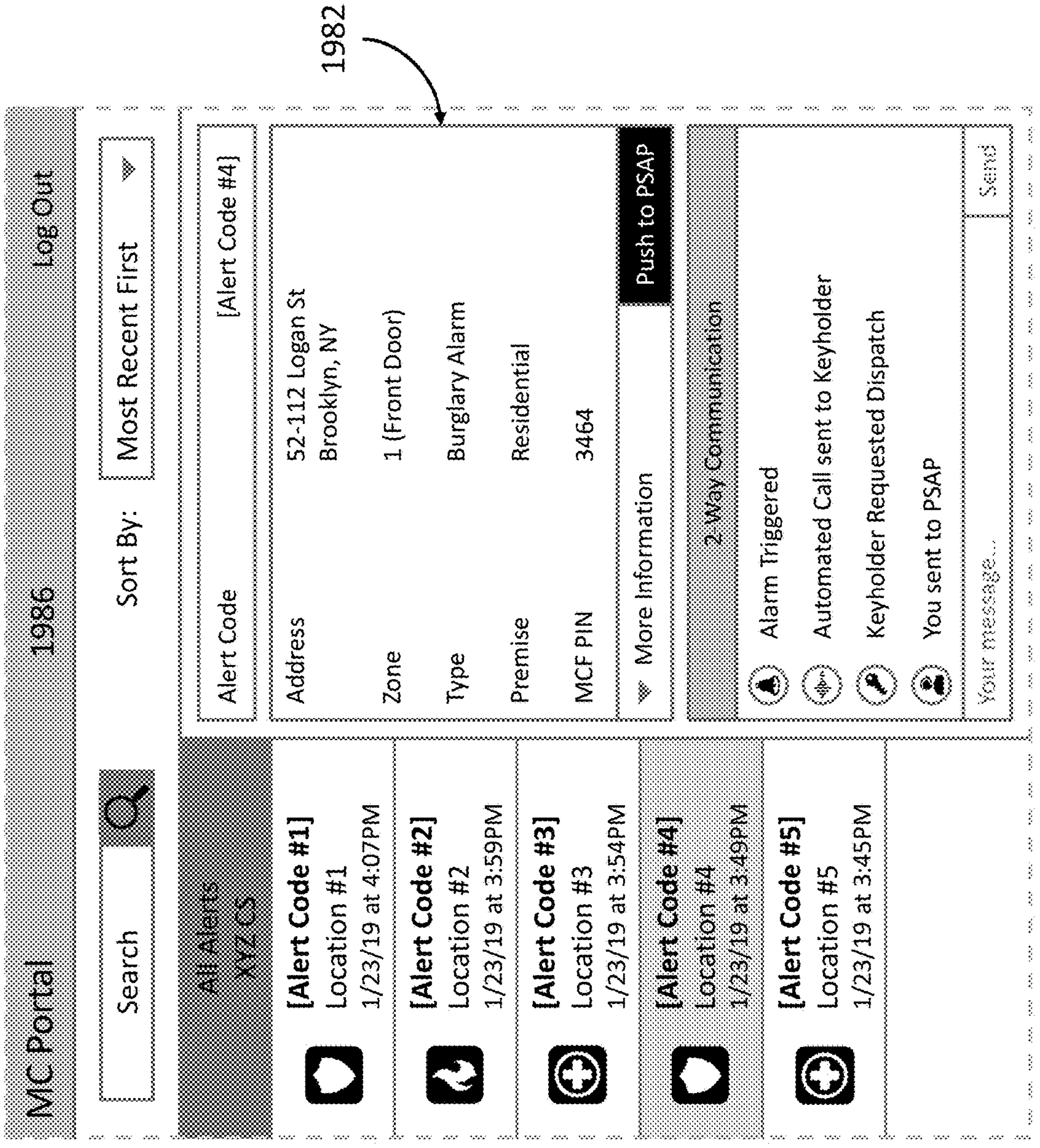
FIG. 19B illustrates a graphical user interface provided by a monitoring center portal, in accordance with some embodiments.

In some embodiments, the MCS 1780 triggers an automated monitoring call flow associated with the PSS 1776 by selecting a trigger script from within a graphical user interface of a software application executed on a computing device associated with the MCS 1780, as mentioned above. In some embodiments, the software application is automation software, as described above. In some embodiments, the software application is a monitoring center portal provided to the MCS 1780 by the ERDP 1720, as described above. In some embodiments, the trigger script is provided to the MCS 1780 by the ERDP 1720 after the ERDP 1720 receives the emergency alert and uses emergency data included in the emergency alert (e.g., the user identifier, or an identifier of the PSS 1776 itself) to retrieve the trigger script from an automated monitoring call flow database, as described above. In some embodiments, the MCS 1780 triggers an automated monitoring call flow associated with the PSS 1376 by dialing into the EFMS. For example, in some embodiments, the EFMS provides a monitoring call flow phone number that an MCS 1780 can dial to trigger an automated monitoring call flow. In some embodiments, the EFMS associates each automated monitoring call flow stored in the automated monitoring call flow database with a different and unique monitoring call flow phone number, so that the EFMS can instantly determine which automated monitoring call flow to execute based on the monitoring call flow phone number dialed by a MCS 1780. In some embodiments, the EFMS associates automated monitoring call flows stored in the automated monitoring call flow database with PIN codes and provides only a single monitoring call flow phone number to MCSs 1780. In such an embodiment, when an MCS 1780 dials the monitoring call flow phone number, the MCS 1780 must also enter a valid PIN code associated with an automated monitoring call flow to prompt the EFMS to execute the automated monitoring call flow. In some embodiments, after the ERDP 1720 receives an emergency alert from a PSS 1776, the ERDP 1720 provides a PIN code associated with an automated monitoring call flow associated with the PSS 1776 to an MCS 1780, so that the MCS 1780 can dial into the EFMS (e.g., by dialing a monitoring call flow phone number provided by the EFMS) and enter the PIN code to prompt the EFMS to execute the automated monitoring call flow associated with the PSS 1776. In some embodiments, the ERDP 1720 provides the PIN code to the MCS 1780 by transmitting the PIN code to the MCS 1780 for display within a graphical user interface of a software application executed on a computing device associated with the MCS 1780. In some embodiments, the software application is automation software, as illustrated in FIG. 19A. As illustrated in FIG. 19A, a PIN code (MCF PIN 3464) associated with an automated monitoring call flow has been transmitted to an MCS and is now displayed within an Alarm Details section 1992 of a graphical user interface of automation software 1991. In some embodiments, the software application is a monitoring center portal provided by the ERDP 1720 to the MCS 1780, as illustrated in FIG. 19B. As illustrated in FIG. 19B, a PIN code (MCF PIN 3464) associated with an automated monitoring call flow has been transmitted to an MCS and is now displayed within an Alarm Details section 1982 of a graphical user interface of monitoring center portal 1986. In some embodiments, the ERDP 1720 provides the PIN code to the MCS 1780 by transmitting the PIN code within a text message to a computing device associated with the MCS 1780.

Figure 20:
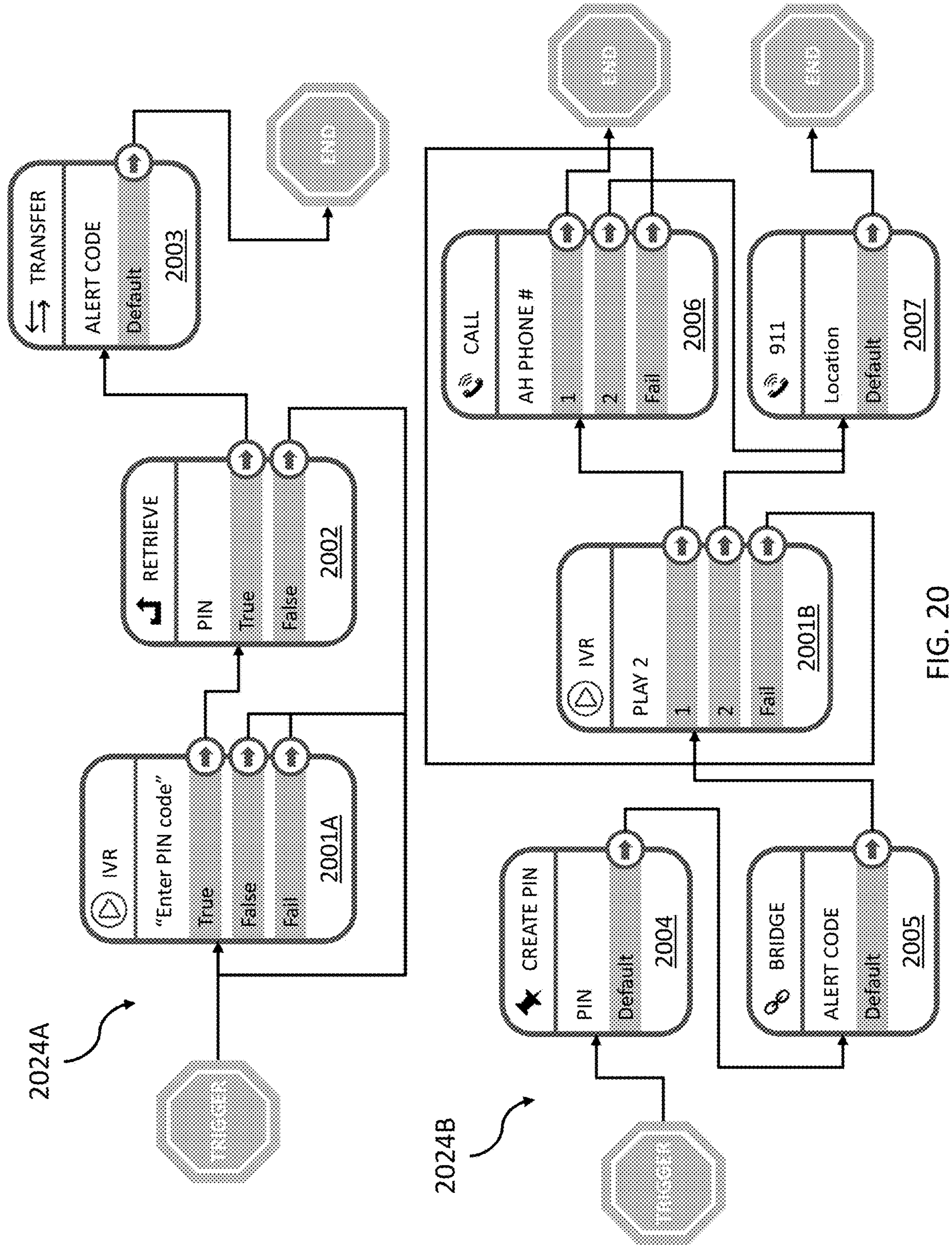
FIG. 20 illustrates an emergency flow and an automated monitoring call flow within an emergency flow configuration editor, in accordance with some embodiments.

As mentioned above, in some embodiments, an MCS must dial into the EFMS and enter a PIN code to prompt the EFMS to execute an automated monitoring call flow associated with the PIN code. In some embodiments, when a PSS transmits an emergency alert to the ERDP, the ERDP prompts the EFMS to begin the execution an automated monitoring call flow associated with the PSS, but the automated monitoring call flow is not fully executed until an MCS dials into the EFMS and enters a PIN code associated with the automated monitoring call flow. In some embodiments, the EFMS receives the PIN code from the MCS through an emergency flow. For example, FIG. 20 illustrates an emergency flow and an automated monitoring call flow as they might appear within an emergency flow configuration editor (as described above), in some embodiments. As illustrated in FIG. 20, in this example, when the ERDP receives an emergency alert from a PSS associated with automated monitoring call flow 2024B, the ERDP prompts the EFMS to begin the execution of the automated monitoring call flow 2024B. In this example, as illustrated in FIG. 20, the automated monitoring call flow 2024B begins with Create PIN block 2004, which instructs the EFMS to generate a PIN code for the automated monitoring call flow 2024B. The ERDP can then provide the PIN code to an MCS (as described above). In this example, the automated monitoring call flow 2024B then continues with Create Emergency Bridge block 2005, which instructs the EFMS to create a communication bridge (as described above) for the automated monitoring call flow 2024B. In this example, the automated monitoring call flow 2024B then waits until a voice call is added to the communication bridge. In this example, after the PIN code is generated by the automated monitoring call flow 2024B and provided to the MCS (as described above), the MCS can dial into the EFMS using a monitoring call flow phone number (as described above), which prompts the EFMS to execute emergency flow 2024A. In this example, the emergency flow 2024A begins with an Interactive Voice Response (IVR) block 2001A (as described above), which instructs the EFMS to play the message "Enter PIN code" and wait for the MCS to enter the PIN code generated by the automated monitoring call flow 2024B (e.g., using dial tones). In this example, as illustrated in FIG. 20, if the MCS enters an invalid code or fails to enter a code within a predetermined timeframe (e.g., 30 seconds), the emergency response flow 2024A repeats IVR block 2001A. In this example, when the MCS enters a valid PIN code (e.g., the PIN code generated by the automated monitoring call flow 2024B), the emergency flow 2024A continues with Retrieve block 2002, which instructs the EFMS to use the PIN code to identify, from within an automated monitoring call flow database (as described above), an automated monitoring call flow associated with the PIN code (e.g., the automated monitoring call flow 2024B). In this example, if the Retrieve block 2002 fails to identify an automated monitoring call flow associated with the PIN code, the emergency flow 2024A returns to IVR block 2001A; however, if the Retrieve block 2002 is successful in identifying an automated monitoring call flow associated with the PIN code, the emergency flow 2024A continues with Transfer block 2003, which instructs the EFMS to add the MCS's voice call (e.g., the voice call created when the MCS dialed into the EFMS) to the communication bridge created by the automated monitoring call flow 2024B, thereby ending the emergency flow 2024A.

In the example illustrated in FIG. 20, when the MCS's voice call is added to the communication bridge created by the automated monitoring call flow 2024B, the automated monitoring call flow 2024B continues with IVR block 2001B, which instructs the EFMS to play the message "Press '1' to call account holder or press '2' to call emergency services," and wait for a dial tone response from the MCS. In this example, if the MCS fails to respond within a predetermined timeframe (e.g., 30 seconds), the automated monitoring call flow 2024B repeats IVR block 2001B. In this example, at IVR block 2001B, if the MCS presses '2,' the automated monitoring call flow 2024B continues with Connect to 9-1-1 block 2007 (as described above), which instructs the EFMS to establish a voice call with an ESP (e.g., by dialing an administrative phone number associated with an ESP that the ERDP has determined to be appropriate to respond to the emergency alert, as described below) and connect the voice call established with the ESP to the communication bridge created by the automated monitoring call flow 2024B, thereby ending the automated monitoring call flow 2024B. In this example, at IVR block 2001B, if the MCS presses '1,' the automated monitoring call flow 2024B continues with Call block 2006, which instructs the EFMS to establish a voice call with an electronic device associated with the user identifier included in the emergency alert transmitted to the ERDP by the PSS and add the voice call established with the electronic device to the communication bridge created by the automated monitoring call flow 2024B. In this example, Call block 2006 provides the MCS with a first option to end the automated monitoring call flow 2024B (e.g., by pressing or entering a dial tone for '1') and a second option to request emergency services (e.g., by pressing or entering a dial tone for '2'), which instructs the EFMS to move on to Connect to 9-1-1 block 2007 (as described above).

In many instances, when a monitoring center requests emergency services on behalf of a security account, the monitoring center cannot contact emergency services by simply dialing a general emergency phone number like 9-1-1, for numerous reasons. In some cases, a monitoring center cannot contact emergency services by dialing a general emergency phone number because phone calls made to general emergency phone numbers are typically routed to appropriate emergency service providers (e.g., public safety answering points) based on a physical address associated with the calling phone number (for landline phones) or the location of the calling phone/the location of one or more cell towers facilitating the phone call (for mobile phones), and a monitoring center is often physically located far from the location associated with the an alarm for which the monitoring center is calling emergency services. In some cases, it is illegal for a monitoring center to call a general emergency phone number. For these reasons, in many instances, when a monitoring center requests emergency services on behalf of a security account, the monitoring center dials an administrative phone number associated with an emergency service provider. For example, most public safety answering points (PSAPs) have a ten-digit number that can be used to contact the PSAPs directly (as opposed to dialing 9-1-1 and being routed to a PSAP based on location, as described above). Many monitoring centers maintain databases of emergency service providers, jurisdictions associated those emergency service providers, and administrative phone numbers associated with those emergency service providers. When such a monitoring center receives an alarm, the monitoring center (e.g., a call-taker associated with the monitoring center) cross-references a location associated with the alarm with the jurisdictions of the emergency service providers to determine an emergency service provider (e.g., a PSAP) appropriate to respond to the alarm, and then identifies an administrative phone number (e.g., a ten-digit number) associated with that emergency service provider to use in contacting the emergency service provider. However, this process can be a manual or lengthy one. Thus, in some embodiments, the ERDP (e.g., the EFMS) maintains a database of emergency service providers, jurisdictions associated with the emergency service providers, and administrative phone numbers associated with the emergency service providers. In such an embodiment, when an automated monitoring call flow, triggered by an MCS in response to an emergency alert generated by a PSS, attempts to contact emergency services (e.g., at Connect to 9-1-1 block 2007, as described above), the ERDP (e.g., the EFMS) uses an emergency location associated with the emergency alert to determine an ESP appropriate to respond to the emergency alert and then identifies an administrative phone number associated with the ESP. The automated monitoring call flow can then use the administrative phone number associated with the ESP when establishing a voice call with the ESP (as described above).

Emergency Response Call Flows

An emergency service provider (ESP; e.g., a public safety answering point (PSAP)) can receive hundreds, or even thousands, of calls per day, depending on the day and the locale. The ESP staffs a limited number of call-takers that must answer and respond to all of these calls, many of which involve extremely delicate matters—traumatic injuries, domestic disputes, kidnappings, etc. The callers may be experiencing some of the lowest moments of their lives, and the call-takers must be attentive, responsive, decisive, and, most importantly, available, to provide appropriate care to the callers. However, in addition to the many calls that ESPs receive regarding legitimate emergencies, ESPs also receive many calls regarding matters that are non-emergent, or unrelated to any emergency at all. For example, many ESPs are associated with administrative phone numbers (as mentioned above) or non-emergency numbers (e.g., 3-1-1). In many instances, when a call is made to an ESP using an administrative or non-emergency number, that call must be answered by the same call-takers tasked with answering and responding to calls regarding legitimate emergencies. Answering and responding to calls made to administrative or non-emergency numbers can limit the bandwidth and capacity that call-takers have to answer and respond to calls regarding legitimate emergencies.

Figure 21:
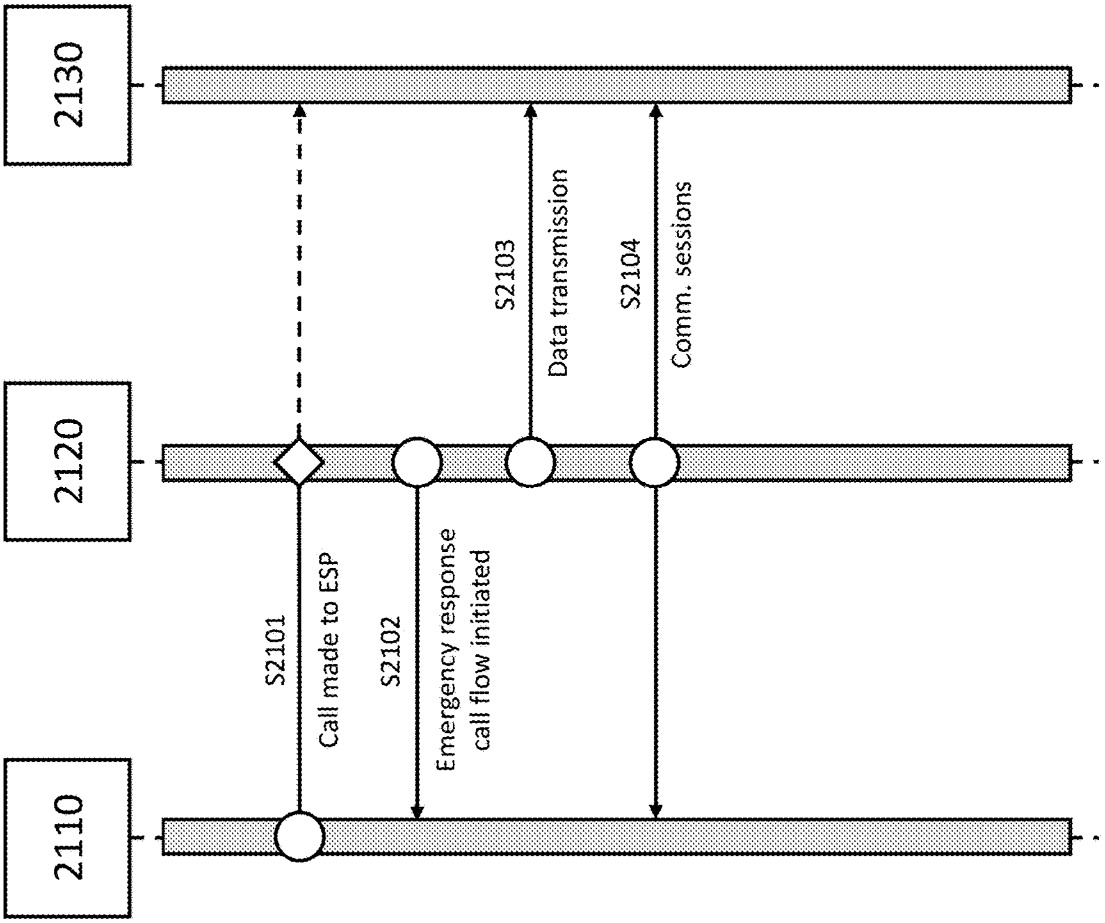
FIG. 21 depicts a diagram of an execution of an emergency response call flow, in accordance with some embodiments.

In various embodiments, by leveraging an emergency flow management system (EFMS; as described above), the emergency response data platform (ERDP) can fully or partially automate responses to calls made to ESPs using emergency response call flows. Similar to the way in which an automated monitoring call flow can fully or partially automate a predetermined response protocol for an MCS (as described above), an emergency response call flow can fully or partially automate a response to a call made to an ESP (e.g., a call made to the ESP using an administrative or non-emergency phone number, as described above). FIG. 21 depicts a ladder diagram of an exemplary execution of an emergency response call flow. As depicted in FIG. 21, in some embodiments, the execution of an emergency response call flow begins at step S2101, when a call made by an electronic device 2110 to an ESP 2130 is intercepted by the ERDP 2120. In some embodiments, after the ERDP 2120 intercepts the call made by the electronic device 2110 to the ESP 2130, at step S2102, the ERDP 2120 executes an emergency response call flow associated with the ESP 2130, including facilitating a voice-based communication session with the electronic device 2110 and extracting emergency data from the voice-based communication session. In some embodiments, after the ERDP 2120 executes the emergency response call flow associated with the ESP 2130, at step S2103 (which may be included in the execution of the emergency response call flow), the ERDP 2120 transmits at least a portion of the emergency data extracted from the voice-based communication session to the ESP 2130 (although it will be appreciated that the ERDP 2120 can transmit emergency data extracted from the voice-based communication session to the ESP 2130 at any point after the voice-based communication session with the electronic device 2110 is facilitated). In some embodiments, after the ERDP 2120 executes the emergency response call flow associated with the ESP 2130, at step S2104 (which may be included in in the execution of the emergency response call flow), the ERDP 2120 facilitates the establishment of a voice-based communication session between the electronic device 2110 and the ESP 2130.

The ERDP can intercept a call made by an electronic device to an ESP in various ways. For example, in some embodiments, similar to the monitoring call flow phone number that a monitoring center system (MCS) can use to dial into the EFMS and trigger the execution of an automated monitoring call flow (as described above), the EFMS can provide an emergency response call flow phone number that can be used to trigger the execution of an emergency response call flow selected or created for or by an ESP. In some embodiments, an ESP can replace a phone number associated with the ESP (e.g., a ten-digit, administrative phone number, as described above) with an emergency response call flow phone number provided by the EFMS, so that when a caller dials the emergency response call flow phone number (assuming that they are attempting to contact the ESP), the caller is directed instead to the EFMS. In some embodiments, an ESP can provide custody over a phone number associated with the ESP (e.g., a ten-digit, administrative phone number, as described above) to the ERDP, and the EFMS can then use the phone number associated with the ESP as an emergency response call flow phone number.

Figure 22:
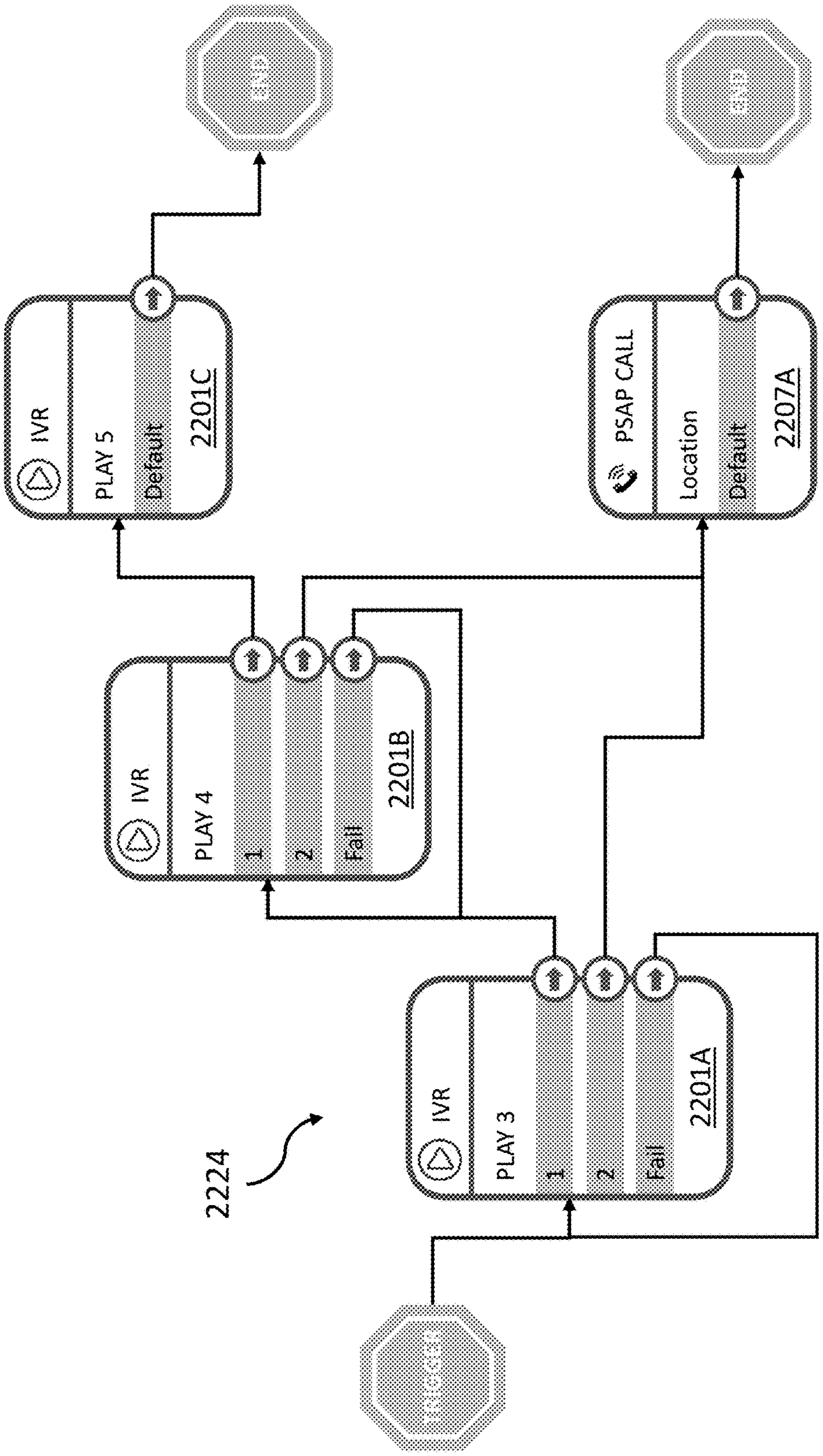
FIG. 22 illustrates an emergency response call flow within an emergency flow configuration editor, in accordance with some embodiments.

In some embodiments, an ESP can use the EFMS to select or create an emergency response call flow (e.g., within an emergency flow configuration editor, as described above). For example, FIG. 22 illustrates an emergency response call flow as it might appear within an emergency flow configuration editor (as described above). As illustrated in FIG. 22, in this example, when the ERDP intercepts a call made by an electronic device to the ESP that the emergency response call flow 2224 was selected by or created for, the ERDP prompts the EFMS to execute the emergency response call flow 2224. In this example, the emergency response call flow 2224 begins with IVR block 2201A, which instructs the EFMS to play the message "If this is an emergency, press '2.' For all other matters, press '1'" and wait for the caller to enter '1' or '2' using dial tones. In this example, if the caller fails to enter '1' or '2' within a predetermined timeframe (e.g., 30 seconds), the emergency response call flow 2224 repeats IVR block 2201A. In this example, if the caller enters '2,' the emergency response call flow 2224 continues with PSAP Call block 2207A, which instructs the EFMS to identify an administrative phone number associated with the ESP (as described above), establish a voice call with the ESP using the administrative phone number, and add the voice call established with the ESP to the call made by the electronic device, thereby ending the emergency response call flow 2224. In this example, if the caller enters '1,' the emergency response call flow 2224 continues with IVR block 2201B, which instructs the EFMS to play the message "To pay a law enforcement fine, press '1.' To speak to a call-taker, press '2' and wait for the caller to enter '1' or '2' using dial tones. In this example, if the caller fails to enter '1' or '2' within a predetermined timeframe (e.g., 30 seconds), the emergency response call flow 2224 repeats IVR block 2201B. In this example, if the caller enters '2,' the emergency response call flow 2224 continues with PSAP Call block 2207 (as described above). In this example, if the caller enters '1,' the emergency response call flow 2224 continues with IVR block 2201C, which instructs the EFMS to play a message directing the caller to a website where the caller can pay a law enforcement fine online. In this way, the emergency response call flow 2224 can be used by the ESP to prevent calls made to the ESP regarding paying law enforcement fines from taking bandwidth and capacity away from call-takers at the ESP. However, if the ERDP determines that a call made to an administrative number or a non-emergency number associated with an ESP is regarding a legitimate emergency (e.g., if a caller enters '2' at IVR block 2201A in the emergency response call flow 2224), the EFMS can automatically redirect or escalate the call to a call-taker at the ESP. However, an ESP can select or create an emergency response call flow for any other appropriate purpose. In some embodiments, the EFMS stores each emergency response call flow selected or created by or for an ESP within an emergency response call flow database (e.g., emergency response call flow database 1622B, as depicted in FIG. 16). In some embodiments, each emergency response call flow selected or created by or for an ESP and stored within an emergency response call flow database is associated with a different and unique emergency response call flow phone number, so that the EFMS can instantly determine which emergency response call flow to execute based on the emergency response call flow phone number used to dial into the EFMS.

Figure 23:
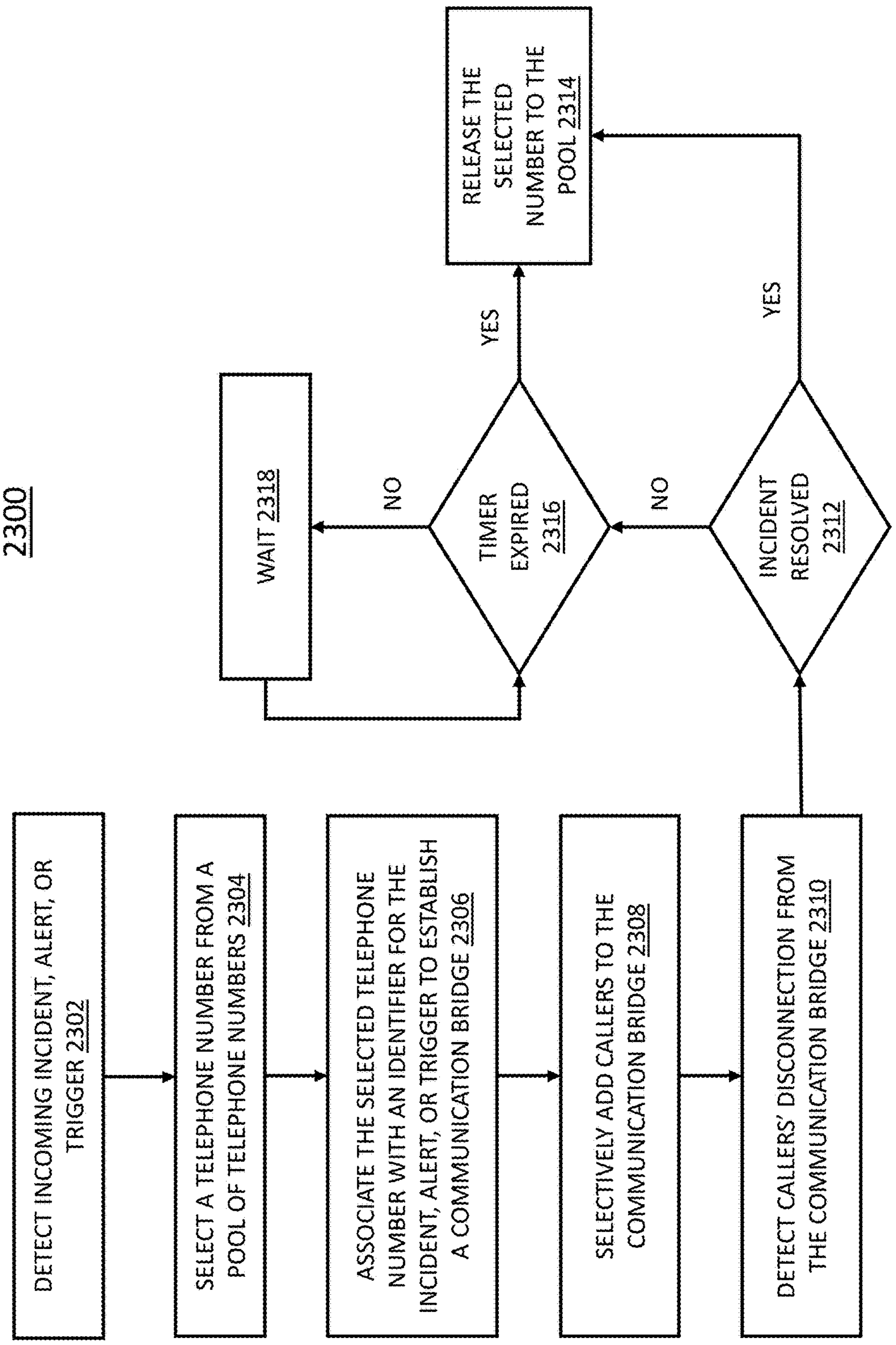
FIG. 23 illustrates a flow diagram of managing communication bridges with pools of telephone numbers, in accordance with some embodiments.

To facilitate the automation of calls and/or to support a "call-back" feature between an ESP and an MCS, the ERDP may be configured to use pools of telephone numbers or other telecommunications connections (e.g., audio/video conference rooms) to reconnect an ESP to an MCS while handling an alert incident. FIG. 23 illustrates a flow diagram of a process 2300 for managing communication bridges with pools of telephone numbers, in accordance with some embodiments. The process 2300 has a number of operations that may be performed by one or more of the ERDPs, systems, flow diagrams, methods or other processes of the disclosure. One or more of the operations may be performed out of order or even in parallel, according to embodiments of the disclosure.

At operation 2302, process 2300 detects an incoming incident, alert, or trigger, according to an embodiment.

At operation 2304, process 2300 selects a telephone number from a pool of telephone numbers, according to an embodiment.

At operation 2306, process 2300 associates the selected telephone number with an identifier for the incident, alert, or trigger, according to an embodiment.

At operation 2308, process 2300 selectively adds callers to the communication bridge, according to an embodiment.

At operation 2310, process 2300 detects callers' disconnection (e.g., hanging up) from the communication bridge, according to an embodiment.

At operation 2312, process 2300 determines if the incident, alert or trigger is resolved, according to an embodiment. If the incident, alert, or trigger is resolved, process 2300 proceeds to operation 2314, according to an embodiment. If not, process 2300 proceeds to operation 2316, according to an embodiment.

At operation 2314, process 2300 releases the selected number to the pool to be available to support another communication bridge, according to an embodiment.

At operation 2316, process 2300 determines whether a predetermined duration of time (e.g., a timer) allotted/assigned to the telephone number has expired, according to an embodiment. If the time has expired, process 2300 proceeds to operation 2314, according to an embodiment. If not, process 2300 proceeds to operation 2318 to wait and recheck on the expiration of the timer, according to an embodiment.

Figure 24:
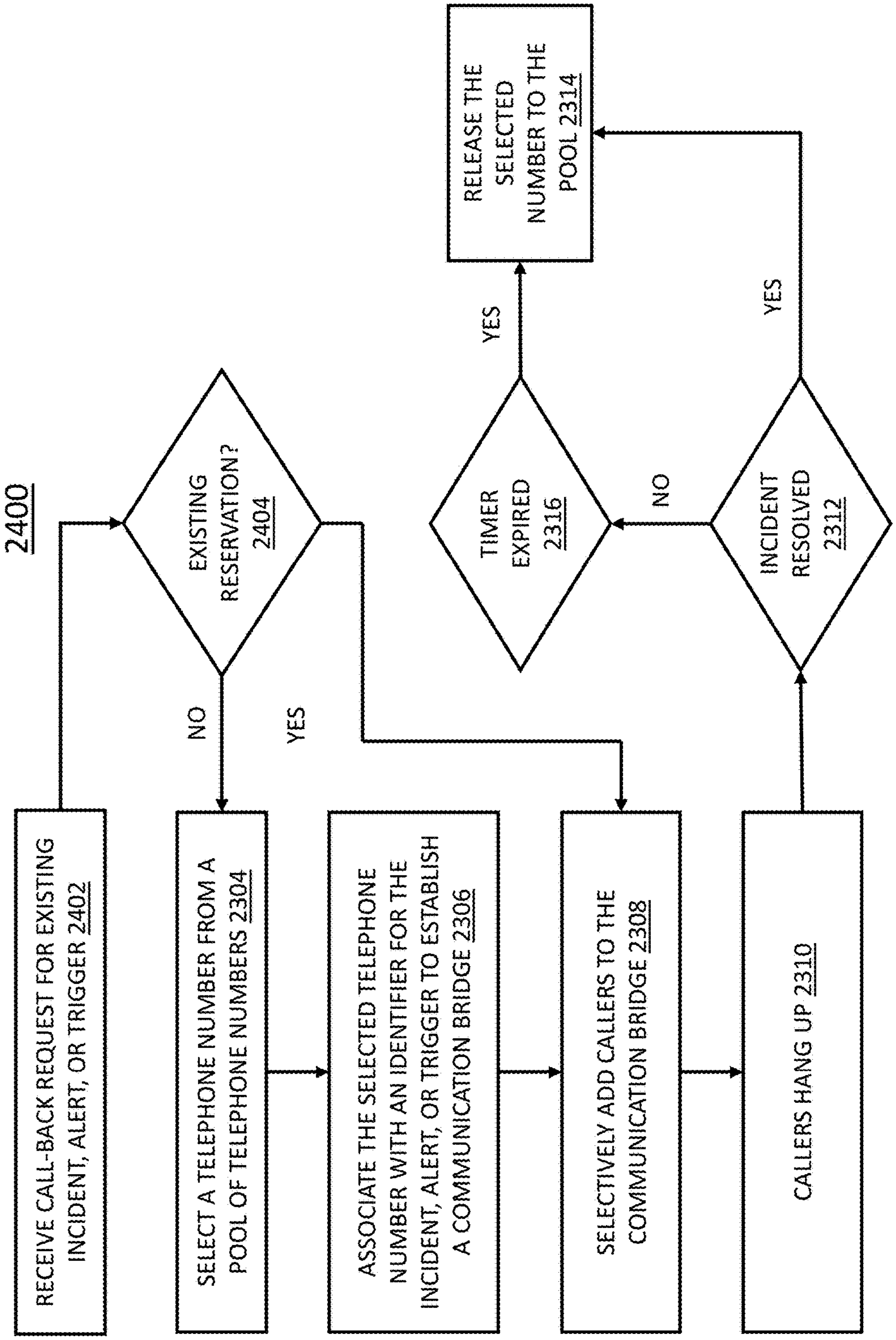
FIG. 24 illustrates a flow diagram of managing communication bridges with pools of telephone numbers, in accordance with some embodiments.

FIG. 24 illustrates a flow diagram of a process 2400 for managing communication bridges with pools of telephone numbers, in accordance with some embodiments. The process 2400 has a number of operations that may be performed by one or more of the ERDPs, systems, flow diagrams, methods or other processes of the disclosure. One or more of the operations may be performed out of order or even in parallel, according to embodiments of the disclosure. Process 2400 illustrates an example process flow for the scenario of an ESP requesting a call-back of an MCS before a timer expires for a telephone number borrowed from a pool of telephone numbers, according to an embodiment.

At operation 2402, process 2400 receives a call-back request for an existing incident, alert, or trigger, according to an embodiment.

At operation 2404, process 2400 determines if an existing reservation or use of a telephone number (from a pool) exists, according to an embodiment. If the reservation exists (e.g., has not been released back to the pool), process 2400 proceeds to operation 2308, according to an embodiment. If not, process 2400 proceeds to operation 2304, according to an embodiment. From operation 2304 or operation 2308, process 2400 operates similarly to process 2300, according to an embodiment.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed:

1. A method for automating a monitoring call flow, the method comprising:

receiving an emergency alert from a private security system, the emergency alert comprising a customer phone number and an emergency location;

providing an automated monitoring call flow phone number to a monitoring center system, wherein the automated monitoring call flow phone number is associated with an automated monitoring call flow stored in a database;

determining an emergency service provider appropriate to respond to the emergency alert based at least in part on the emergency location; and detecting a phone call made to the automated monitoring call flow phone number by the monitoring center system and responsive to detecting the phone call, executing the automated monitoring call flow for the emergency alert, wherein executing the automated monitoring call flow comprises:

facilitating a first voice-based communication session between the monitoring center system and an electronic device associated with the customer phone number; and facilitating a second voice-based communication session between the monitoring center system and the emergency service provider.

2. The method of claim 1, wherein executing the automated monitoring call flow further comprises:

establishing a communication bridge for the emergency alert;

establishing a first communication link with an electronic device associated with the monitoring center system;

establishing a second communication link with the electronic device associated with the customer phone number; and connecting the first and second communication links to the communication bridge to facilitate the first voice-based communication session.

3. The method of claim 1, wherein executing the automated monitoring call flow further comprises:

establishing a first communication link with a communication device associated with the monitoring center system;

determining an agency specific phone number for the emergency service provider;

using the agency specific phone number to establish a second communication link with an electronic device associated with the emergency service provider; and connecting the first and second communication links to a communication bridge to facilitate the second voice-based communication session.

4. The method of claim 3, further comprising:

selecting the automated monitoring call flow phone number for the communication bridge from a pool of a plurality of telephone numbers; and releasing the automated monitoring call flow phone number for availability in the pool after an expiration time assigned to the telephone number.

5. The method of claim 1, wherein providing the automated monitoring call flow phone number to the monitoring center system further comprises:

providing the automated monitoring call flow phone number to the monitoring center system for display by an electronic device associated with the monitoring center system.

6. The method of claim 5, wherein the automated monitoring call flow phone number is displayed within a graphical user interface of a software application executed on the electronic device associated with the monitoring center system.

7. The method of claim 1, further comprising:

after receiving the emergency alert, determining that a monitoring account associated with both a user identifier and the monitoring center system has not been created for the user identifier; and generating the monitoring account associated with both the user identifier and the monitoring center system, the monitoring account comprising the user identifier and the emergency location.

8. The method of claim 7, wherein determining that the monitoring account associated with both the user identifier and the monitoring center system has not been created for the user identifier comprises cross-referencing the user identifier with a monitoring account database.

9. A method for automating an emergency response call flow, the method comprising:

detecting a phone call made to an emergency response phone number, wherein the emergency response phone number is associated with a first emergency response call flow and a first emergency service provider, and the first emergency response call flow is stored within a database comprising a plurality of emergency response call flows associated with a respective plurality of emergency service providers; and responsive to detecting the phone call, executing the first emergency response call flow retrieved from the database, wherein executing the first emergency response call flow comprises:

facilitating a voice-based communication session with an emergency caller; and extracting emergency data from the voice-based communication session.

10. The method of claim 9, wherein a phone number is associated with the emergency caller.

11. The method of claim 9, wherein a location is associated with the emergency caller.

12. The method of claim 11, wherein the location associated with the emergency caller is a device-based hybrid location generated by an electronic device associated with the emergency caller.

13. The method of claim 9, further comprising transmitting the emergency data extracted from the voice-based communication session to the first emergency service provider.

14. The method of claim 13, wherein the emergency data extracted from the voice-based communication session is displayed within a graphical user interface of an emergency response application.

15. The method of claim 9, wherein the plurality of emergency response call flows are respectively associated with a plurality of emergency response phone numbers.

16. The method of claim 9, wherein the voice-based communication session is between an electronic device of the emergency caller and a device of the first emergency service provider.

* * * * *